(12) United States Patent
Wang et al.

(10) Patent No.: US 12,351,329 B2
(45) Date of Patent: Jul. 8, 2025

(54) SYSTEMS AND METHOD OF OPERATING A FUEL CELL ASSEMBLY

(71) Applicant: General Electric Company, Schenectady, NY (US)

(72) Inventors: Honggang Wang, Clifton Park, NY (US); Michael Anthony Benjamin, Cincinnati, OH (US); Seung-Hyuck Hong, Clifton Park, NY (US); Richard L. Hart, Broadalbin, NY (US)

(73) Assignee: General Electric Company, Evendale, OH (US)

( * ) Notice: Subject to any disclaimer, the term of this patent is extended or adjusted under 35 U.S.C. 154(b) by 696 days.

(21) Appl. No.: 17/581,135

(22) Filed: Jan. 21, 2022

(65) Prior Publication Data
US 2023/0234716 A1      Jul. 27, 2023

(51) Int. Cl.
*H01M 8/04*     (2016.01)
*B64D 27/10*   (2006.01)
(Continued)

(52) U.S. Cl.
CPC .............. *B64D 31/00* (2013.01); *B64D 27/10* (2013.01); *B64D 27/24* (2013.01);
(Continued)

(58) Field of Classification Search
CPC .. H01M 8/04; H01M 8/0432; H01M 8/04225; H01M 8/04231; H01M 8/04022;
(Continued)

(56) References Cited

U.S. PATENT DOCUMENTS

| 3,658,279 A | 4/1972 | Robertson |
| 3,805,517 A | 4/1974 | Sewell et al. |

(Continued)

FOREIGN PATENT DOCUMENTS

| CN | 104852067 A | * | 8/2015 | ........ H01M 8/04074 |
| CN | 204558589 U | * | 8/2015 | |

(Continued)

OTHER PUBLICATIONS

Qin et al., translated Chinese patent CN112855345A of Gas turbine composite propulsion power generation system with anode circulation fuel cell (Year: 2021).*

(Continued)

*Primary Examiner* — Cuong H Nguyen
(74) *Attorney, Agent, or Firm* — Dority & Manning, P.A.

(57) ABSTRACT

A method for operating a propulsion system for an aircraft, the propulsion system including a gas turbine engine and a fuel cell assembly, the fuel cell assembly including a fuel cell stack having a fuel cell defining an outlet positioned to remove output products from the fuel cell during operation, the method including: executing a startup sequence for the fuel cell assembly, wherein executing the startup sequence for the fuel cell assembly includes initiating the startup sequence for the fuel cell assembly; executing a startup sequence for the gas turbine engine, wherein executing the startup sequence for the gas turbine engine comprises initiating the startup sequence for the gas turbine engine subsequent to initiating the startup sequence for the fuel cell assembly; and operating the fuel cell assembly to provide output products to a combustion section of the gas turbine engine.

20 Claims, 21 Drawing Sheets

(51) Int. Cl.
  *B64D 27/24*     (2006.01)
  *B64D 31/00*     (2006.01)
  *B64D 31/18*     (2024.01)
  *H01M 8/04223*   (2016.01)
  *H01M 8/04225*   (2016.01)
  *H01M 8/04302*   (2016.01)
  *H01M 8/04701*   (2016.01)
  *B64D 27/02*     (2006.01)

(52) U.S. Cl.
  CPC ... *H01M 8/04225* (2016.02); *H01M 8/04231* (2013.01); *H01M 8/04302* (2016.02); *H01M 8/04701* (2013.01); *B64D 27/026* (2024.01); *H01M 2250/20* (2013.01)

(58) Field of Classification Search
  CPC ......... H01M 8/04701; H01M 8/04268; H01M 2008/1293; H01M 2250/20; Y02E 60/00; B64D 27/10; B64D 27/24; B64D 27/026; B64D 31/18; B64D 31/00
  USPC ............................................................ 701/3
  See application file for complete search history.

(56) References Cited

U.S. PATENT DOCUMENTS

| | | |
|---|---|---|
| 4,684,081 A | 8/1987 | Cronin |
| 5,227,256 A | 7/1993 | Marianowski et al. |
| 5,581,995 A | 12/1996 | Lucenko et al. |
| 5,678,647 A * | 10/1997 | Wolfe ............... H01M 8/04388 429/495 |
| 5,858,314 A | 1/1999 | Hsu et al. |
| 5,968,680 A | 10/1999 | Wolfe et al. |
| 6,183,703 B1 | 2/2001 | Hsu et al. |
| 6,296,957 B1 | 10/2001 | Graage |
| 6,348,278 B1 | 2/2002 | LaPierre et al. |
| 6,630,264 B2 | 10/2003 | Haltiner, Jr. et al. |
| 6,641,084 B1 | 11/2003 | Huber et al. |
| 6,834,831 B2 | 12/2004 | Daggett |
| 7,279,243 B2 | 10/2007 | Haltiner, Jr. et al. |
| 7,285,350 B2 | 10/2007 | Keefer et al. |
| 7,380,749 B2 | 6/2008 | Fucke et al. |
| 7,456,517 B2 | 11/2008 | Campbell et al. |
| 7,470,477 B2 | 12/2008 | Zizelman et al. |
| 7,513,119 B2 | 4/2009 | Zielinski et al. |
| 7,578,136 B2 | 8/2009 | Derouineau et al. |
| 7,659,021 B2 | 2/2010 | Horiuchi et al. |
| 7,709,118 B2 | 5/2010 | Lundberg |
| 7,743,499 B2 | 6/2010 | Pettit et al. |
| 7,781,115 B2 | 8/2010 | Lundberg |
| 7,854,582 B2 | 12/2010 | Ullyott |
| 7,926,287 B2 | 4/2011 | Ullyott et al. |
| 7,966,801 B2 | 6/2011 | Umeh et al. |
| 7,966,830 B2 * | 6/2011 | Daggett ................. B64D 27/02 60/780 |
| 8,141,360 B1 | 3/2012 | Huber |
| 8,232,670 B2 | 7/2012 | Breit et al. |
| 8,268,510 B2 | 9/2012 | Rock et al. |
| 8,288,060 B2 | 10/2012 | Bae et al. |
| 8,309,270 B2 | 11/2012 | Finnerty et al. |
| 8,373,381 B2 | 2/2013 | Raiser et al. |
| 8,394,552 B2 | 3/2013 | Gummalla et al. |
| 8,524,412 B2 | 9/2013 | Rock et al. |
| 8,722,270 B2 | 5/2014 | Pastula et al. |
| 8,727,270 B2 | 5/2014 | Burns et al. |
| 8,732,532 B2 | 5/2014 | Higeta |
| 8,820,677 B2 | 9/2014 | Rajashekara et al. |
| 8,846,255 B2 | 9/2014 | Dineen |
| 8,875,519 B2 | 11/2014 | Dooley |
| 8,950,703 B2 | 2/2015 | Bayliss et al. |
| 9,005,847 B2 | 4/2015 | Rock et al. |
| 9,028,990 B2 | 5/2015 | Gans et al. |
| 9,054,385 B2 | 6/2015 | Jones et al. |
| 9,059,440 B2 | 6/2015 | Hotto |
| 9,068,748 B2 | 6/2015 | Hoke |
| 9,118,054 B2 | 8/2015 | Gummalla et al. |
| 9,347,379 B2 | 5/2016 | Dooley |
| 9,359,956 B2 | 6/2016 | Dooley |
| 9,435,230 B2 | 9/2016 | Kim et al. |
| 9,444,108 B2 | 9/2016 | Brousseau |
| 9,464,573 B2 | 10/2016 | Remy et al. |
| 9,541,001 B2 | 1/2017 | Steinwandel et al. |
| 9,604,730 B2 | 3/2017 | Hagh et al. |
| 9,617,006 B2 | 4/2017 | Brugger et al. |
| 9,666,888 B2 | 5/2017 | Nagai et al. |
| 9,777,638 B2 | 10/2017 | Freidl |
| 9,897,041 B2 | 2/2018 | Hoffjann et al. |
| 9,966,619 B2 | 5/2018 | Libis et al. |
| 10,008,726 B2 | 6/2018 | Leah et al. |
| 10,035,607 B2 | 7/2018 | Wangemann et al. |
| 10,069,150 B2 | 9/2018 | Mata et al. |
| 10,224,556 B2 | 3/2019 | Lents et al. |
| 10,318,003 B2 | 6/2019 | Gannon et al. |
| 10,443,504 B2 | 10/2019 | Dalal |
| 10,446,858 B2 | 10/2019 | Palumbo et al. |
| 10,487,839 B2 | 11/2019 | Kupiszewski et al. |
| 10,622,653 B2 | 4/2020 | Whyatt et al. |
| 10,641,179 B2 | 5/2020 | Hayama et al. |
| 10,644,331 B2 | 5/2020 | Stoia et al. |
| 10,671,092 B2 | 6/2020 | DiRusso et al. |
| 10,676,208 B2 | 6/2020 | Wangemann et al. |
| 10,724,432 B2 | 7/2020 | Shapiro et al. |
| 10,737,802 B2 | 8/2020 | Krug et al. |
| 10,762,726 B2 | 9/2020 | Gansler et al. |
| 10,766,629 B2 | 9/2020 | Mercier-Calvairac et al. |
| 10,774,741 B2 | 9/2020 | Sennoun |
| 10,814,992 B2 | 10/2020 | Halsey et al. |
| 10,913,543 B2 | 2/2021 | Bailey et al. |
| 10,919,635 B2 | 2/2021 | Edgar et al. |
| 10,950,875 B1 | 3/2021 | Radhakrishnan et al. |
| 10,967,984 B2 | 4/2021 | Willford et al. |
| 10,978,723 B2 | 4/2021 | Lo et al. |
| 11,794,912 B2 * | 10/2023 | Wang ................. F02C 3/20 |
| 11,804,607 B2 * | 10/2023 | Wang ................. B64D 27/10 |
| 11,967,743 B2 * | 4/2024 | Wang ................. B60L 58/30 |
| 11,978,934 B2 * | 5/2024 | Wang ................. H01M 8/04111 |
| 12,037,124 B2 * | 7/2024 | Wang ................. F02C 6/08 |
| 2002/0163819 A1 | 11/2002 | Treece |
| 2004/0081871 A1 | 4/2004 | Kearl et al. |
| 2004/0150366 A1 | 8/2004 | Ferrall et al. |
| 2006/0010866 A1 | 1/2006 | Rehg et al. |
| 2006/0263658 A1 * | 11/2006 | Yanagi ................. H01M 8/0662 429/408 |
| 2008/0001038 A1 * | 1/2008 | Daggett ................. B64D 27/02 244/53 R |
| 2008/0155984 A1 | 7/2008 | Liu et al. |
| 2010/0133475 A1 | 6/2010 | Kobayashi et al. |
| 2010/0159303 A1 | 6/2010 | Rock et al. |
| 2011/0071707 A1 | 3/2011 | Crumm et al. |
| 2012/0161512 A1 | 6/2012 | Metzler et al. |
| 2012/0301814 A1 | 11/2012 | Beasley et al. |
| 2013/0099560 A1 | 4/2013 | Shipley et al. |
| 2013/0280634 A1 | 10/2013 | Park et al. |
| 2014/0023945 A1 | 1/2014 | Epstein et al. |
| 2014/0325991 A1 | 11/2014 | Liew et al. |
| 2015/0030947 A1 | 1/2015 | Saunders et al. |
| 2015/0151844 A1 | 6/2015 | Anton et al. |
| 2016/0260991 A1 | 9/2016 | Shapiro et al. |
| 2017/0070088 A1 | 3/2017 | Bernsten et al. |
| 2018/0003072 A1 | 1/2018 | Lents et al. |
| 2018/0141675 A1 | 5/2018 | Halsey et al. |
| 2018/0166734 A1 | 6/2018 | Linde et al. |
| 2018/0319283 A1 | 11/2018 | Battin et al. |
| 2019/0121369 A1 | 4/2019 | DiRusso et al. |
| 2019/0136761 A1 * | 5/2019 | Shapiro ............ H01M 8/04201 |
| 2019/0145273 A1 | 5/2019 | Frank et al. |
| 2020/0014044 A1 | 1/2020 | Tichy et al. |
| 2020/0062414 A1 | 2/2020 | Hon et al. |
| 2020/0136163 A1 | 4/2020 | Holland et al. |
| 2020/0149479 A1 | 5/2020 | Des Roches-Dionne et al. |
| 2020/0194799 A1 | 6/2020 | Hart et al. |
| 2020/0313207 A1 | 10/2020 | Milcarek et al. |
| 2021/0003281 A1 | 1/2021 | Amble et al. |

(56) References Cited

U.S. PATENT DOCUMENTS

| | | | |
|---|---|---|---|
| 2021/0075034 A1 | 3/2021 | Irie et al. | |
| 2021/0115857 A1 | 4/2021 | Collopy | |
| 2023/0187677 A1* | 6/2023 | Wang | F02C 3/06 |
| 2023/0211887 A1* | 7/2023 | Wang | B64D 27/24 244/55 |
| 2023/0234714 A1* | 7/2023 | Wang | F02C 7/26 |
| 2023/0234716 A1* | 7/2023 | Wang | B64D 27/10 701/3 |

FOREIGN PATENT DOCUMENTS

| | | | | |
|---|---|---|---|---|
| CN | 106948941 A | * | 7/2017 | |
| CN | 106976405 A | | 7/2017 | |
| CN | 108370051 B | * | 3/2020 | H01M 8/04022 |
| CN | 114361520 A | * | 4/2022 | B64D 27/16 |
| DE | 102005012230 A1 | | 10/2005 | |
| EP | 3805107 A1 | | 4/2021 | |
| EP | 4092258 A1 | * | 11/2022 | F02C 3/20 |
| JP | 2009187756 A | * | 8/2009 | |
| JP | 2011002308 A | | 1/2011 | |
| JP | 2018087501 A | | 6/2018 | |
| JP | 2018139207 A | * | 9/2018 | H01M 8/04089 |
| KR | 20090064853 A | | 6/2009 | |
| KR | 20210029213 A | * | 3/2021 | |
| WO | WO2018108962 A1 | | 6/2018 | |
| WO | WO2020/011380 A1 | | 1/2020 | |

OTHER PUBLICATIONS

Juschus, Daniel. Preliminary Propulsion System Sizing Methods for PEM Fuel Cell Aircraft. Diss. Master's thesis, TU Delft Aerospace Engineering, 2021. (Year: 2021).*

Waters, Daniel F., Lucas M. Pratt, and Christopher P. Cadou. "Gas turbine/solid oxide fuel cell hybrids for aircraft propulsion and power." Journal of Propulsion and Power 37.3 (2021): 349-361. (Year: 2021).*

Cavini, Leonardo. Fuel Cell Simulation Model for Aircraft Integration Analysis in Early Design Phases. Diss. Politecnico di Torino, 2024. (Year: 2024).*

Schefer, Hendrik, et al. "Discussion on electric power supply systems for all electric aircraft." IEEE access 8 (2020): 84188-84216. (Year: 2020).*

Seitz, Arne, et al. "Initial assessment of a fuel cell—gas turbine hybrid propulsion concept." Aerospace 9.2 (2022): 68. (Year: 2022).*

Babu D et al., Optimization of Pattern Factor of the Annular Gas Turbine Combustor for Better Turbine Life, IOSR Journal of Mechanical and Civil Engineering, pp. 30-35.

Cocker et al., 3D Printing Cuts Fuel Cell Component Costs, Energy and Environmental Science Article featured in Chemistry World, Jul. 3, 2014, 3 Pages. https://www.chemistryworld.com/news/3d-printing-cuts-fuel-cell-component-costs/7526.article.

Code of Federal Regulations, National Archives, Title 14, Chapter I, Subchapter C, Part 33, §33.75 Safety Analysis, 2007, refer to p. 25 of 50. https://www.ecfr.gov/cgi-bin/text-idx?SID=5e1a000b517423bb51a8f713ca211b68&mc=true&node=pt14.1.33&rgn=div5#se14.1.33_175.

Honegger, Gas Turbine Combustion Modeling for a Parametric Emissions Monitoring System, Thesis Kansas State University College of Engineering, Manhattan Kansas, 2004, 97 Pages. https://core.ac.uk/download/pdf/5164453.pdf.

Krishnan, Recent Developments in Metal-Supported Solid Oxide Fuel Cells, Wires Energy and Environment, vol. 6, Issue 5, Mar. 30, 2017, 34 Pages. (Abstract Only) https://doi.org/10.1002/wene.246.

Mark et al., Design and Analysis of Annular Combustion Chamber of a Low Bypass Turbofan Engine in a Jet Trainer Aircraft, Propulsion and Power Research, vol. 5, Issue 2, 2015, pp. 97-107.

Thorud, Dynamic Modelling and Characterisation of a Solid Oxide Fuel Cell Integrated in a Gas Turbine Cycle, Trondheim, NTNU, Oct. 2005, 278 Pages.

Turbine Engine Relighting in Flight, Certification Memorandum, CM-PIFS-010, European Aviation Safety Agency (EASA), Issue 1, Apr. 29, 2015, 6 Pages.

Whyatt et al., Electrical Generation for More-Electric Aircraft Using Solid Oxide Fuel Cells, No. PNNL-21382, Pacific Northwest National Lab (PNNL), Richland WA, 2012, 110 Pages. http://www.energy.gov/sites/prod/files/2014/03/f9/sofc_for_aircraft_pnnl_2012.pdf.

* cited by examiner

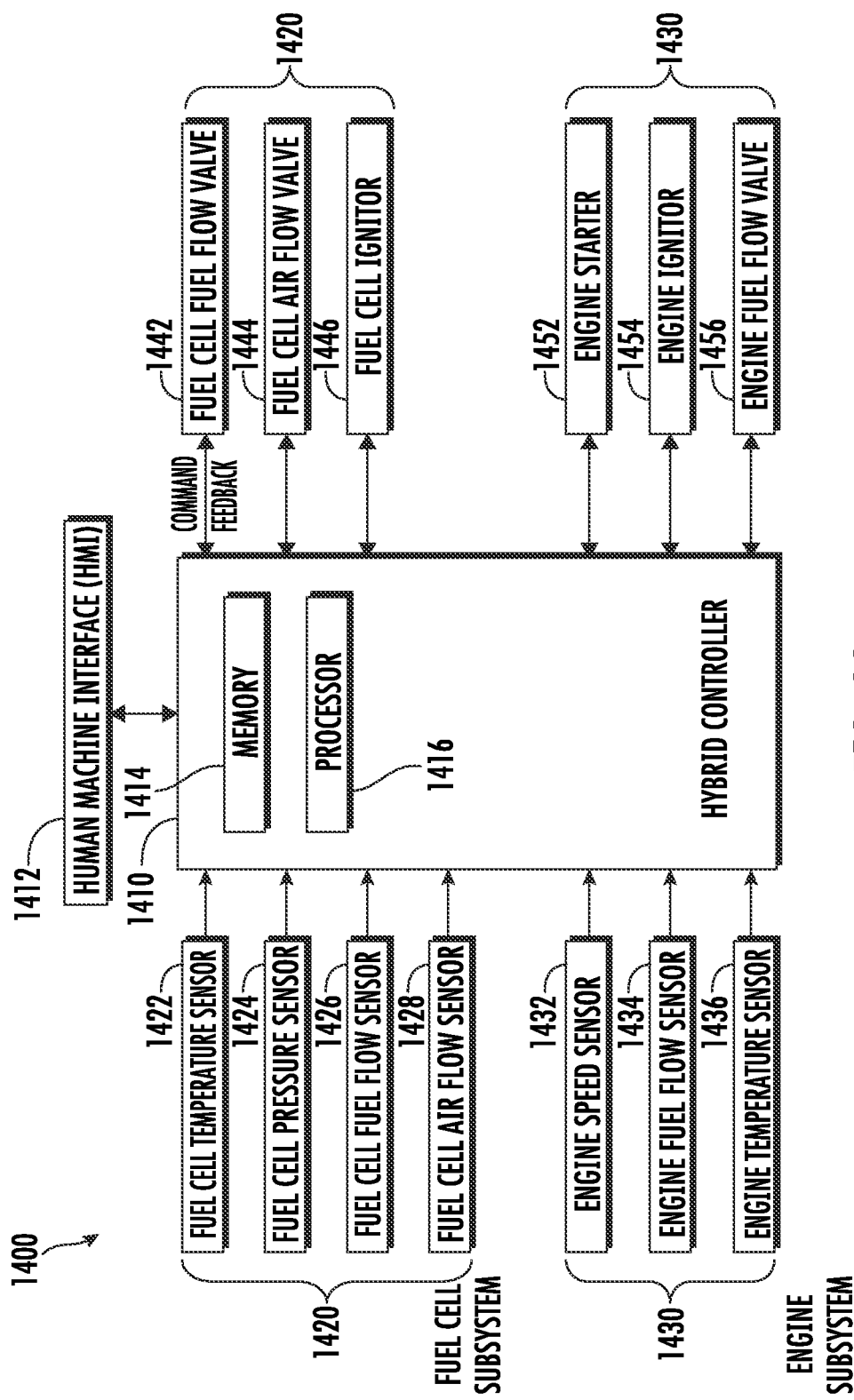

SYSTEMS AND METHOD OF OPERATING A FUEL CELL ASSEMBLY

FIELD

The present disclosure relates to a system and method for operating a fuel cell assembly, such as a fuel cell assembly integrated into a gas turbine engine.

BACKGROUND

A gas turbine engine generally includes a turbomachine and a rotor assembly. Gas turbine engines, such as turbofan engines, may be used for aircraft propulsion. In the case of a turbofan engine, the turbomachine includes a compressor section, a combustion section, and a turbine section in serial flow order, and the rotor assembly is configured as a fan assembly.

During operation, air is compressed in the compressor and mixed with fuel and ignited in the combustion section for generating combustion gases which flow downstream through the turbine section. The turbine section extracts energy therefrom for rotating the compressor section and fan assembly to power the gas turbine engine and propel an aircraft incorporating such a gas turbine engine in flight.

At least certain gas turbine engines include a fuel cell assembly operable therewith.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which:

FIG. 23 is a schematic view of a control system in accordance with the present disclosure.

DETAILED DESCRIPTION

Figure 1:
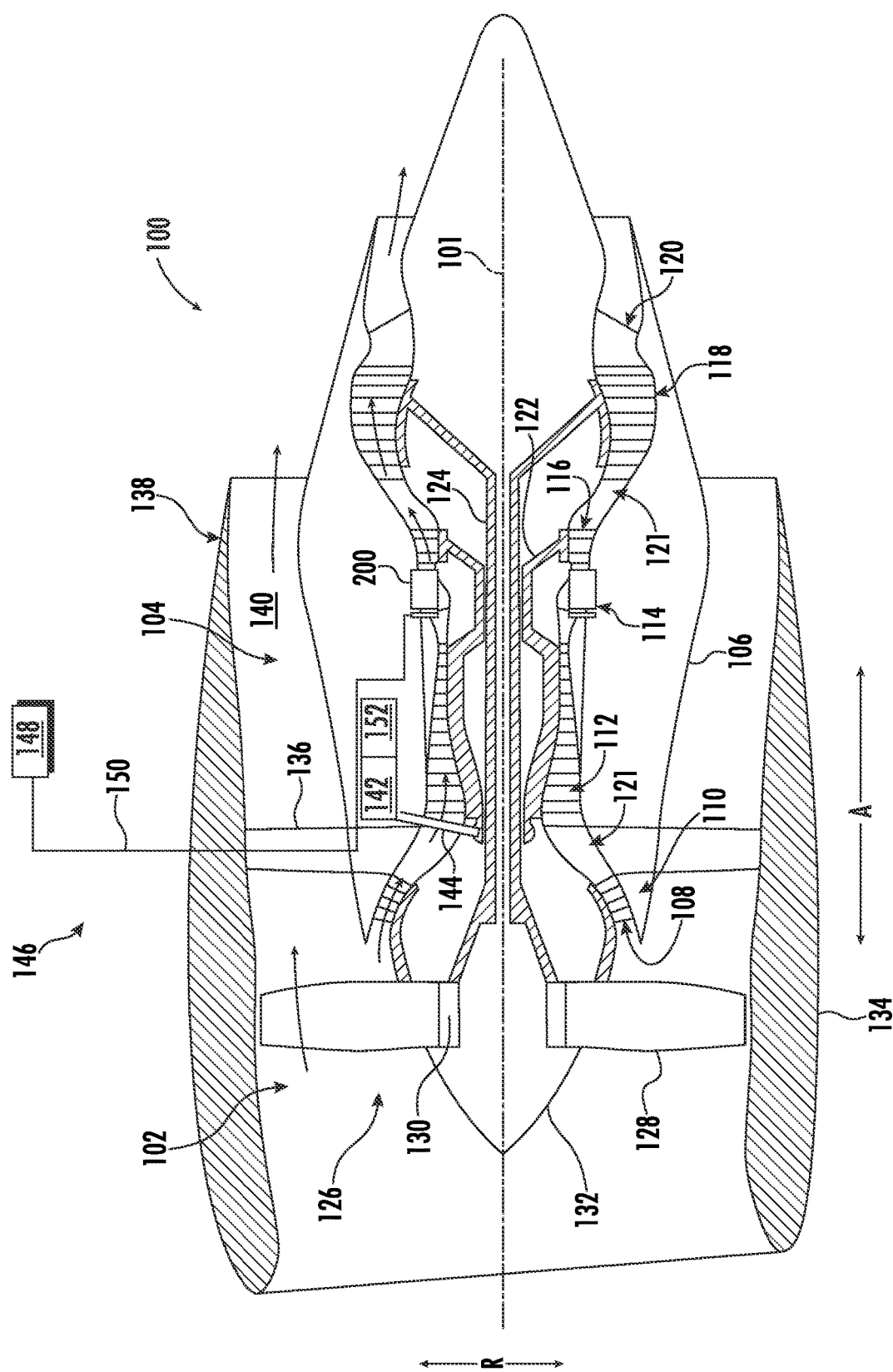
FIG. 1 is a cross-sectional view of a gas turbine engine in accordance with an exemplary aspect of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

For purposes of the description hereinafter, the terms "upper", "lower", "right", "left", "vertical", "horizontal", "top", "bottom", "lateral", "longitudinal", and derivatives thereof shall relate to the embodiments as they are oriented in the drawing figures. However, it is to be understood that the embodiments may assume various alternative variations, except where expressly specified to the contrary. It is also to be understood that the specific devices illustrated in the attached drawings, and described in the following specification, are simply exemplary embodiments of the disclosure. Hence, specific dimensions and other physical characteristics related to the embodiments disclosed herein are not to be considered as limiting.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

The term "at least one of" in the context of, e.g., "at least one of A, B, and C" or "at least one of A, B, or C" refers to only A, only B, only C, or any combination of A, B, and C.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

A "third stream" as used herein means a non-primary air stream capable of increasing fluid energy to produce a minority of total propulsion system thrust. A pressure ratio of the third stream may be higher than that of the primary propulsion stream (e.g., a bypass or propeller driven propulsion stream). The thrust may be produced through a dedicated nozzle or through mixing of an airflow through the third stream with a primary propulsion stream or a core air stream, e.g., into a common nozzle.

In certain exemplary embodiments an operating temperature of the airflow through the third stream may be less than a maximum compressor discharge temperature for the engine, and more specifically may be less than 350 degrees Fahrenheit (such as less than 300 degrees Fahrenheit, such as less than 250 degrees Fahrenheit, such as less than 200 degrees Fahrenheit, and at least as great as an ambient temperature). In certain exemplary embodiments these operating temperatures may facilitate heat transfer to or from the airflow through the third stream and a separate fluid stream. Further, in certain exemplary embodiments, the airflow through the third stream may contribute less than 50% of the total engine thrust (and at least, e.g., 2% of the total engine thrust) at a takeoff condition, or more particularly while operating at a rated takeoff power at sea level, static flight speed, 86 degree Fahrenheit ambient temperature operating conditions.

Furthermore in certain exemplary embodiments, aspects of the airflow through the third stream (e.g., airstream, mixing, or exhaust properties), and thereby the aforementioned exemplary percent contribution to total thrust, may passively adjust during engine operation or be modified purposefully through use of engine control features (such as fuel flow, electric machine power, variable stators, variable inlet guide vanes, valves, variable exhaust geometry, or fluidic features) to adjust or optimize overall system performance across a broad range of potential operating conditions.

The term "turbomachine" or "turbomachinery" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The terms "low" and "high", or their respective comparative degrees (e.g., —er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" at the engine.

As will be discussed in more detail below, fuel cells are electro-chemical devices which can convert chemical energy from a fuel into electrical energy through an electro-chemical reaction of the fuel, such as hydrogen, with an oxidizer, such as oxygen contained in the atmospheric air. Fuel cell systems may advantageously be utilized as an energy supply system because fuel cell systems may be considered environmentally superior and highly efficient when compared to at least certain existing systems. To improve system efficiency and fuel utilization and reduce external water usage, the fuel cell system may include an anode recirculation loop. As a single fuel cell can only generate about 1V voltage, a plurality of fuel cells may be stacked together (which may be referred to as a fuel cell stack) to generate a desired voltage. Fuel cells may include Solid Oxide Fuel Cells (SOFC), Molten Carbonate Fuel Cells (MCFC), Phosphoric Acid Fuel Cells (PAFC), and Proton Exchange Membrane Fuel Cells (PEMFC), all generally named after their respective electrolytes. Each of these fuel cells may have specific benefits in the form of a preferred operating temperature range, power generation capability, efficiency, etc.

(i) Embodiment of FIG. 1

Referring now to the drawings, wherein identical numerals indicate the same elements throughout the figures, FIG.

1 provides a schematic, cross-sectional view of an engine in accordance with an exemplary embodiment of the present disclosure. The engine may be incorporated into a vehicle. For example, the engine may be an aeronautical engine incorporated into an aircraft. Alternatively, however, the engine may be any other suitable type of engine for any other suitable vehicle.

For the embodiment depicted, the engine is configured as a high bypass turbofan engine 100. As shown in FIG. 1, the turbofan engine 100 defines an axial direction A (extending parallel to a centerline axis 101 provided for reference), a radial direction R, and a circumferential direction (extending about the axial direction A; not depicted in FIG. 1). In general, the turbofan engine 100 includes a fan section 102 and a turbomachine 104 disposed downstream from the fan section 102.

The exemplary turbomachine 104 depicted generally includes a substantially tubular outer casing 106 that defines an annular inlet 108. The outer casing 106 encases, in serial flow relationship, a compressor section including a booster or low pressure (LP) compressor 110 and a high pressure (HP) compressor 112; a combustion section 114; a turbine section including a high pressure (HP) turbine 116 and a low pressure (LP) turbine 118; and a jet exhaust nozzle section 120. The compressor section, combustion section 114, and turbine section together define at least in part a core air flowpath 121 extending from the annular inlet 108 to the jet nozzle exhaust section 120. The turbofan engine further includes one or more drive shafts. More specifically, the turbofan engine includes a high pressure (HP) shaft or spool 122 drivingly connecting the HP turbine 116 to the HP compressor 112, and a low pressure (LP) shaft or spool 124 drivingly connecting the LP turbine 118 to the LP compressor 110.

For the embodiment depicted, the fan section 102 includes a fan 126 having a plurality of fan blades 128 coupled to a disk 130 in a spaced apart manner. The plurality of fan blades 128 and disk 130 are together rotatable about the centerline axis 101 by the LP shaft 124. The disk 130 is covered by a rotatable front hub 132 aerodynamically contoured to promote an airflow through the plurality of fan blades 128. Further, an annular fan casing or outer nacelle 134 is provided, circumferentially surrounding the fan 126 and/or at least a portion of the turbomachine 104. The nacelle 134 is supported relative to the turbomachine 104 by a plurality of circumferentially-spaced outlet guide vanes 136. A downstream section 138 of the nacelle 134 extends over an outer portion of the turbomachine 104 so as to define a bypass airflow passage 140 therebetween.

In such a manner, it will be appreciated that turbofan engine 100 generally includes a first stream (e.g., core air flowpath 121) and a second stream (e.g., bypass airflow passage 140) extending parallel to the first stream. In certain exemplary embodiments, the turbofan engine 100 may further define a third stream extending, e.g., from the LP compressor 110 to the bypass airflow passage 140 or to ambient. With such a configuration, the LP compressor 110 may generally include a first compressor stage configured as a ducted mid-fan and downstream compressor stages. An inlet to the third stream may be positioned between the first compressor stage and the downstream compressor stages.

Referring still to FIG. 1, the turbofan engine 100 additionally includes an accessory gearbox 142 and a fuel delivery system 146. The fuel delivery system 146 may be an aircraft fuel supply, such as an aircraft fuel supply for a propulsion system for an aircraft. For the embodiment shown, the accessory gearbox 142 is located within the cowling/outer casing 106 of the turbomachine 104. Additionally, it will be appreciated that for the embodiment depicted schematically in FIG. 1, the accessory gearbox 142 is mechanically coupled to, and rotatable with, one or more shafts or spools of the turbomachine 104. For example, in the exemplary embodiment depicted, the accessory gearbox 142 is mechanically coupled to, and rotatable with, the HP shaft 122 through a suitable geartrain 144. The accessory gearbox 142 may provide power to one or more suitable accessory systems of the turbofan engine 100 during at least certain operations, and may further provide power back to the turbofan engine 100 during other operations. For example, the accessory gearbox 142 is, for the embodiment depicted, coupled to a starter motor/generator 152. The starter motor/generator may be configured to extract power from the accessory gearbox 142 and turbofan engine 100 during certain operation to generate electrical power, and may provide power back to the accessory gearbox 142 and turbofan engine 100 (e.g., to the HP shaft 122) during other operations to add mechanical work back to the turbofan engine 100 (e.g., for starting the turbofan engine 100).

Moreover, the fuel delivery system 146 generally includes a fuel source 148, such as a fuel tank, and one or more fuel delivery lines 150. The one or more fuel delivery lines 150 provide a fuel flow through the fuel delivery system 146 to the combustion section 114 of the turbomachine 104 of the turbofan engine 100. As will be discussed in more detail below, the combustion section 114 includes an integrated fuel cell and combustor assembly 200. The one or more fuel delivery lines 150, for the embodiment depicted, provide a flow of fuel to the integrated fuel cell and combustor assembly 200.

It will be appreciated, however, that the exemplary turbofan engine 100 depicted in FIG. 1 is provided by way of example only. In other exemplary embodiments, any other suitable gas turbine engine may be utilized with aspects of the present disclosure. For example, in other embodiments, the turbofan engine may be any other suitable gas turbine engine, such as a turboshaft engine, turboprop engine, turbojet engine, etc. In such a manner, it will further be appreciated that in other embodiments the gas turbine engine may have any other suitable configuration, such as any other suitable number or arrangement of shafts, compressors, turbines, fans, etc. Further, although the exemplary gas turbine engine depicted in FIG. 1 is shown schematically as a direct drive, fixed-pitch turbofan engine, in other embodiments, a gas turbine engine of the present disclosure may be a geared gas turbine engine (i.e., including a gearbox between the fan 126 and a shaft driving the fan, such as the LP shaft 124), may be a variable pitch gas turbine engine (i.e., including a fan 126 having a plurality of fan blades 128 rotatable about their respective pitch axes), etc. Moreover, although the exemplary turbofan engine 100 includes a ducted fan 126, in other exemplary aspects, the turbofan engine 100 may include an unducted fan 126 (or open rotor fan), without the nacelle 134. Further, although not depicted herein, in other embodiments the gas turbine engine may be any other suitable type of gas turbine engine, such as a nautical gas turbine engine.

Figure 2:
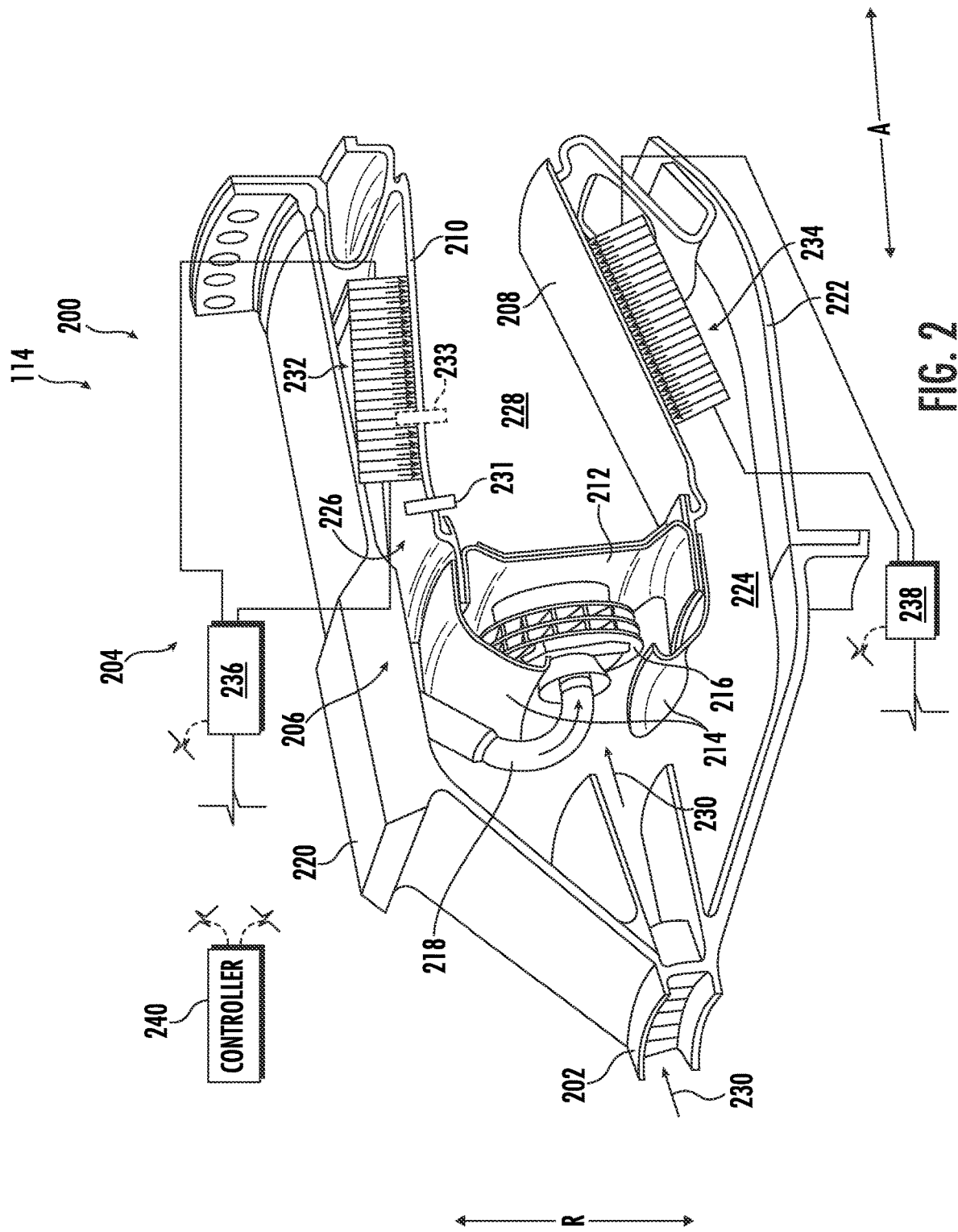
FIG. 2 is a perspective view of an integrated fuel cell and combustor assembly in accordance with the present disclosure.

(ii) Embodiment of FIG. 2

Referring now to FIG. 2, illustrated schematically is a portion of the combustion section 114 including a portion of the integrated fuel cell and combustor assembly 200 used in the gas turbine engine 100 of FIG. 1 (described as a turbofan engine 100 above with respect to FIG. 1), according to an embodiment of the present disclosure.

As will be appreciated, the combustion section 114 includes a compressor diffuser nozzle 202 and extends between an upstream end and a downstream end generally along the axial direction A. The combustion section 114 is fluidly coupled to the compressor section at the upstream end via the compressor diffuser nozzle 202 and to the turbine section at the downstream end.

The integrated fuel cell and combustor assembly 200 generally includes a fuel cell assembly 204 (only partially depicted in FIG. 2; see also FIGS. 3 through 5) and a combustor 206. The combustor 206 includes an inner liner 208, an outer liner 210, a dome assembly 212, a cowl assembly 214, a swirler assembly 216, and a fuel flowline 218. The combustion section 114 generally includes an outer casing 220 outward of the combustor 206 along the radial direction R to enclose the combustor 206 and an inner casing 222 inward of the combustor 206 along the radial direction R. The inner casing 222 and inner liner 208 define an inner passageway 224 therebetween, and the outer casing 220 and outer liner 210 define an outer passageway 226 therebetween. The inner casing 222, the outer casing 220, and the dome assembly 212 together define at least in part a combustion chamber 228 of the combustor 206.

The dome assembly 212 is disposed proximate the upstream end of the combustion section 114 (i.e., closer to the upstream end than the downstream end) and includes an opening (not labeled) for receiving and holding the swirler assembly 216. The swirler assembly 216 also includes an opening for receiving and holding the fuel flowline 218. The fuel flowline 218 is further coupled to the fuel source 148 (see FIG. 1) disposed outside the outer casing 220 along the radial direction R and configured to receive the fuel from the fuel source 148. In such a manner, the fuel flowline 218 may be fluidly coupled to the one or more fuel delivery lines 150 described above with reference to FIG. 1.

The swirler assembly 216 can include a plurality of swirlers (not shown) configured to swirl the compressed fluid before injecting it into the combustion chamber 228 to generate combustion gas. The cowl assembly 214, in the embodiment depicted, is configured to hold the inner liner 208, the outer liner 210, the swirler assembly 216, and the dome assembly 212 together.

During operation, the compressor diffuser nozzle 202 is configured to direct a compressed fluid 230 from the compressor section to the combustor 206, where the compressed fluid 230 is configured to be mixed with fuel within the swirler assembly 216 and combusted within the combustion chamber 228 to generate combustion gasses. The combustion gasses are provided to the turbine section to drive one or more turbines of the turbine section (e.g., the high pressure turbine 116 and low pressure turbine 118).

During operation of the gas turbine engine 100 including the integrated fuel cell and combustor assembly 200, a flame within the combustion chamber 228 is maintained by a continuous flow of fuel and air. In order to provide for an ignition of the fuel and air, e.g., during a startup of the gas turbine engine 100, the integrated fuel cell and combustor assembly 200 further includes an ignitor 231. The ignitor 231 may provide a spark or initial flame to ignite a fuel and air mixture within the combustion chamber 228. In certain exemplary embodiments, the integrated fuel cell and combustor assembly 200 may additionally include a dedicated fuel cell ignitor 233 (depicted in phantom). In particular, for the embodiment of FIG. 2, the dedicated fuel cell ignitor 233 is positioned downstream of at least a portion of a fuel cell, and in particular of a fuel cell stack (described below). In such a manner, the dedicated fuel cell ignitor 233 may more effectively combust output products of the fuel cell.

As mentioned above and depicted schematically in FIG. 2, the integrated fuel cell and combustor assembly 200 further includes the fuel cell assembly 204. The exemplary fuel cell assembly 204 depicted includes a first fuel cell stack 232 and a second fuel cell stack 234. More specifically, the first fuel cell stack 232 is configured with the outer liner 210 and the second fuel cell stack 234 is configured with the inner liner 208. More specifically, still, the first fuel cell stack 232 is integrated with the outer liner 210 and the second fuel cell stack 234 is integrated with the inner liner 208. Operation of the fuel cell assembly 204, and more specifically of a fuel cell stack (e.g., first fuel cell stack 232 or second fuel cell stack 234) of the fuel cell assembly 204 will be described in more detail below.

For the embodiment depicted, the fuel cell assembly 204 is configured as a solid oxide fuel cell ("SOFC") assembly, with the first fuel cell stack 232 configured as a first SOFC fuel cell stack and the second fuel cell stack 234 configured as a second SOFC fuel cell stack (each having a plurality of SOFC's). As will be appreciated, a SOFC is generally an electrochemical conversion device that produces electricity directly from oxidizing a fuel. In generally, fuel cell assemblies, and in particular fuel cells, are characterized by an electrolyte material utilized. The SOFC's of the present disclosure may generally include a solid oxide or ceramic electrolyte. This class of fuel cells generally exhibit high combined heat and power efficiency, long-term stability, fuel flexibility, and low emissions.

Moreover, the exemplary fuel cell assembly 204 further includes a first power converter 236 and a second power converter 238. The first fuel cell stack 232 is in electrical communication with the first power converter 236 by a first plurality of power supply cables (not labeled), and the second fuel cell stack 234 is in electrical communication with the second power converter 238 by a second plurality of power supply cables (not labeled).

The first power converter 236 controls the electrical current drawn from the corresponding first fuel cell stack 232 and may convert the electrical power from a direct current ("DC") power to either DC power at another voltage level or alternating current ("AC") power. Similarly, the second power converter 238 controls the electrical current drawn from the second fuel cell stack 234 and may convert the electrical power from a DC power to either DC power at another voltage level or AC power. The first power converter 236, the second power converter 238, or both may be electrically coupled to an electric bus (such as the electric bus 326 described below).

The integrated fuel cell and combustor assembly 200 further includes a fuel cell controller 240 that is in operable communication with both of the first power converter 236 and second power converter 238 to, e.g., send and receive communications and signals therebetween. For example, the fuel cell controller 240 may send current or power setpoint signals to the first power converter 236 and second power converter 238, and may receive, e.g., a voltage or current feedback signal from the first power converter 236 and second power converter 238. The fuel cell controller 240 may be configured in the same manner as the fuel cell controller 240 described below with reference to FIG. 5.

Figure 4:
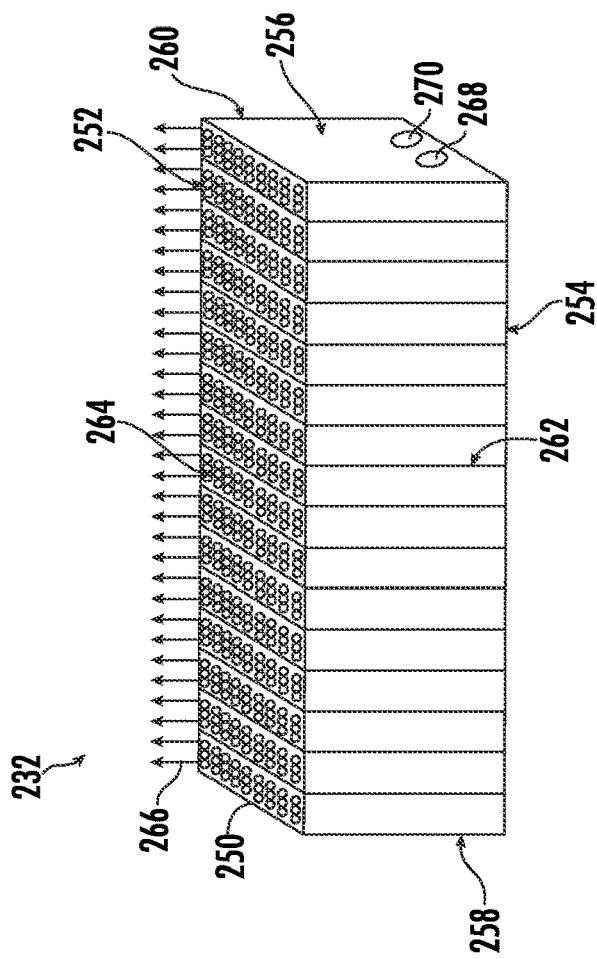
FIG. 4 is a schematic view of a fuel cell of a fuel cell assembly in accordance with an exemplary aspect of the present disclosure as may be incorporated into the exemplary integrated fuel cell and combustor assembly of FIG. 2.
Figure 3:
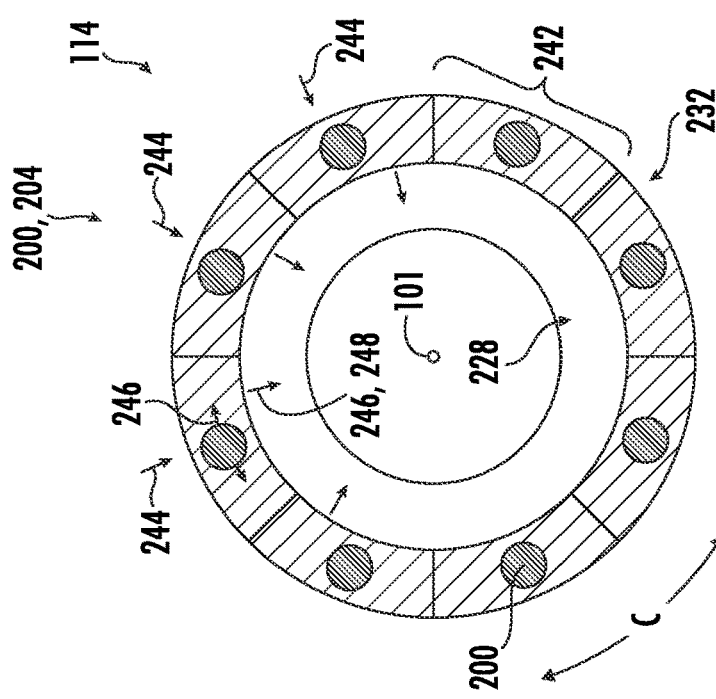
FIG. 3 is a schematic, axial view of the exemplary integrated fuel cell and combustor assembly of FIG. 2.

(iii) Embodiment of FIGS. 3 and 4

It will be appreciated that in at least certain exemplary embodiments the first fuel cell stack 232, the second fuel cell stack 234, or both may extend substantially 360 degrees in a circumferential direction C of the gas turbine engine (i.e., a direction extending about the centerline axis 101 of the gas turbine engine 100). For example, referring now to FIG. 3, a simplified cross-sectional view of the integrated fuel cell and combustor assembly 200 is depicted according to an exemplary embodiment of the present disclosure. Although only the first fuel cell stack 232 is depicted in FIG. 3 for simplicity, the second fuel cell stack 234 may be configured in a similar manner.

As shown, the first fuel cell stack 232 extends around the combustion chamber 228 in the circumferential direction C, completely encircling the combustion chamber 228 around the centerline axis 101 in the embodiment shown. More specifically, the first fuel cell stack 232 includes a plurality of fuel cells 242 arranged along the circumferential direction C. The fuel cells 242 that are visible in FIG. 3 can be a single ring of fuel cells 242, with fuel cells 242 stacked together along the axial direction A (see FIG. 2) to form the first fuel cell stack 232. In another instance, multiple additional rings of fuel cells 242 can be placed on top of each other to form the first fuel cell stack 232 that is elongated along the centerline axis 101.

As will be explained in more detail, below, with reference to FIG. 5, the fuel cells 242 in the first fuel cell stack 232 are positioned to receive discharged air 244 from, e.g., the compressor section and fuel 246 from the fuel delivery system 146. The fuel cells 242 generate electrical current using this air 244 and at least some of this fuel 246, and radially direct partially oxidized fuel 246 and unused portion of air 248 into the combustion chamber 228 toward the centerline axis 101. The integrated fuel cell and combustor assembly 200 combusts the partially oxidized fuel 246 and air 248 in the combustion chamber 228 into combustion gasses that are directed downstream into the turbine section to drive or assist with driving the one or more turbines therein.

Moreover, referring now to FIG. 4, a schematic illustration is provided as a perspective view of the first fuel cell stack 232 of the integrated fuel cell and combustor assembly 200 of FIG. 2. The second fuel cell stack 234 may be formed in a similar manner.

The first fuel cell stack 232 depicted includes a housing 250 having a combustion outlet side 252 and a side 254 that is opposite to the combustion outlet side 252, a fuel and air inlet side 256 and a side 258 that is opposite to the fuel and air inlet side 256, and sides 260, 262. The side 260, the side 258, and the side 254 are not visible in the perspective view of FIG. 4.

As will be appreciated, the first fuel cell stack 232 may include a plurality of fuel cells that are "stacked," e.g., side-by-side from one end of the first fuel cell stack 232 (e.g., fuel and air inlet side 256) to another end of the first fuel cell stack 232 (e.g., side 258). As such, it will further be appreciated that the combustion outlet side 252 includes a plurality of combustion outlets 264, each from a fuel cell of the first fuel cell stack 232. During operation, combustion gas 266 (also referred to herein as "output products") is directed from the combustion outlets 264 out of the housing 250. As described herein, the combustion gas 266 is generated using fuel and air that is not consumed by the fuel cells inside the housing 250 of the first fuel cell stack 232. The combustion gas 266 is provided to the combustion chamber 228 and burned during operation to generate combustion gasses used to generate thrust for the gas turbine engine 100 (and vehicle/aircraft incorporating the gas turbine engine 100).

The fuel and air inlet side 256 includes one or more fuel inlets 268 and one or more air inlets 270. Optionally, one or more of the inlets 268, 270 can be on another side of the housing 250. Each of the one or more fuel inlets 268 is fluidly coupled with a source of fuel for the first fuel cell stack 232, such as one or more pressurized containers of a hydrogen-containing gas or a fuel processing unit as described further below. Each of the one or more air inlets 270 is fluidly coupled with a source of air for the fuel cells, such as air that is discharged from a compressor section and/or an air processing unit as is also described further below. The one or more inlets 268, 270 separately receive the fuel and air from the external sources of fuel and air, and separately direct the fuel and air into the fuel cells.

In certain exemplary embodiments, the first fuel cell stack 232 of FIGS. 2 through 4 may be configured in a similar manner to one or more of the exemplary fuel cell systems (labeled 100) described in, e.g., U.S. Patent Application Publication No. 2020/0194799 A1, filed Dec. 17, 2018, that is incorporated by reference herein in its entirety. It will further be appreciated that the second fuel cell stack 234 of FIG. 2, may be configured in a similar manner as the first fuel cell stack 232, or alternatively may be configured in any other suitable manner.

Figure 5:
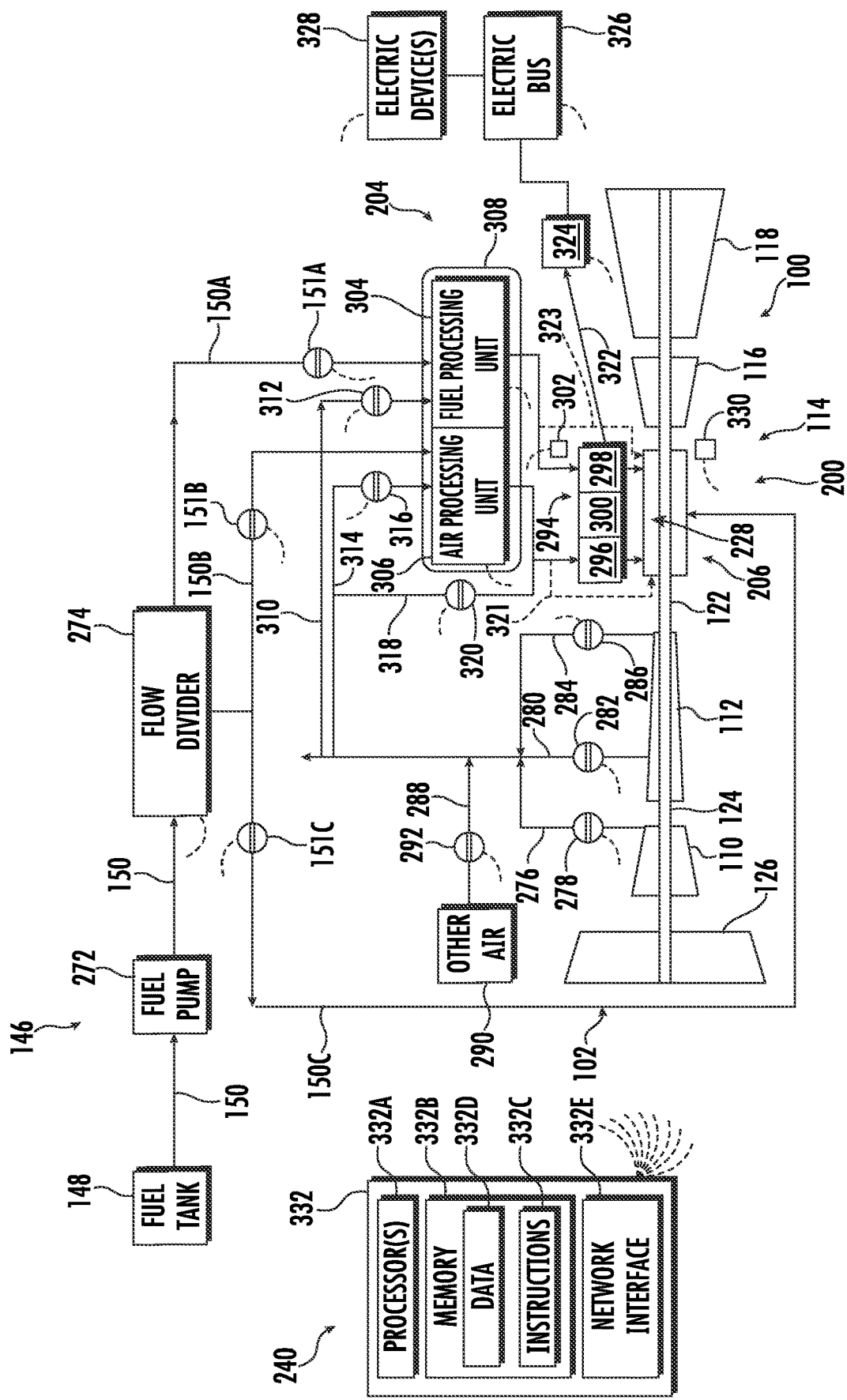
FIG. 5 is a schematic diagram of a gas turbine engine including an integrated fuel cell and combustor assembly in accordance with an exemplary aspect of the present disclosure.

(iv) Embodiment of FIG. 5

Referring now to FIG. 5, operation of an integrated fuel cell and combustor assembly 200 in accordance with an exemplary embodiment of the present disclosure will be described. More specifically, FIG. 5 provides a schematic illustration of a gas turbine engine 100 and an integrated fuel cell and combustor assembly 200 according to an embodiment of the present disclosure. The gas turbine engine 100 and integrated fuel cell and combustor assembly 200 may, in certain exemplary embodiments, be configured in a similar manner as one or more of the exemplary embodiments of FIGS. 1 through 4.

Accordingly, it will be appreciated that the gas turbine engine 100 generally includes a fan section 102 having a fan 126, an LP compressor 110, an HP compressor 112, a combustion section 114, an HP turbine 116, and an LP turbine 118. The combustion section 114 generally includes the integrated fuel cell and combustor assembly 200 having a combustor 206 and a fuel cell assembly 204.

A propulsion system including the gas turbine engine 100 further includes a fuel delivery system 146. The fuel delivery system 146 generally includes a fuel source 148 and one or more fuel delivery lines 150. The fuel source 148 may include a supply of fuel (e.g., a hydrocarbon fuel, including, e.g., a carbon-neutral fuel or synthetic hydrocarbons) for the gas turbine engine 100. In addition, it will be appreciated that the fuel delivery system 146 also includes a fuel pump 272 and a flow divider 274, and the one or more fuel delivery lines 150 include a first fuel delivery line 150A, a second fuel delivery line 150B, and a third fuel delivery line 150C. The flow divider 274 divides the fuel flow from the fuel source 148 and fuel pump 272 into a first fuel flow through the first fuel delivery line 150A to the fuel cell assembly 204, a second fuel flow through the second fuel delivery line 150B also to the fuel cell assembly 204 (and in particular to an air processing unit, described below), and a third fuel flow through a third fuel delivery line 150C to the combustor 206. The flow divider 274 may include a series of valves (not shown) to facilitate such dividing of the fuel flow from the fuel source 148, or alternatively may be of a fixed geometry. Additionally, for the embodiment shown, the fuel delivery system 146 includes a first fuel valve 151A associated with the first fuel delivery line 150A (e.g., for controlling the first fuel flow), a second fuel valve 151B associated with the second fuel delivery line 150B (e.g., for controlling the second fuel flow), and a third fuel valve 151C associated with the third fuel delivery line 150C (e.g., for controlling the third fuel flow).

The gas turbine engine 100 further includes a compressor bleed system and an airflow delivery system. More specifically, the compressor bleed system includes an LP bleed air duct 276 and an associated LP bleed air valve 278, an HP bleed air duct 280 and an associated HP bleed air valve 282, an HP exit air duct 284 and an associated HP exit air valve 286.

The gas turbine engine 100 further includes an air stream supply duct 288 (in airflow communication with an airflow supply 290) and an associated air valve 292, which is also in airflow communication with the airflow delivery system for providing compressed airflow to the fuel cell assembly 204 of the integrated fuel cell and combustor assembly 200. The airflow supply may be, e.g., a second gas turbine engine configured to provide a cross-bleed air, an auxiliary power unit (APU) configured to provide a bleed air, a ram air turbine (RAT), an ambient location (e.g., a freestream air), etc. The airflow supply may be complimentary to the compressor bleed system if the compressor air source is inadequate or unavailable.

The compressor bleed system (and air stream supply duct 288) is in airflow communication with airflow delivery system for providing compressed airflow to the fuel cell assembly 204, as will be explained in more detail below.

Referring still to FIG. 5, the fuel cell assembly 204 of the integrated fuel cell and combustor assembly 200 includes a fuel cell stack 294, which may be configured in a similar manner as, e.g., the first fuel cell stack 232 described above. The fuel cell stack 294 is depicted schematically as a single fuel cell having a cathode side 296 (also referred to herein as "cathode 296"), an anode side 298 (also referred to herein as "anode 298"), and an electrolyte 300 (also referred to as an electrolyte layer) positioned therebetween. As will generally be appreciated, the electrolyte 300 may, during operation, conduct negative oxygen ions from the cathode side 296 to the anode side 298 to generate an electric current and electric power.

Briefly, it will be appreciated that the fuel cell assembly 204 further includes a fuel cell sensor 302 configured to sense data indicative of a fuel cell assembly operating parameter, such as a temperature of the fuel cell stack 294 (e.g., of the cathode side 296 or anode side 298 of the fuel cell), a pressure within the fuel cell stack 294 (e.g., of within the cathode side 296 or anode side 298 of the fuel cell), and/or a composition (e.g., a chemical composition) of the output products from the fuel cell assembly 204.

The anode side 298 may support electrochemical reactions that generate electricity. A fuel may be oxidized in the anode side 298 with oxygen ions received from the cathode side 296 via diffusion through the electrolyte 300. The reactions may create heat, steam, and electricity in the form of free electrons in the anode side 298, which may be used to supply power to an energy consuming device (such as the one or more additional electric devices 328 described below). The oxygen ions may be created via an oxygen reduction of a cathode oxidant using the electrons returning from the energy consuming device into the cathode side 296.

The cathode side 296 may be coupled to a source of the cathode oxidant, such as oxygen in the atmospheric air. The cathode oxidant is defined as the oxidant that is supplied to the cathode side 296 employed by the fuel cell system in generating electrical power. The cathode side 296 may be permeable to the oxygen ions received from the cathode oxidant.

The electrolyte 300 may be in communication with the anode side 298 and the cathode side 296. The electrolyte 300 may pass the oxygen ions from the cathode side 296 to the anode side 298, and may have little or no electrical conductivity, so as to prevent passage of the free electrons from the cathode side 296 to the anode side 298.

The anode side of a solid oxide fuel cell (such as the fuel cell stack 294) may be composed of a nickel/yttria-stabilized zirconia (Ni/YSZ) cermet. Nickel in the anode side serves as a catalyst for fuel oxidation and current conductor. During normal operation of the fuel cell stack 294, the operating temperature may be greater than or equal to about 700° C., and the nickel (Ni) in the anode remains in its reduced form due to the continuous supply of primarily hydrogen fuel gas.

The fuel cell stack 294 is disposed downstream of the LP compressor 110, the HP compressor 112, or both. Further, as will be appreciated from the description above with respect to FIG. 2, the fuel cell stack 294 may be coupled to or otherwise integrated with a liner of the combustor 206 (e.g., an inner liner 208 or an outer liner 210). In such a manner, the fuel cell stack 294 may also be arranged upstream of the combustion chamber 228 of the integrated fuel cell and combustor assembly 200, and further upstream of the HP turbine 116 and LP turbine 118.

As shown in FIG. 5, the fuel cell assembly 204 also includes a fuel processing unit 304 and an air processing unit 306. The fuel processing unit 304 may be any suitable structure for generating a hydrogen rich fuel stream. For example, the fuel processing unit 304 may include a fuel reformer or a catalytic partial oxidation convertor (CPOx) for developing the hydrogen rich fuel stream for the fuel cell stack 294. The air processing unit 306 may be any suitable structure for raising the temperature of air that is provided thereto to a temperature high enough to enable fuel cell temperature control (e.g., about 600° C. to about 800° C.). For example, in the embodiment depicted, the air processing unit includes a preburner system, operating based on a fuel flow through the second fuel delivery line 150B, configured for raising the temperature of the air through combustion, e.g., during transient conditions such as startup, shutdown and abnormal situations.

In the exemplary embodiment depicted, the fuel processing unit 304 and air processing unit 306 are manifolded together within a housing 308 to provide conditioned air and fuel to the fuel cell stack 294.

It should be appreciated, however, that the fuel processing unit 304 may additionally or alternatively include any suitable type of fuel reformer, including but not limited to a catalytic partial oxidizer, an autothermal reformer, or a steam reformer that may need an additional stream of steam inlet with higher hydrogen composition at the reformer outlet stream. Additionally, or alternatively, still, the fuel processing unit 304 may include a reformer integrated with the fuel cell stack 294. Similarly, it should be appreciated that the air processing unit 306 of FIG. 5 could alternatively be a heat exchanger or another device for raising the temperature of the air provided thereto to a temperature high enough to enable fuel cell temperature control (e.g., about 600° C. to about 800° C.).

As mentioned above, the compressor bleed system (and air stream supply duct 288) is in airflow communication with airflow delivery system for providing compressed airflow to the fuel cell assembly 204. The airflow delivery system includes an anode airflow duct 310 and an associated anode airflow valve 312 for providing an airflow to the fuel processing unit 304, a cathode airflow duct 314 and associated cathode airflow valve 316 for providing an airflow to the air processing unit 306, and a cathode bypass air duct 318 and an associated cathode bypass air valve 320 for providing an airflow directly to the fuel cell stack 294 (or rather to the cathode side 296 of the fuel cell(s)). The fuel delivery system 146 is configured to provide the first flow of fuel through the first fuel delivery line 150A to the fuel processing unit 304, and the second flow of fuel through the second fuel delivery line 150B to the air processing unit 306 (e.g., as fuel for a preburner system, if provided).

The fuel cell stack 294 outputs the power produced as a fuel cell power output 322. Further, the fuel cell stack 294 directs a cathode air discharge and an anode fuel discharge (neither labeled for clarity purposes) into the combustion chamber 228 of the combustor 206.

In operation, the air processing unit 306 is configured to heat/cool a portion of the compressed air, incoming through the cathode airflow duct 314, to generate a processed air to be directed into the fuel cell stack 294 to facilitate the functioning of the fuel cell stack 294. The air processing unit 306 receives the second flow of fuel from the second fuel delivery line 150B and may, e.g., combust such second flow of fuel to heat the air received to a desired temperature (e.g., about 600° C. to about 800° C.) to facilitate the functioning of the fuel cell stack 294. The air processed by the air processing unit 306 is directed into the fuel cell stack 294. In an embodiment of the disclosure, as is depicted, the cathode bypass air duct 318 and the air processed by the air processing unit 306 may combine into a combined air stream to be fed into a cathode 296 of the fuel cell stack 294.

Further, as shown in the embodiment of FIG. 5, the first flow of fuel through the first fuel delivery line 150A is directed to the fuel processing unit 304 for developing a hydrogen rich fuel stream (e.g., optimizing a hydrogen content of a fuel stream), to also be fed into the fuel cell stack 294. As will be appreciated, and as discussed below, the flow of air (processed air and bypass air) to the fuel cell stack 294 (e.g., the cathode side 296) and fuel from the fuel processing unit 304 to the fuel cell stack 294 (e.g., the anode side 298) may facilitate electrical power generation.

Because the inlet air for the fuel cell stack 294 may come solely from the upstream compressor section without any other separately controlled air source, it will be appreciated that the inlet air for the fuel cell stack 294 discharged from the compressor section is subject to the air temperature changes that occur at different flight stages. By way of illustrative example only, the air within a particular location in the compressor section of the gas turbine engine 100 may work at 200° C. during idle, 600° C. during take-off, 268° C. during cruise, etc. This type of temperature change to the inlet air directed to the fuel cell stack 294 may lead to significant thermal transient issues (or even thermal shock) to the ceramic materials of the fuel cell stack 294, which could range from cracking to failure.

Thus, by fluidly connecting the air processing unit 306 between the compressor section and the fuel cell stack 294, the air processing unit 306 may serve as a control device or system to maintain the air processed by the air processing unit 306 and directed into the fuel cell stack 294 within a desired operating temperature range (e.g., plus or minus 100° C., or preferably plus or minus 50° C., or plus or minus 20° C.). In operation, the temperature of the air that is provided to the fuel cell stack 294 can be controlled (relative to a temperature of the air discharged from the compressor section) by controlling the flow of fuel to the air processing unit 306. By increasing a fuel flow to the air processing unit 306, a temperature of the airflow to the fuel cell stack 294 may be increased. By decreasing the fuel flow to the air processing unit 306, a temperature of the airflow to the fuel cell stack 294 may be decreased. Optionally, no fuel can be delivered to the air processing unit 306 to prevent the air processing unit 306 from increasing and/or decreasing the temperature of the air that is discharged from the compressor section and directed into the air processing unit 306.

Moreover, as is depicted in phantom, the fuel cell assembly 204 further includes an airflow bypass duct 321 extending around the fuel cell to allow a portion or all of an airflow conditioned by the air processing unit 306 (and combined with any bypass air through duct 318) to bypass the cathode side 296 of the fuel cell and go directly to the combustion chamber 228. The airflow bypass duct 321 may be in thermal communication with the fuel cell. The fuel cell assembly further includes a fuel bypass duct 323 extending around the fuel cell to allow a portion or all of a reformed fuel from the fuel processing unit 304 to bypass the anode side 298 of the fuel cell and go directly to the combustion chamber 228.

As briefly mentioned above, the fuel cell stack 294 converts the anode fuel stream from the fuel processing unit 304 and air processed by the air processing unit 306 sent into the fuel cell stack 294 into electrical energy, the fuel cell power output 322, in the form of DC current. This fuel cell power output 322 is directed to a power convertor 324 in order to change the DC current into DC current or AC current that can be effectively utilized by one or more subsystems. In particular, for the embodiment depicted, the electrical power is provided from the power converter to an electric bus 326. The electric bus 326 may be an electric bus dedicated to the gas turbine engine 100, an electric bus of an aircraft incorporating the gas turbine engine 100, or a combination thereof. The electric bus 326 is in electric communication with one or more additional electrical devices 328, which may be a power source, a power sink, or both. For example, the additional electrical devices 328 may be a power storage device (such as one or more batteries), an electric machine (an electric generator, an electric motor, or both), an electric propulsion device, etc. For example, the one or more additional electric devices 328 may include the starter motor/generator of the gas turbine engine 100.

Referring still to FIG. 5, the gas turbine engine 100 further includes a sensor 330. In the embodiment shown, the sensor 330 may be configured to sense data indicative of a flame within the combustion section 114 of the gas turbine engine 100, or some other parameter indicating an operating condition of the gas turbine engine. The sensor 330 may be, for example, a temperature sensor configured to sense data indicative of an exit temperature of the combustion section 114, an inlet temperature of the turbine section, an exhaust gas temperature, or a combination thereof. Additionally, or alternatively, the sensor 330 may be any other suitable sensor, or any suitable combination of sensors, configured to sense one or more gas turbine engine operating conditions or parameters, including data indicative of a flame within the combustion section 114 of the gas turbine engine 100.

Moreover, as is further depicted schematically in FIG. 5, the propulsion system, an aircraft including the propulsion system, or both, includes a controller 240. For example, the controller 240 may be a standalone controller, a gas turbine engine controller (e.g., a full authority digital engine control, or FADEC, controller), an aircraft controller, supervisory controller for a propulsion system, a combination thereof, etc.

The controller 240 is operably connected to the various sensors, valves, etc. within at least one of the gas turbine engine 100 and the fuel delivery system 146. More specifically, for the exemplary aspect depicted, the controller 240 is operably connected to the valves of the compressor bleed system (valves 278, 282, 286), the airflow delivery system (valves 312, 316, 320), and the fuel delivery system 146 (flow divider 274, valves 151A, 151B, 151C), as well as a sensor 330 of the gas turbine engine 100 and the fuel cell sensor 302. As will be appreciated from the description below, the controller 240 may be in wired or wireless communication with these components. In this manner, the controller 240 may receive data from a variety of inputs (including the gas turbine engine sensor 330 and the fuel cell sensor 302), may make control decisions, and may provide data (e.g., instructions) to a variety of output (including the valves of the compressor bleed system to control an airflow bleed from the compressor section, the airflow delivery system to direct the airflow bled from the compressor section, and the fuel delivery system 146 to direct the fuel flow within the gas turbine engine 100).

Referring particularly to the operation of the controller 240, in at least certain embodiments, the controller 240 can include one or more computing device(s) 332. The computing device(s) 332 can include one or more processor(s) 332A and one or more memory device(s) 332B. The one or more processor(s) 332A can include any suitable processing device, such as a microprocessor, microcontroller, integrated circuit, logic device, and/or other suitable processing device. The one or more memory device(s) 332B can include one or more computer-readable media, including, but not limited to, non-transitory computer-readable media, RAM, ROM, hard drives, flash drives, and/or other memory devices.

The one or more memory device(s) 332B can store information accessible by the one or more processor(s) 332A, including computer-readable instructions 332C that can be executed by the one or more processor(s) 332A. The instructions 332C can be any set of instructions that when executed by the one or more processor(s) 332A, cause the one or more processor(s) 332A to perform operations. In some embodiments, the instructions 332C can be executed by the one or more processor(s) 332A to cause the one or more processor(s) 332A to perform operations, such as any of the operations and functions for which the controller 240 and/or the computing device(s) 332 are configured, the operations for operating a propulsion system (e.g., method 600), as described herein, and/or any other operations or functions of the one or more computing device(s) 332. The instructions 332C can be software written in any suitable programming language or can be implemented in hardware. Additionally, and/or alternatively, the instructions 332C can be executed in logically and/or virtually separate threads on processor(s) 332A. The memory device(s) 332B can further store data 332D that can be accessed by the processor(s) 332A. For example, the data 332D can include data indicative of power flows, data indicative of gas turbine engine 100/aircraft operating conditions, and/or any other data and/or information described herein.

The computing device(s) 332 also includes a network interface 332E configured to communicate, for example, with the other components of the gas turbine engine 100 (such as the valves of the compressor bleed system (valves 278, 282, 286), the airflow delivery system (valves 312, 316, 320), and the fuel delivery system 146 (flow divider 274, valves 151A, 151B, 151C), as well as the sensor 330 of the gas turbine engine 100 and the fuel cell sensor 302), the aircraft incorporating the gas turbine engine 100, etc. The network interface 332E can include any suitable components for interfacing with one or more network(s), including for example, transmitters, receivers, ports, controllers, antennas, and/or other suitable components. In such a manner, it will be appreciated that the network interface 332E may utilize any suitable combination of wired and wireless communications network(s).

The technology discussed herein makes reference to computer-based systems and actions taken by and information sent to and from computer-based systems. It will be appreciated that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

It will be appreciated that the gas turbine engine 100, the exemplary fuel delivery system 146, the exemplary integrated fuel cell and combustor assembly 200, and the exemplary fuel cell assembly 204 are provided by way of example only. In other embodiments, the integrated fuel cell and combustor assembly 200 and fuel cell assembly 204 may have any other suitable configuration. For example, in other exemplary embodiments, the fuel cell assembly 204 may include any other suitable fuel processing unit 304. Additionally, or alternatively, the fuel cell assembly 204 may not require a fuel processing unit 304, e.g., when the combustor of the gas turbine engine 100 is configured to burn hydrogen fuel and the fuel delivery assembly 146 is configured to provide hydrogen fuel to the integrated fuel cell and combustor assembly 200, and in particular to the fuel cell assembly 204.

(v) Introduction to Ground Start

As will be appreciated from the description herein, a ground start of a gas turbine engine including an integrated fuel cell and combustor assembly, such as one or more of the exemplary integrated fuel cell and combustor assemblies 200 described above with reference to FIGS. 1 through 5, may need to be executed in a coordinated manner so as to address various issues associated with startup times, environmental and safety standards, etc. As used herein, the term "ground start," with respect to a gas turbine engine refers to accelerating a gas turbine engine from an off position (or slow-rotating position, e.g., less than about 50 revolutions per minute) to at least a ground idle operation.

For example, as briefly mentioned above, in at least certain exemplary embodiments, an anode of a solid oxide fuel cell (SOFC) may consist of a porous cermet including nickel and yttria-stabilized zirconia. The nickel component may provide electrical conductivity, electrochemical capability, and fuel processing capability. The nickel component may also enhance certain mechanical properties of the fuel cell. However, nickel is a relatively unstable metal at high temperature, and in particular it is unstable in the presence of free oxygen at temperatures above approximately 350 degrees Celsius ("° C.") to 400° C. At normal operating temperatures of the fuel cell assembly of, e.g., 600° C. to 1000° C., the anode may need to be subjected to a reducing atmosphere with a partial pressure of oxygen below the nickel-nickel oxide equilibrium level. This may allow the nickel to remain in a reduced metallic state, without oxidizing the nickel. During SOFC startup and shutdown situations, the propensity of nickel to oxidize can cause structural and operational problems. If the nickel anode oxidizes to form a nickel oxide, an increase in volume and weight may occur, introducing undesired stresses in the anode structure. This can result in physical failure of the anode, an electrolyte of the fuel cell, or both. Further, after being converted to nickel oxide, the fuel cell may be unable to convert chemical energy into electrical energy efficiently and may be considered a failed part. Therefore, for a fuel cell having an anode made from nickel, there is a need to keep reducing gas in the fuel cell anode when the fuel cell anode temperature is above approximately 350° C.-400° C.

Additionally, if nickel (or nickel oxide) comes into contact with carbon monoxide at temperatures less than about 150° C. to about 230° C., nickel carbonyl may form. The chemical reaction is: $Ni+4CO \rightarrow Ni(CO)_4$. For environmental and safety reasons, such a reaction is undesirable.

Therefore, during a fuel cell assembly startup and shutdown, it may be necessary to protect an anode which contains nickel from oxidation and to prevent carbon monoxide containing gas from contacting the anode at temperatures below about 230° C. to ensure that no nickel carbonyl is formed.

Figure 6:
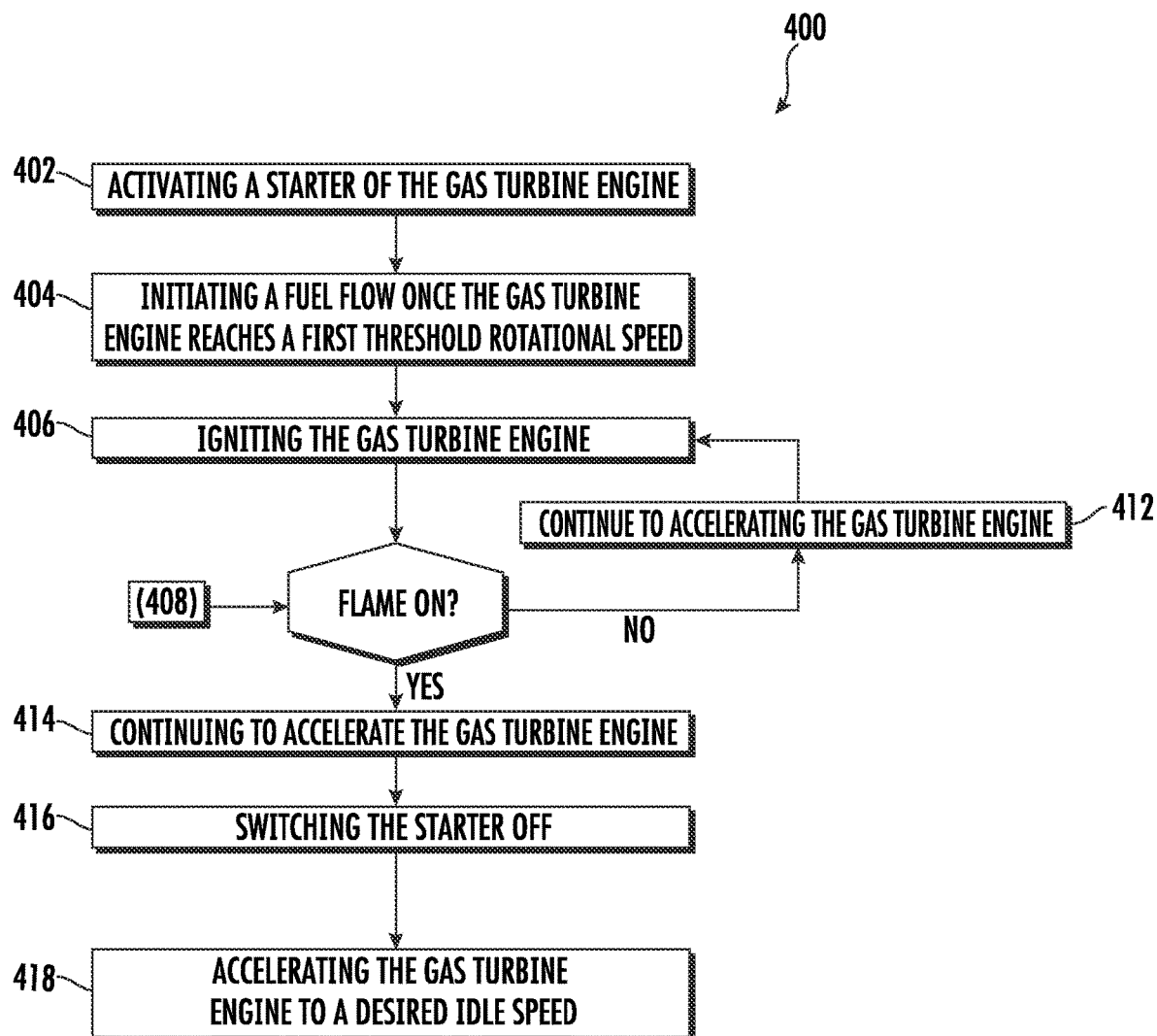
FIG. 6 is a flow diagram of a method for starting a gas turbine engine in accordance with an exemplary aspect of the present disclosure.

(vi) Embodiment FIG. 6; Gas Turbine Engine Start Process

As mentioned above, it may be desirable to coordinate a startup of a fuel cell assembly with a startup of a gas turbine engine with which the fuel cell assembly is operable. Such coordination will be described in more detail below with reference to subsequent Figures.

Referring first, however, to FIG. 6, a method 400 for starting a gas turbine engine is provided. In particular, the method 400 depicts a ground startup sequence for gas turbine engine which may be executed to accelerate the gas turbine engine from an off condition (e.g., rotating at zero RPM, or less than about 50 RPM), to a ground idle operating condition. The method 400 may be utilized with any suitable gas turbine engine, such as one or more of the exemplary gas turbine engines 100 described above, e.g., with reference to FIGS. 1 and 5.

The method 400 includes at (402) activating a starter of the gas turbine engine (e.g., turning the starter switch on). The starter activated at (402) may be configured in a similar manner as exemplary starter motor generator 152 of the exemplary gas turbine engine 100 of FIG. 1. The starter activated at (402) may generate an initial rotation of the gas turbine engine.

The method 400 further includes at (404) initiating a fuel flow once the gas turbine engine reaches a first threshold rotational speed. In the exemplary embodiment shown, the first threshold rotational speed may refer to a core speed between about 15% and 20% of a rated core speed. Core speed may generally refer to a rotational speed a high pressure spool, e.g., rotatable with a high pressure compressor and a high pressure turbine, of the gas turbine engine (see, e.g., HP compressor 112 and HP turbine 116 of FIG. 1).

Subsequently, the method 400 includes at (406) igniting the gas turbine engine. The gas turbine engine may include at (408) detecting via one or more sensors, such as a flame detector, a flame within a combustion section of the gas turbine engine. The method 400 may, using data from the flame detector at (408), determine at (410) whether or not a flame is present within a combustion section of the gas turbine engine, and more particularly within a combustion chamber of the gas turbine engine (see, e.g., combustion chamber 228 of the exemplary gas turbine engine 100 of FIG. 2). If no flame is detected, the method may at (412) continue accelerating the gas turbine engine to a higher rotational speed using the starter and retry ignition at (406). By contrast, however, if the flame is detected at (410), the method 400 includes at (414) continuing to accelerate the gas turbine engine. Accelerating the gas turbine engine at (414) may include a combination of providing power from the starter motor generator and utilizing energy input through fuel combustion.

It will be appreciated that in response to detecting the flame at (410), the gas turbine engine may be considered to be in a "flame on condition."

The method 400 includes at (416) switching the starter off. Switching off the starter at (416) may include switching off the starter in response to determining the gas turbine engine is rotating at a predetermined self-sustained speed. As soon as the starter is switched off at (416) and the gas turbine engine is rotating at a sufficient speed to sustain combustion within the combustion section (e.g., the predetermined self-sustained speed), the gas turbine engine may be considered to be in a "sustained flame on condition."

The method 400 further includes at (418) accelerating the gas turbine engine to a desired idle speed, such as a ground idle speed. Once at an idle speed, the gas turbine engine may be considered to be in a "idle condition." As will be appreciated, the term "idle" with respect to a speed of the gas turbine engine refers to a rotational speed for the gas turbine engine sufficient to sustain operations and, e.g., to power desired accessory systems for the gas turbine engine and, e.g., an aircraft with which the gas turbine engine is installed.

It will be appreciated that the exemplary method 400 for starting a gas turbine engine is provided by way of example only, and in other exemplary embodiments, any other suitable method may be provided for starting a gas turbine engine.

Figure 7:
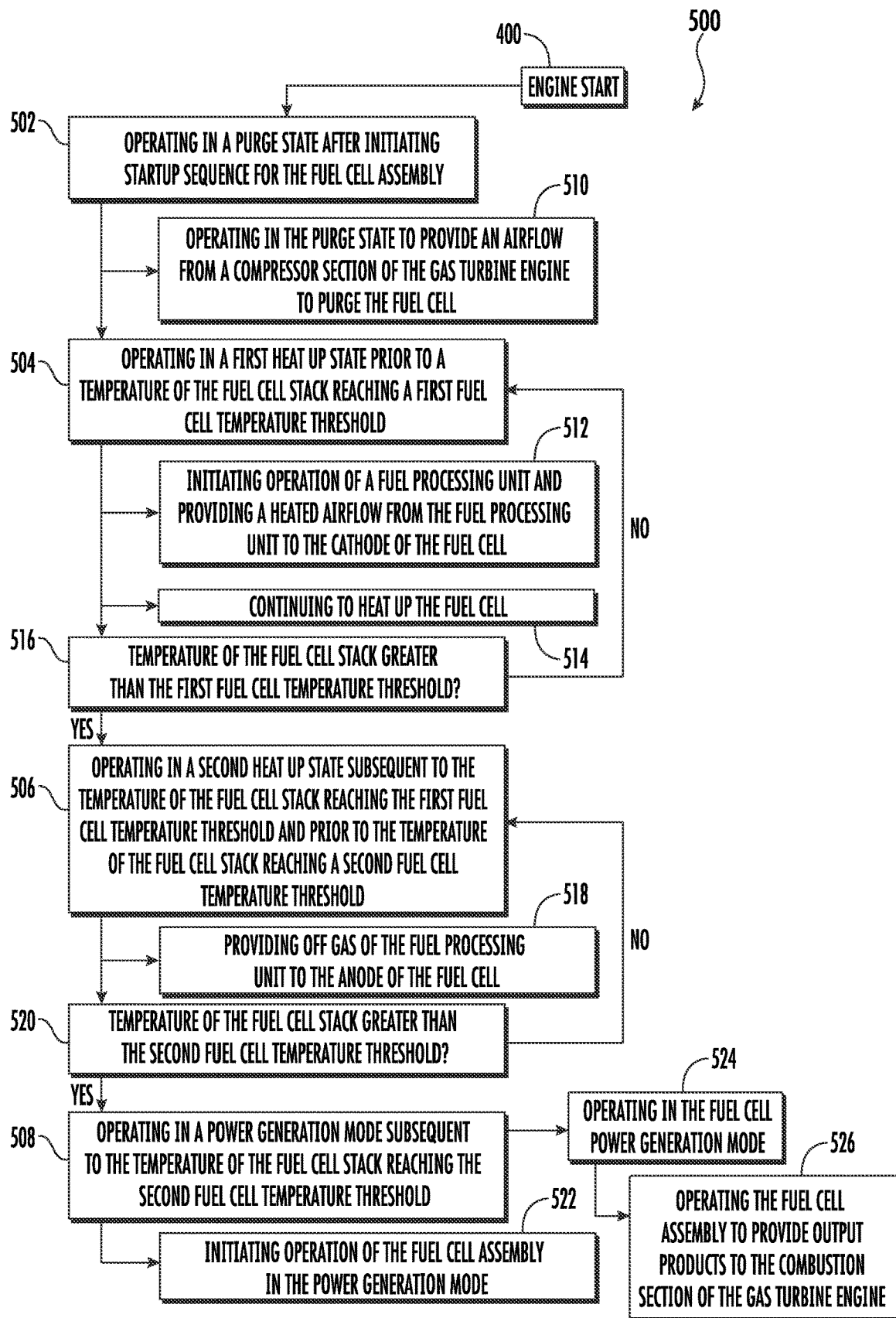
FIG. 7 is a flow diagram of a method for starting a fuel cell assembly in accordance with an exemplary aspect of the present disclosure.

(vii) Embodiment of FIG. 7; Fuel Cell Assembly Ground Start without Use of an Air Processing Unit Referring now particularly to FIG. 7, a method 500 for operating a propulsion system of an aircraft is provided, and more specifically, a method 500 for starting up a fuel cell assembly and gas turbine engine in accordance with an exemplary aspect of the present disclosure is provided. The fuel cell assembly may be configured in a similar manner as one or more of the exemplary fuel cell assemblies described herein (e.g., fuel cell assemblies 204 of FIGS. 2 through 5, FIGS. 11 through 13, FIGS. 15 through 16, etc.), and the gas turbine engine may be configured in accordance with one or more of the exemplary gas turbine engines described herein (e.g., gas turbine engine 100 of FIGS. 1, 2, 5, etc.). Accordingly, the fuel cell assembly may in general include a fuel cell stack having a fuel cell defining an outlet positioned to remove output products from the fuel cell during operation.

The method 500 may generally be referred to as a startup sequence for the fuel cell assembly. As will be appreciated from FIG. 7, the method 500 may be executed concurrently with, or subsequent to the method 400 (see FIG. 6) for starting the gas turbine engine. More specifically, it will be appreciated that for the exemplary aspect of FIG. 7, the method 500 may be executed concurrently with, or subsequent to, initiating a startup sequence for the gas turbine engine, such as initiating the method 400 of FIG. 6 (e.g., turning on the starter at (402)). The benefits of such timing will be described in more detail below.

Briefly, as will also be described in more detail below, and other exemplary aspects of the present disclosure, the method 500 may more specifically be executed concurrently with, or subsequent to, achieving a flame on condition with the gas turbine engine; concurrently with, or subsequent to, achieving a sustained flame on condition for gas turbine engine; or concurrently with or subsequent to, achieving an idle condition of the gas turbine engine. The benefits of these timings will also be described in more detail below.

Referring still FIG. 7, the method 500 generally includes at (502) operating in a purge state after initiating startup sequence for the fuel cell assembly; at (504) operating in a first heat up state prior to a temperature of the fuel cell stack reaching a first fuel cell temperature threshold; at (506) operating in a second heat up state subsequent to the temperature of the fuel cell stack reaching the first fuel cell temperature threshold and prior to the temperature of the fuel cell stack reaching a second fuel cell temperature threshold; and at (508) operating in a power generation mode subsequent to the temperature of the fuel cell stack reaching the second fuel cell temperature threshold.

More particularly, referring first to operating in the purge state at (502), the method 500 includes at (510) operating in the purge state to provide an airflow from a compressor section of the gas turbine engine to purge the fuel cell, and more specifically, to purge an anode and a cathode of the fuel cell. The airflow from the compressor section may be at a temperature of at least about 150° C. and up to about 225° C. Purging the fuel cell during the purge state at (502) may also act as an initial heating of the fuel cell. Notably, executing the startup sequence for the fuel cell assembly concurrently with, or subsequent to, executing the startup sequence for the gas turbine engine at (400) may allow for pressurized air from the compressor of the gas turbine engine to perform such operations.

The method 500 further includes at (516) determining whether a temperature of the fuel cell assembly, such as a temperature of the fuel cell stack of the fuel cell assembly, has reached a first fuel cell temperature threshold. For example, the method 500 may include receiving data indicative of a temperature of the fuel cell stack being greater than or equal to the first fuel cell temperature threshold, and in response begin operating in the second heat up state at (506).

As will be appreciated from description above, the first fuel cell temperature threshold may be a temperature threshold at which a risk of undesirable gas formation is eliminated. The undesirable gas may be formed within the anode of the fuel cell when exposed to certain gases, such as carbon monoxide, when the temperature of the fuel cell stack is within a certain temperature range. The first fuel cell temperature threshold may be between about 150° C. and 400° C., such as between about 200° C. and 300° C., such as approximately 230° C., to avoid this undesirable gas formation.

For example, nickel carbonyl may form when nickel (or nickel oxide) in the fuel cell anode meets carbon monoxide at temperatures less than the first fuel cell temperature threshold. The chemical reaction is: $Ni+4CO \longrightarrow Ni(CO)_4$. For a variety of reasons, it is undesirable for nickel carbonyl to form. Therefore, during a SOFC system startup and shutdown, it may be necessary to protect an anode which contains nickel from oxidation and to prevent carbon monoxide containing gas from contacting the anode at temperatures below the first fuel cell temperature threshold, to ensure that no nickel carbonyl is formed. Based on this design consideration, the step (504) in the method 500 avoids the fuel processing unit off-gas (or reformate gas) passing through the fuel cell anode with Nickel material.

Referring still to FIG. 7, as noted, the method 500 further includes at (504) operating in the first heat up state prior to the temperature of the fuel cell stack reaching the first fuel cell temperature threshold. Operating in the first heat up state at (504) includes at (512) initiating operation of a fuel processing unit and providing a heated airflow from the fuel processing unit to the cathode of the fuel cell. In particular, for the exemplary aspect depicted, providing the heated airflow from the fuel processing unit to the cathode of the fuel cell may include providing off-gas from the fuel processing unit along with additional airflow to the cathode of the fuel cell. The fuel processing unit may be configured in a similar manner as one or more of the fuel processing units described herein (see, e.g., fuel processing unit 304 of FIG. 5), including but not limited to catalytic partial oxidizer, auto-thermal reformer and steam reformer. The off-gas from the fuel processing unit may include reformed fuel from the fuel processing unit.

Operating in the first heat up state at (504) further includes at (514) continuing to heat up the fuel cell, e.g., utilizing a fuel processing unit. As will be appreciated, continuing to heat up the fuel cell at (514) may further include utilizing additional heat sources, such as an electrical resistance heater. Moreover, continuing to heat up fuel cell at (514) may include providing the anode of the fuel cell with heated air from the fuel processing unit, hydrogen gas from the fuel processing unit, or both. The flow from the fuel processing unit to the anode at (514) may be free of carbon monoxide or substantially completely free of carbon monoxide (e.g., less than 1% carbon monoxide by volume).

Notably, in at least certain exemplary aspects of the present disclosure, operating in the first heat up state at (504) may further include providing output products from the fuel cell to a combustor of the combustion section (see, e.g., combustor 206 of FIG. 2) while the gas turbine engine is operating in a flame on condition or faster (i.e., more quickly than when the flame on condition is met), and more particularly to a combustion chamber (e.g., combustion chamber 228 of FIG. 2). The output products may be, e.g., off-gas of the fuel processing unit passed through the cathode of the fuel cell. Additionally, or alternatively, in one or more exemplary aspects of the present disclosure, operating in the first heat up state at (504) may include providing off-gas of the fuel processing unit around (i.e., bypassing) the anode of the fuel cell to the combustor of the combustion section of the gas turbine engine, and in particular, may include providing off-gas of the fuel processing unit around the anode of the fuel cell to the combustor of the combustion section while the gas turbine engine is operating in a flame on condition faster. In such a manner, the off-gas may bypass the anode of the fuel cell. In one or more these exemplary aspects, the output products and/or off-gas may include a hydrogen gas. As a flame is present within the gas turbine engine in these exemplary aspects, the hydrogen gas may be utilized to help stabilize gas turbine engine combustion and boost combustion efficiency.

As mentioned above, the method 500 further includes at (516) determining whether a temperature of the fuel cell assembly, such as a temperature of the fuel cell stack of the fuel cell assembly, has reached a first fuel cell temperature threshold.

As mentioned, once the temperature of the fuel cell assembly, and more specifically of the fuel cell stack, has reached the first fuel cell temperature threshold, as determined at (516), the method 500 begins operating in the second heat up state at (506). The anode of a solid oxide fuel cell (SOFC) typically consists of a porous cermet made of nickel and yttria-stabilized zirconia. The nickel component provides electrical conductivity, electrochemical capability and fuel processing capability. The nickel component also enhances the mechanical properties of the cell. Nickel is a relatively unstable metal at high temperature, and in particular it is unstable in the presence of free oxygen at temperatures above approximately 350-400° C. (high end of the first temperature threshold). At normal SOFC operating temperatures of 600° C. to 1000° C., the anode must be subjected to a reducing atmosphere with a partial pressure of oxygen below the nickel-nickel oxide equilibrium level. This allows the nickel to remain in a reduced metallic state. During SOFC startup and shutdown situations, the propensity of nickel to oxidize can cause structural and operational problems. If the nickel anode oxidizes to form nickel oxide, an increase in volume and weight will occur, introducing large stresses in the anode structure. This can result in physical failure of the anode, the electrolyte, or both. Further, after being converted to nickel oxide, the cell is unable to convert chemical energy into electrical energy efficiently and is considered a failed part. Therefore, there is a need to keep reducing gas in the fuel cell anode when the fuel cell anode temperature goes above the first temperature threshold as shown later at step (506).

When operating in the second heat up state at (506), the method may include at (518) providing off-gas (reducing or reduced gas) out of the fuel processing unit to the anode of the fuel cell. Such a process may be in response to receiving data indicative of the temperature the fuel cell stack being greater than or equal to the first fuel cell temperature threshold. Providing the off-gas of the fuel processing unit to the anode of the fuel cell may assist with protecting the anode of the fuel cell against anode oxidation, as the reduced gas from the fuel processing unit may be free or substantially free of oxygen.

Moreover, it will be appreciated that for the exemplary aspect of the method 500 depicted in FIG. 7, providing the off-gas of the fuel processing unit to the anode of the fuel cell at (518) may further include providing off-gas of the fuel processing unit to the cathode of the fuel cell, e.g., also in response to receiving data indicative of the temperature of the fuel cell stack being greater than or equal to the first fuel cell temperature threshold. In such a manner, the method 500 may, while operating in the second heat up state at (506), simultaneously heat up both the anode and cathode of the fuel cell.

It will further be appreciated that in certain exemplary aspects of the present disclosure, operating in the second heat up state at (506) may further include setting a pressure within the anode higher than a pressure within the cathode to prevent gas from within the cathode (e.g., an oxygen-containing gas) from seeping into the anode through an electrolyte layer positioned therebetween.

Referring still to FIG. 7, the method 500 includes at (520) determining whether or not the temperature of the fuel cell assembly, or more specifically, the fuel cell stack of the fuel cell assembly, has exceeded the second fuel cell temperature threshold. In at least certain exemplary aspects, the determination at (520) may include receiving data indicative of the temperature of the fuel cell stack being greater than or equal to the second fuel cell temperature threshold. In response, the method 500 may transition to operating in the power generation mode at (508). For example, the method 500 may include at (522) initiating operation of the fuel cell assembly in the power generation mode, e.g., in response to determining the temperature of the fuel cell assembly, or more specifically, the fuel cell stack of the fuel cell assembly, has exceeded the second fuel cell temperature threshold.

The second fuel cell temperature threshold may be a temperature threshold at which the fuel cell assembly may operate to generate electrical power with a desired efficiency. In certain exemplary aspects, the second fuel cell temperature threshold may be greater than the first fuel cell temperature threshold and between about 400° C. and 800° C., such as at least about 500° C., such as at least about 600° C., such as at least about 700° C., such as up to 750° C. The second fuel cell temperature threshold may be driven by various seals and other structures within the fuel cell assembly, such as within the fuel cell stack.

Subsequent to execution of the startup sequence for the fuel cell assembly, the fuel cell may be operated in the fuel cell power generation mode at (524). As will be appreciated, operating the fuel cell assembly in the power generation mode at (508) may include at (526) operating the fuel cell assembly to provide output products to the combustion section of the gas turbine engine.

As noted above, the exemplary method 500 generally includes initiating the startup sequence of the fuel cell assembly concurrently with, or subsequent to, the startup sequence of the gas turbine engine at (400). One or more exemplary aspects of the exemplary method 500 may facilitate certain efficiencies, such as allowing for air flow from a compressor of the gas turbine engine to be used with startup operations (e.g., providing purge airflow during (502)), providing airflow to the fuel processing unit during (504) and/or during (506), etc.). Further, off-gas of the fuel processing unit containing hydrogen gas may improve combustion within the combustion chamber of the gas turbine engine. Further efficiencies may be achieved as less fuel burn may be required for heating the fuel cell assembly, as pre-heated air from the engine may be used in the startup operations of the fuel cell assembly and radiation heat from the combustor may also assist with heating the fuel cell stack during the startup sequence of the fuel cell assembly. Such a benefit may be unique to the configuration of integrated combustor and fuel cell assembly (see, e.g., integrated combustor and fuel cell assembly of FIG. 2) disclosed herein.

Moreover, while initiating the startup sequence for the fuel cell assembly concurrently with, or subsequent to, initiating the startup sequence of the gas turbine engine, further benefits may be achieved by initiating the startup sequence for the fuel cell assembly concurrently with, or subsequent to, achieving a flame on condition for the gas turbine engine, achieving a sustainable flame on condition for the gas turbine engine, or achieving an idle condition for the gas turbine engine. In particular, the higher the rotational speed of the gas turbine engine and the hotter the flame, one or more of the efficiency benefits described above may be achieved, and the combustion within the combustion chamber may utilize any hydrogen gas in the output products and/or off-gas provided thereto at, e.g., (504), (506). Another benefit from the exemplary method 500 is enhanced reliability and reduced weight as it applies to system without preburner, or enhanced flexibility and availability when the preburner has partial or full failure for a fuel cell system configured with a pre-burner.

Figure 8:
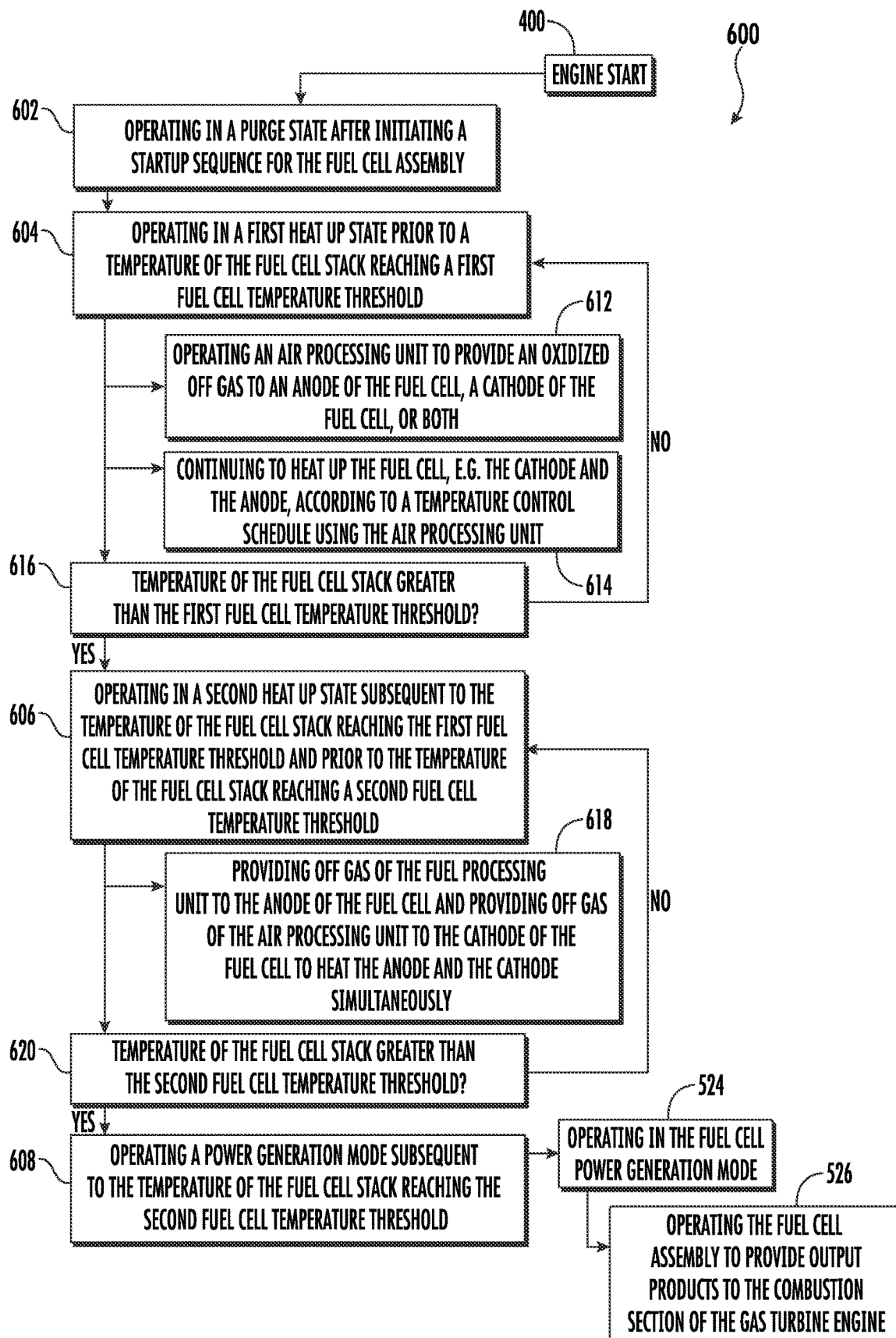
FIG. 8 is a flow diagram of a method for starting a fuel cell assembly in accordance with another exemplary aspect of the present disclosure.

(i) Embodiment of FIG. 8; Fuel Cell Assembly Ground Start with Use of an Air Processing Unit As will be appreciated, the example method 500 of FIG. 7 operates agnostic of an air processing unit, such as the exemplary air processing unit 306 described above with reference to, e.g., FIG. 5. Referring now to FIG. 8, however, a flow diagram of a method 600 for operating a propulsion system of an aircraft in accordance with another exemplary aspect of the present disclosure is provided. More specifically, a flow diagram of an exemplary method 600 is depicted for starting up a fuel cell assembly and gas turbine engine including an air processing unit. The fuel cell assembly may be configured in a similar manner as one or more of the exemplary fuel cell assemblies described herein (e.g., fuel cell assemblies 204 of FIGS. 2 through 5, FIGS. 11 through 13, FIGS. 15 through 16, etc.), and the gas turbine engine may be configured in accordance with one or more of the exemplary gas turbine engines described herein (e.g., gas turbine engine 100 of FIGS. 1, 2, 5, etc.).

The exemplary method 600 may generally operate in a similar manner as exemplary method 500 of FIG. 7, and similar reference numbers may refer to similar processes (e.g., (602) of FIG. 8 corresponds with (502) of FIG. 7, unless otherwise stated herein).

Accordingly, it will be appreciated that the exemplary method 600 generally includes at (602) operating in a purge state after initiating a startup sequence for the fuel cell assembly; at (604) operating in a first heat up state prior to a temperature of the fuel cell stack reaching a first fuel cell temperature threshold; at (606) operating in a second heat up state subsequent to the temperature of the fuel cell stack reaching the first fuel cell temperature threshold and prior to the temperature of the fuel cell stack reaching a second fuel cell temperature threshold; and at (608) operating a power generation state subsequent to the temperature of the fuel cell stack reaching the second fuel cell temperature threshold.

However, as mentioned, the exemplary method 600 may be utilized with a fuel cell assembly including an air processing unit, or specifically, a pre-burner which generates fully oxidized gas (without $H_2$ and CO). In such a manner, the method 600 may include additional or alternative steps when operating, e.g., in the first heat up state and/or in the second heat up state. In particular, for the exemplary embodiment depicted, when operating in the first heat up state at (604), the method 600 generally includes at (612) operating an air processing unit to provide an oxidized off-gas to an anode of the fuel cell, a cathode of the fuel cell, or both. In particular, in at least certain exemplary aspects, the air processing unit may be operated at (612) to provide the oxidized off-gas to both the anode and the cathode of the fuel cell. Similarly, operating in the first heat up state at (604) may further include at (614) continuing to heat up the fuel cell, e.g. the cathode and the anode, according to a temperature control schedule using the air processing unit.

Moreover, referring still to FIG. 8, for the exemplary aspect depicted, operating in the second heat up state at (606) includes utilizing both the air processing unit and the fuel processing unit to heat the fuel cell stack to the second fuel cell temperature threshold. More specifically, the method 600 includes at (618) providing off-gas of the fuel processing unit to the anode of the fuel cell and providing off-gas of the air processing unit to the cathode of the fuel cell to heat the anode and the cathode simultaneously. As with the exemplary method 500 of FIG. 8, providing the off-gas of the fuel processing unit to the anode and the off-gas of the air processing unit to the cathode at (618) may include setting a pressure within the anode higher than a pressure within the cathode to prevent an oxygen-containing gas within the cathode from seeping across an electrolyte layer to the anode.

Other aspects of the method 600 not described herein with reference to FIG. 8 may be similar to the corresponding aspects of the method 500 described above with reference FIG. 7.

Although not reflected in the exemplary flowchart of FIG. 8, it will be appreciated that in at least certain exemplary aspects, aspects of the method 600 may be combined with aspects of the method 500. For example, in certain exemplary aspects, operating in the first heat up state at (604) may additionally include operating a fuel processing unit to provide off-gas to the cathode to assist with heating up the fuel cell, and/or to provide off-gas to a combustor of the gas turbine engine to assist with combustion operations of the gas turbine engine.

The exemplary method 600 has similar benefits as those from the exemplary method 500. One additional benefit in the exemplary method 600 is a potentially faster start up process. This is because, with the preburner heating up cathode and anode simultaneously before reaching the first temperature threshold, the heat transfer from the heated gas to the fuel cell solid is enhanced.

Figure 9:
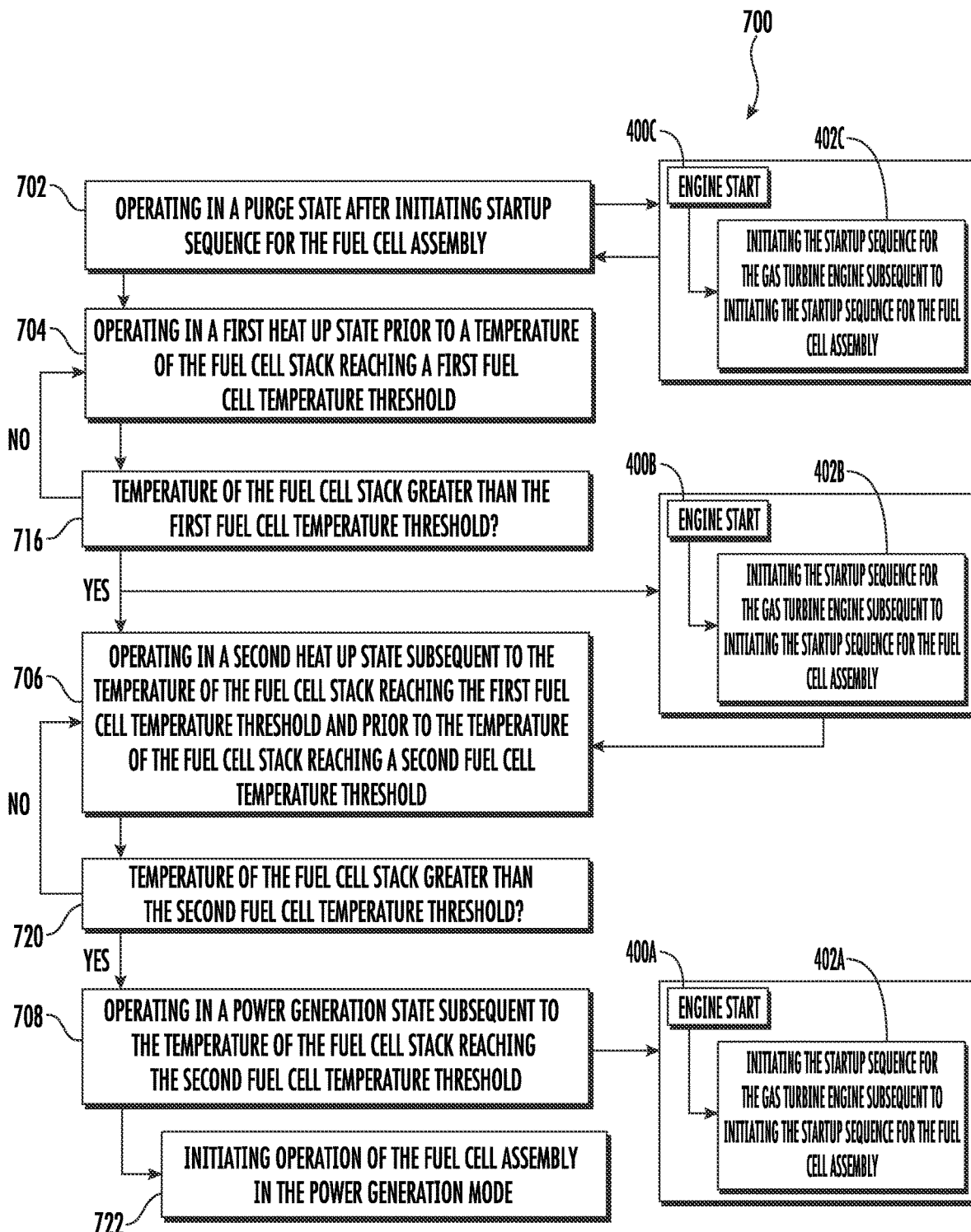
FIG. 9 is a flow diagram of a method for starting a fuel cell assembly in accordance with yet another exemplary aspect of the present disclosure.
Figure 10:
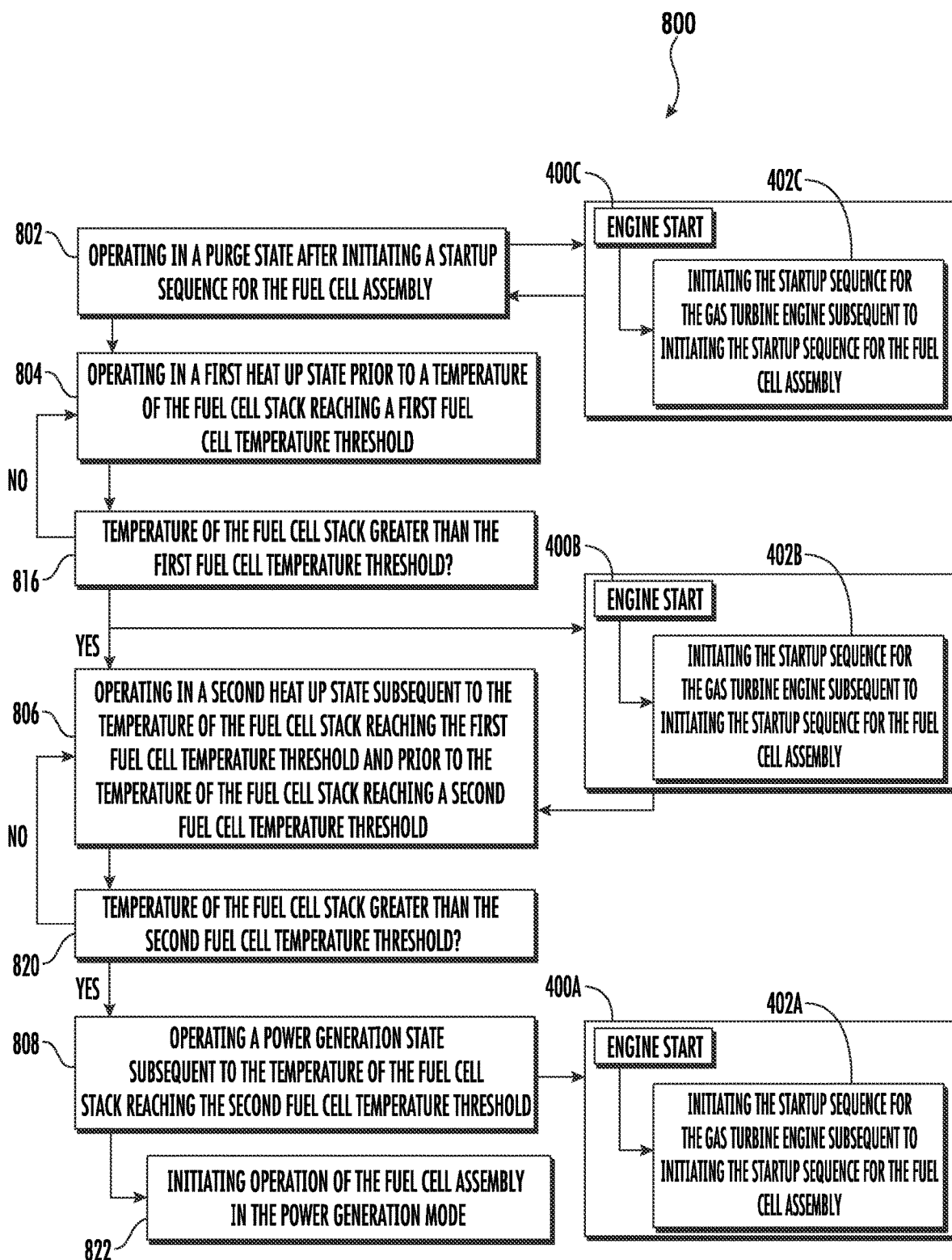
FIG. 10 is a flow diagram of a method for starting a fuel cell assembly in accordance with still another exemplary aspect of the present disclosure.

(ii) Embodiment of FIGS. 9 and 10; Fuel Cell Assembly Ground Start Prior to Start of the Gas Turbine Engine Referring now to FIGS. 9 and 10, flow diagrams of two additional methods and system of the aircraft are depicted. In particular, FIG. 9 is a flow diagram of a method 700 for starting up a fuel cell assembly in accordance with a first additional exemplary embodiment of the present disclosure, and FIG. 10 is a flow diagram of a method 800 for starting up a fuel cell assembly in accordance with a second additional exemplary embodiment of the present disclosure.

The exemplary method 700 of FIG. 9 may be configured in substantially the same manner as exemplary method 500 of FIG. 7, and similar reference numbers may refer to similar processes (e.g., (702) of FIG. 9 corresponds with (502) of FIG. 7), unless otherwise stated herein. Accordingly, it will be appreciated that the exemplary method 700 of FIG. 9 may be utilized with a fuel cell assembly without an air processing unit (e.g., without a preburner).

Similarly, the exemplary method 800 of FIG. 10 may be configured in substantially the same manner as exemplary method 600 of FIG. 8, and similar reference numbers may also refer to similar processes (e.g., (802) of FIG. 10 corresponds with (602) of FIG. 8), unless otherwise stated herein. Accordingly, it will be appreciated that the exemplary method 800 of FIG. 10 may be utilized with a fuel cell assembly including both an air processing unit (e.g., a preburner) and a fuel processing unit.

By contrast, however, to the exemplary methods 500, 600 of FIGS. 7 and 8, the exemplary methods 700, 800 of FIGS. 9 and 10 define a different temporal relationship to an initiation of the startup sequence 400 for the gas turbine engine (see FIG. 6). In particular, FIGS. 9 and 10 depict a first startup sequence 400A, a second the startup sequence 400B, and a third startup sequence 400C.

In particular, each of methods 700, 800 includes initiating the startup sequence for the fuel cell assembly (generally 700, 800), and further include at (402A), (402B), (402C) initiating the startup sequence for the gas turbine engine subsequent to initiating the startup sequence for the fuel cell assembly. As a result, the methods 700, 800 may vary relative to the methods 500, 600 discussed above. For example, when operating in purge operating modes (702), (802), the methods may receive a purge airflow from an air source external to the gas turbine engine (e.g., a ground cart, an auxiliary power unit, etc.). Similarly, airflow utilized in operation of an air processing unit (if included) and a fuel processing unit may also come from an air source external to the gas turbine engine, at least until initiation of the engine start procedures/sequences 400A, 400B, 400C.

(1) Procedure 1

Referring first to the first engine startup sequence 400A, with such a configuration, initiating the startup sequence for the gas turbine engine subsequent to initiating the startup sequence for the fuel cell assembly at (402A) includes initiating the startup sequence for the gas turbine engine after a temperature of the fuel cell stack has reached a second fuel cell temperature threshold (as determined at (720), (820)). In particular, for the exemplary aspect depicted in FIG. 9, the first engine startup sequence 400A is initiated simultaneously with, or subsequent to, initiating operation the fuel cell assembly in the power generation mode at (722), (822).

It will be appreciated that utilizing the first engine startup sequence 400A may result in a more efficient gas turbine engine startup, as with such a configuration the fuel cell, and more specifically, the fuel cell stack, will have heated one or more of liners of a combustor of the gas turbine engine, resulting in a higher combustion efficiency. Further, with such a configuration output products of the fuel cell may be utilized to assist with more quickly achieving combustion stability due to a relatively high content of hydrogen gas within the output products. Further, still, with such a configuration electrical power generated by the fuel cell assembly may be utilized to assist with starting the gas turbine engine.

(2) Procedure 2

Referring now to the second engine startup sequence 400B, with such a configuration, initiating the startup sequence for the gas turbine engine subsequent to initiating the startup sequence for the fuel cell assembly may include initiating the startup sequence for the gas turbine engine after a temperature of the fuel cell stack has reached a first fuel cell temperature threshold (as determined at (716), (816)) and prior to the temperature of the fuel cell stack reaching the second fuel cell temperature threshold as determined at (720), (820)).

It will be appreciated that utilizing the second engine startup sequence 400B may, similar to utilizing the first engine startup sequence 400A, result in a more efficient gas turbine engine startup as the fuel cell stack will have heated one or more of the liners of the combustor of the gas turbine engine, resulting in higher combustion efficiency during startup. Further, the output products of the fuel cell may again assist with more quickly achieving combustion stability due to the relatively high content of hydrogen gas within the output products. Notably, however, by utilizing the second engine startup procedure 400B, as compared to the first engine startup sequence 400A, less fuel and air may be needed to achieve startup of the fuel cell assembly, as heat from the gas turbine engine may assist with heating the fuel cell during the second heat up state (706), (806) and air may be extracted from, e.g., a compressor the gas turbine engine.

(3) Procedure 3

Moreover, referring now to the third engine startup sequence 400C, with such a configuration, initiating subsequent to initiating the startup sequence for the fuel cell assembly includes initiating the startup sequence for the gas turbine engine prior to a temperature of the fuel cell stack reaching the first fuel cell temperature threshold. For the embodiment shown, for the third engine startup sequence 400C, initiating the startup sequence for the gas turbine engine occurs prior to operating the fuel cell assembly in the first heat up state (704), (804), or more specifically, prior to initiating operation of an air processing unit of the fuel cell assembly, a fuel processing unit of the fuel cell assembly, or both.

Notably, however, in other exemplary embodiments of the present disclosure, for the third engine startup sequence 400C, initiating the startup sequence for the gas turbine engine may occur simultaneous with or subsequent to operating the fuel cell assembly in the first heat up state (704), (804), and more specifically, simultaneously with, or subsequent to, initiating operation of an air processing unit of the fuel cell assembly, a fuel processing unit of the fuel cell assembly, or both.

It will be appreciated that utilizing the third engine startup sequence 400C may, similar to utilizing the first engine startup sequence 400A and second engine startup sequence 400B, result in a more efficient gas turbine engine startup as the fuel cell stack will have heated one or more liners of the combustor of the gas turbine engine, resulting in higher combustion efficiency during startup. Further, by utilizing the third engine startup sequence 400C, similar to utilizing the second engine startup procedure 400B, less fuel and air may be needed to achieve startup of the fuel cell assembly, as heat from the gas turbine engine may assist with heating the fuel cell during the second heat up state (706), (806), and air may be extracted from, e.g., a compressor of the gas turbine engine. Further, with the third engine startup sequence 400C, any combustible gas provided from the fuel cell assembly to the combustor of the gas turbine engine during startup of the fuel cell assembly may be combusted by a flame within the combustion section.

Figure 11:
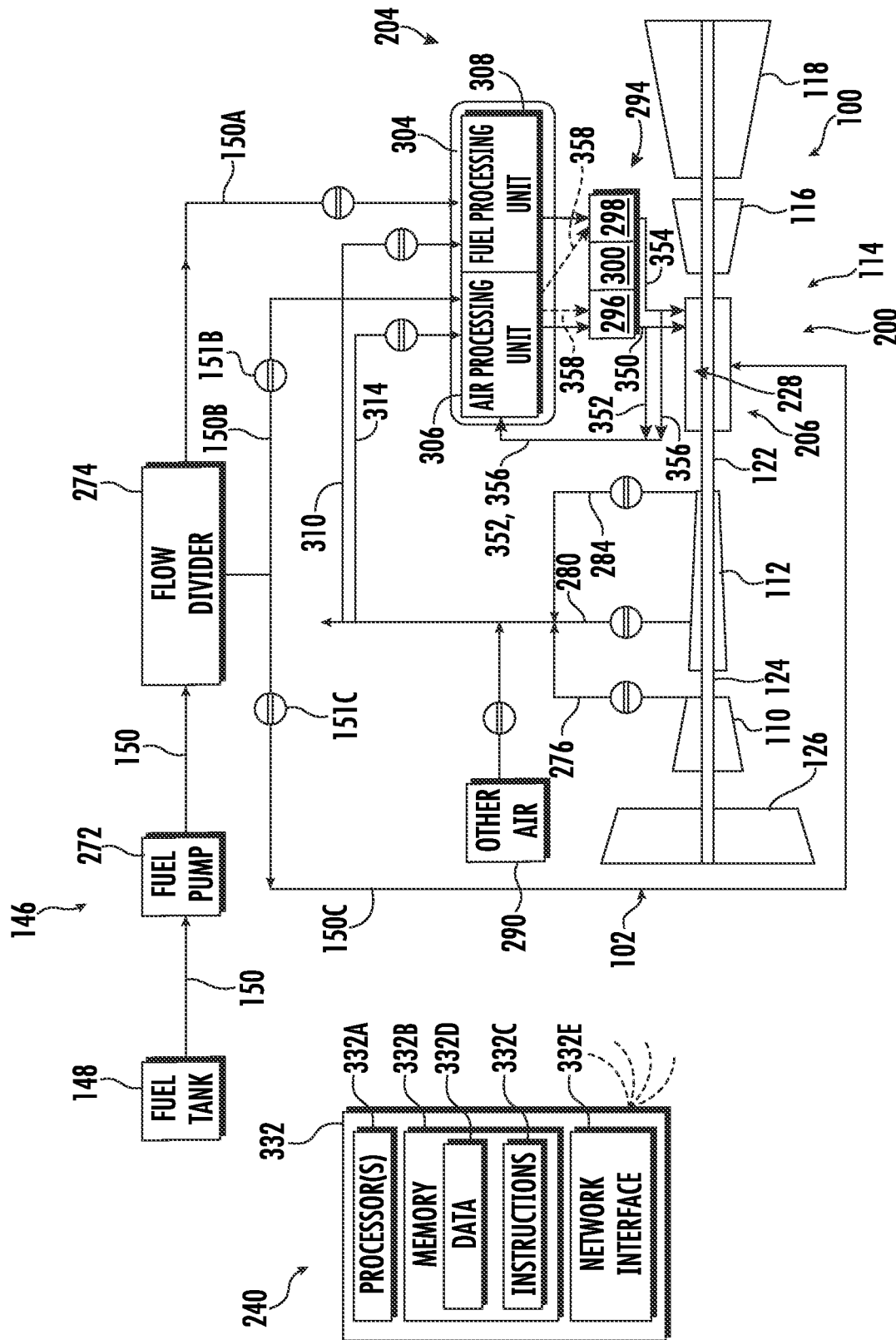
FIG. 11 is a schematic diagram of a gas turbine engine including an integrated fuel cell and combustor assembly in accordance with another exemplary aspect of the present disclosure.
Figure 12:
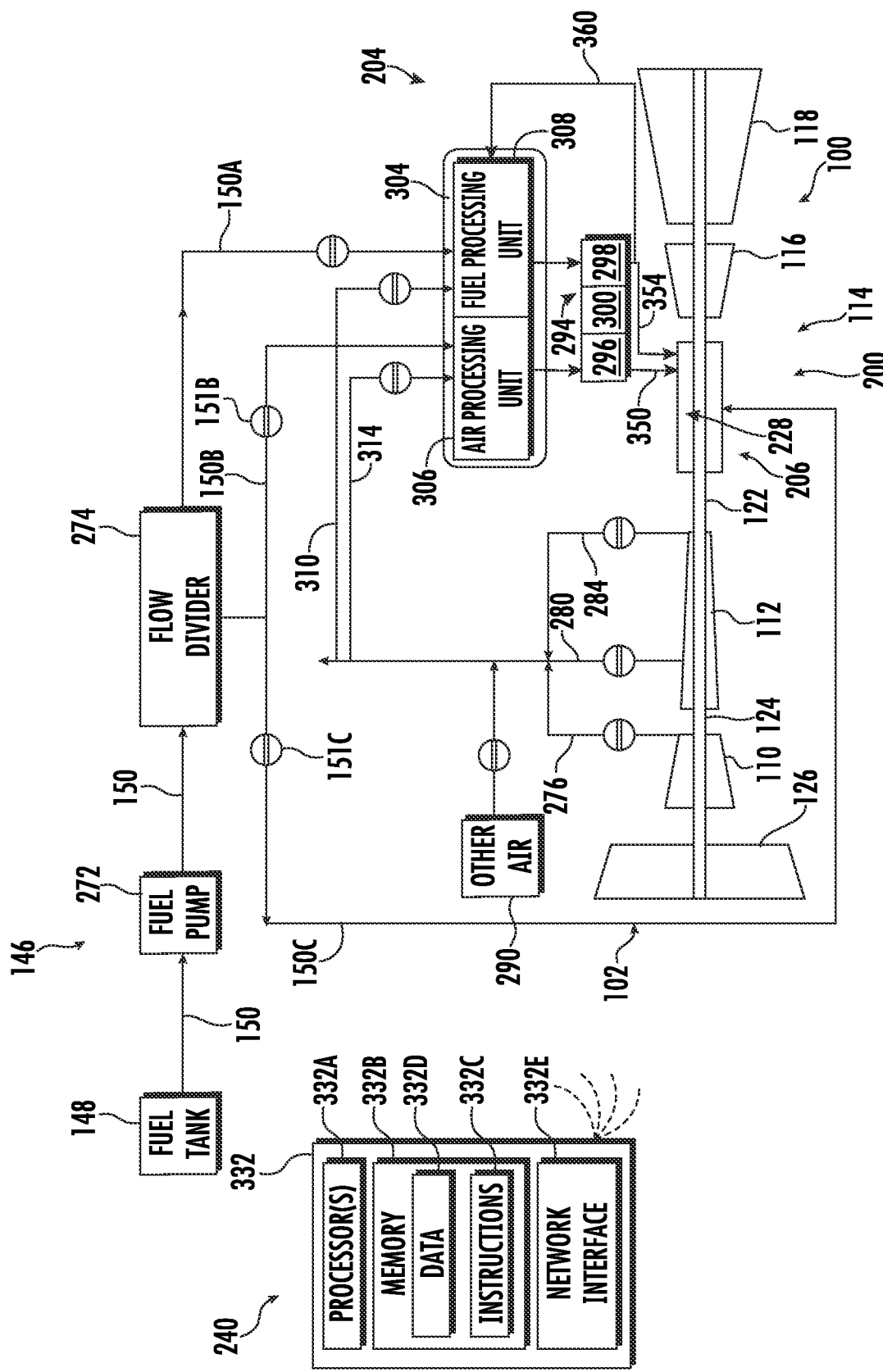
FIG. 12 is a schematic diagram of a gas turbine engine including an integrated fuel cell and combustor assembly in accordance with yet another exemplary aspect of the present disclosure.
Figure 13:
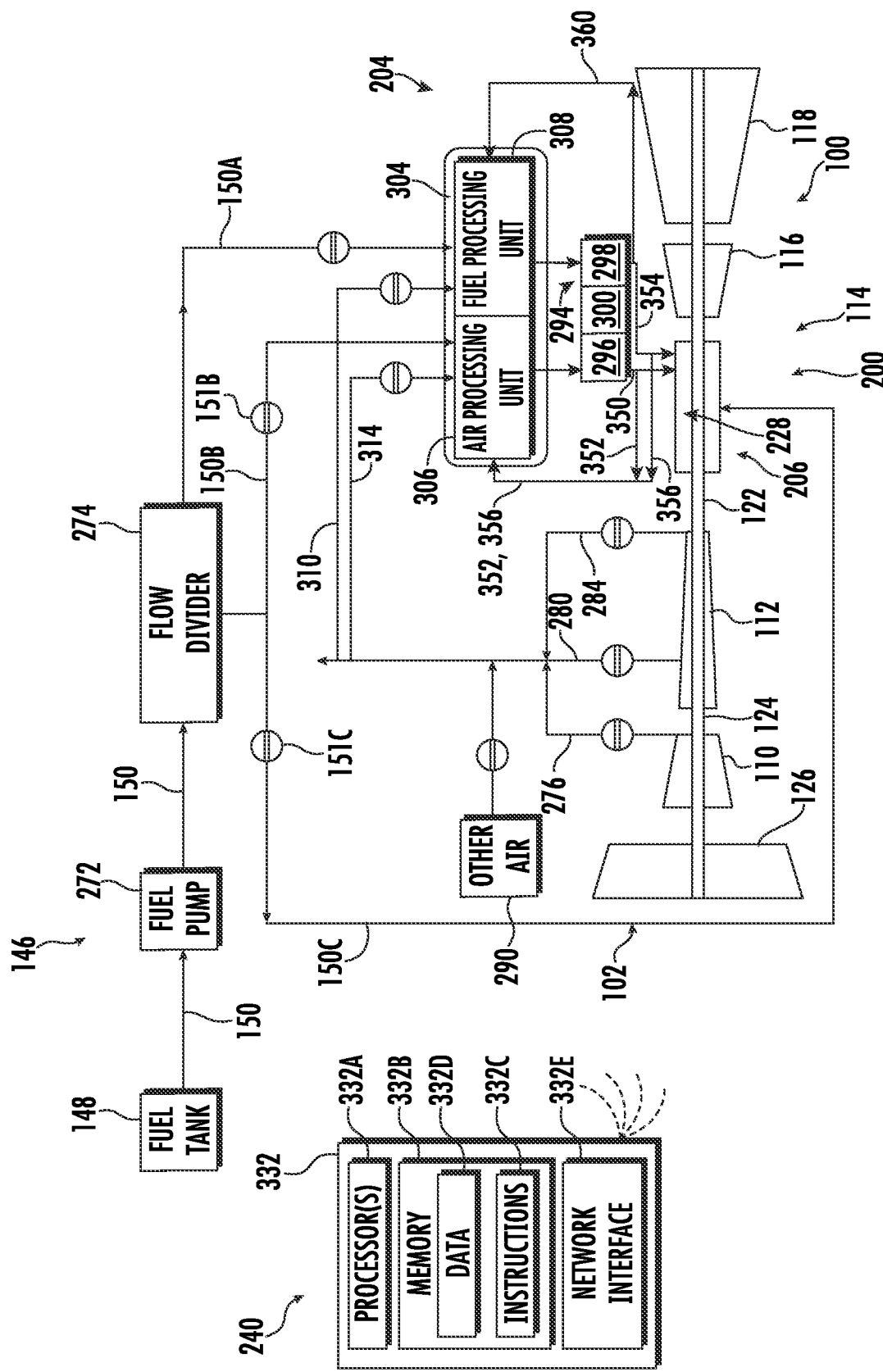
FIG. 13 is a schematic diagram of a gas turbine engine including an integrated fuel cell and combustor assembly in accordance with still another exemplary aspect of the present disclosure.

(iii) Embodiment of FIGS. 11 to 13; Recirculation

As will be appreciated, when starting a fuel cell assembly and a gas turbine engine in accordance with one or more of the exemplary aspects described hereinabove with reference to, e.g., FIGS. 9 and 10, output products of a fuel cell of the fuel cell assembly may be provided to a combustion chamber of a combustor of the gas turbine engine prior to the gas turbine engine achieving a flame on condition, a sustained flame on condition, or an idle condition. The output products may contain, e.g., hydrogen gas, which may not be desirable to have accumulating within the combustion chamber and/or flowing through the gas turbine engine unburned.

Accordingly, referring now briefly to FIGS. 11 through 13, simplified, schematic views of a fuel cell assembly and gas turbine engine, and more specifically of a gas turbine engine having an integrated fuel cell and combustor assembly in accordance with various exemplary embodiments of the present disclosure are provided that may address the above issues. The exemplary gas turbine engine and integrated fuel cell and combustor assembly of FIGS. 11 through 13 may be configured in substantially the same manner as the exemplary gas turbine engine 100 and integrated fuel cell and combustor assembly 200 described above with reference to FIG. 5. As such, the same or similar reference numbers may refer to the same or similar part. For example, a fuel cell controller 240 of the embodiments depicted in FIGS. 11 through 13 may be configured in a similar manner as the exemplary fuel cell controller 240 of FIG. 5.

For example, with each of these configurations the integrated fuel cell and combustor assembly 200 generally includes a fuel cell assembly 204 having an air processing unit 306, a fuel processing unit 304, and a fuel cell stack 294, the fuel cell stack 294 includes a fuel cell (and is depicted as a single fuel cell) having a cathode 296, an anode 298, and an electrolyte layer 300 positioned between the cathode 296 and the anode 298. As depicted schematically in FIGS. 11 through 13, the air processing unit 306 may provide a first flow (not labeled for clarity) to the cathode 296 and the fuel processing unit 304 may provide a second flow (not labeled for clarity) to the anode 298. As will be appreciated from the description herein, in certain exemplary aspects of the fuel cell assembly 204, the air processing unit 306 may be configured to provide the first flow additionally, or alternatively, to the anode 298, and the fuel processing unit 304 may be configured to provide the second flow additionally, or alternatively, to the cathode 296. The first flow may generally be an airflow heated through the air processing unit 306. The second flow may generally be a reformed fuel flow containing hydrogen gas.

Further, for each of these configurations, the fuel cell is configured to provide output products to a combustor 206, or more specifically, to a combustion chamber 228 of the combustor 206. In particular, for the embodiments shown the fuel cell assembly 204 includes a cathode path 350 and an anode path 354. The cathode path 350 provides for fluid communication between the cathode 296 and the combustion chamber 228, and anode path 354 provides for fluid communication between the anode 298 and the combustion chamber 228.

As mentioned, during certain exemplary aspects of the present disclosure, during startup of the fuel cell assembly 204 output products from the fuel cell may include hydrogen gas, which may not be desirable to have provided to the combustor 206 prior to certain operating conditions of the gas turbine engine having been achieved. Similarly, it may be desirable to provide one or more flows to, e.g., the anode 298 during certain operations to avoid undesirable results. For example, it may be desirable to provide a flow of gas to the anode 298 containing little or no oxygen during startup operations of the fuel cell assembly 204 to, e.g., avoid oxidation of the anode 298.

(1) Embodiment A, FIG. 11

Accordingly, referring particularly to the exemplary embodiment of FIG. 11, for the exemplary fuel cell assembly 204 depicted, the fuel cell assembly 204 further defines a cathode recirculation path 352 and a first anode recirculation path 356. The cathode recirculation path 352 fluidly connects the cathode path 350 back to the air processing unit 306 and the first anode recirculation path 356 similarly fluidly connects the anode path 354 back to the air processing unit 306. In such a manner, the air processing unit 306 may be configured to further combust the output products from the fuel cell using any fuel (e.g., hydrogen gas) in the output products from the fuel cell. Such may prevent fuel in the output products from the anode 298 and/or cathode 296 from being provided to the combustion chamber 228 prior to e.g., a sufficient airflow through the combustion chamber 228 having been achieved, and/or the gas turbine engine 100 having achieved a flame on condition, such as a stable flame condition. Further, the airflow further combusted by the air processing unit 306 may subsequently be provided to cathode 296 for heating the cathode 296, the anode 298 for heating the anode 298, or both. Such a flow is indicated by phantom lines 358. Additionally, or alternatively, the flows provided back to the air processing unit 306 to the recirculation paths 352, 356 may be fully converted through the air processing unit 306 from unspent fuel to carbon dioxide and steam, which may alleviate or eliminate emission impact from unspent fuel to downstream equipment when SOFC starts prior to the combustor startup.

(2) Embodiment B, FIG. 12

Referring now particular to the exemplary embodiment of FIG. 12, the fuel cell assembly 204 again includes the cathode path 350 and the anode path 354. However, for the exemplary aspect of FIG. 12, the fuel cell assembly 204 further includes a second anode recirculation path 360 fluidly connecting the anode path 354 back to the fuel processing unit 304. Similar to the embodiment of FIG. 11, inclusion of the second anode recirculation path 360 may allow for diverting all or a portion of the output products from the anode 298 during one or more startup operations back to the fuel processing unit 304 to prevent or minimize the amount of fuel (e.g., hydrogen gas) provided to the combustion chamber 228 of the gas turbine engine. The fuel within the output products recirculated back through the second anode recirculation path 360 may be utilized for fuel processing, which may reduce an overall fuel consumption during execution of the startup sequence of the fuel cell assembly 204, while also reducing any emissions impact from unspent fuel being provided to the combustor 206 of the gas turbine engine 100. This embodiment B in FIG. 12 provides a valuable alternative when there is no air processing unit (e.g., preburner) in the system or when the air processing unit (e.g., preburner) fails.

(3) Embodiment C, FIG. 13

Referring now particular to the exemplary aspect of FIG. 13, the exemplary fuel cell assembly 204 includes aspects of both of the exemplary fuel cell assemblies 204 of FIGS. 11 and 12. In particular, the exemplary fuel cell assembly 204 of FIG. 13 includes the cathode recirculation path 352, the first anode recirculation path 356, and the second anode recirculation path 360. The functions of these respective paths are described above with reference to FIGS. 11 and 12.

In such a manner, it will be appreciated that during execution startup sequence for a fuel cell assembly 204 in accordance with one or more exemplary aspects of the present disclosure (e.g., method 700 of FIG. 9, method 800 of FIG. 10), the fuel cell assembly 204 may be configured to utilize one or more of these recirculation paths. In one example, the system may include the cathode off-gas recirculation path 352 to the air processing unit 306 (e.g. preburner) and the anode off-gas recirculation path 360 to the fuel processing unit 304 (e.g. $CPD_x$). In another example, the system may include the cathode off-gas recirculation path 352 to the air processing unit 306 (e.g. preburner), while the anode off-gas recirculates to the fuel processing unit (e.g. CPOx) via flow path 360 and to the air processing unit (e.g. preburner) via first anode recirculation path 356. An active actuated control valve together with a system controller, referred to herein as fuel cell controller 240, may be used to achieve the desired recirculation flow distribution between flow path 356 and 360.

(4) Impact of Recirculation on Startup Sequences

Referring back briefly to FIGS. 9 and 10, in certain exemplary aspects, prior to completing the startup sequence of the fuel-cell assembly, the method 700, 800 may include routing one or more streams of output products from the fuel-cell to the air processing unit through one or more recirculation paths. For example, the one or more streams may include a cathode stream such that the method 700, 800 includes routing output products from the cathode to the air processing unit through a recirculation path (such as cathode recirculation path 352; FIGS. 11, 13), may include an anode stream such that the method 700, 800 includes routing output products from the anode to the air processing unit through a recirculation path (such as first anode recirculation path 356; FIGS. 11, 13), or both.

Referring still briefly to FIGS. 9 and 10, in certain exemplary aspects, prior to completing the startup sequence for the fuel-cell assembly, the method 700, 800 may further include routing one more streams of output products from the fuel cell to the fuel processing unit through one or more recirculation paths. For example, the one or more streams may include a cathode stream such that the method 700, 800 includes routing output products from the cathode to the fuel processing unit through a recirculation path (not depicted in FIGS. 11 to 13), may include an anode stream such that the method 700, 800 includes routing output products from the anode to the fuel processing unit through a recirculation path (such as second anode recirculation path 360; FIGS. 12, 13), or both.

Figure 14:
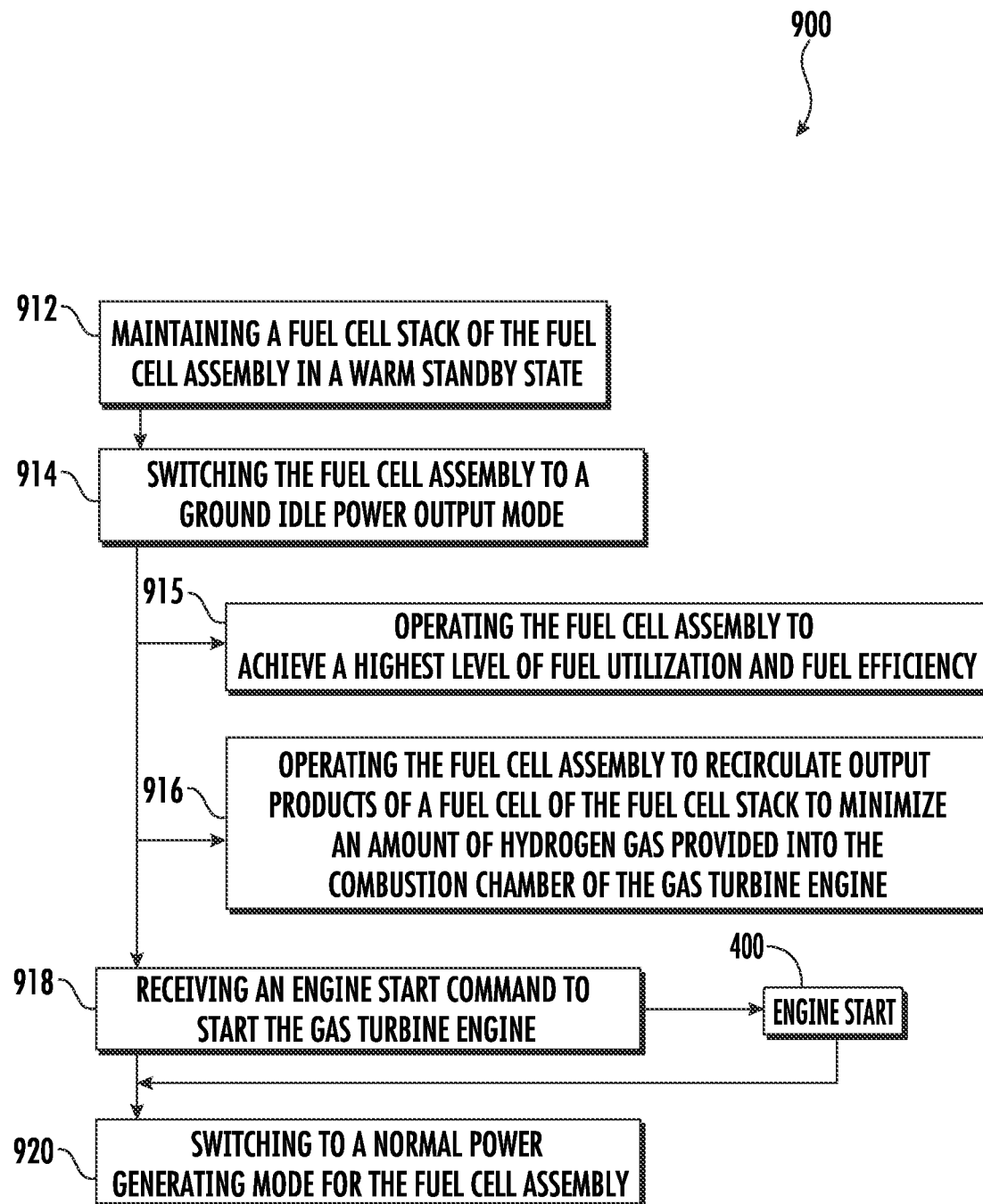
FIG. 14 is a flow diagram of a method for executing a warm start of a fuel cell assembly in accordance with still an exemplary aspect of the present disclosure.

(iv) Embodiment of FIG. 14; Warm Standby Mode

In certain exemplary aspects, a fuel cell assembly may be maintained in a warm state to facilitate, e.g., a quicker startup sequence for the fuel cell assembly, power generation by the fuel cell assembly, etc. Referring now to FIG. 14, a flow diagram of a method 900 is provided showing a warm ground start operation for a gas turbine engine and a fuel cell assembly in accordance with one or more exemplary aspects of the present disclosure. The fuel cell assembly may be configured in a similar manner as one or more of the exemplary fuel cell assemblies described herein (e.g., fuel cell assemblies 204 of FIGS. 2 through 5, FIGS. 11 through 13, FIGS. 15 through 16, etc.), and the gas turbine engine may be configured in accordance with one or more of the exemplary gas turbine engines described herein (e.g., gas turbine engine 100 of FIGS. 1, 2, 5, etc.).

The exemplary method 900 may be similar to one or more of the other methods described herein for starting a fuel cell assembly.

By contrast, however, to the previously described methods, the exemplary method 900 of FIG. 14 includes at (912) maintaining a fuel cell stack of the fuel cell assembly in a warm standby state (or warm standby mode). Maintaining the fuel cell stack of the fuel cell assembly in the warm standby state at (912) may include maintaining the fuel cell stack in the warm standby state during, e.g., an aircraft turnaround, an aircraft refueling, an engine off condition (e.g., where the gas turbine engine is in an off mode), etc. During the warm standby state, there may be no power output drawn from the fuel cell stack, or alternatively, there may be a relatively small amount of power output drawn from the fuel cell stack (e.g., less than about 10% of the maximum power output, such as less than about 5% of the maximum power output) for thermal self-sustainability. As will be appreciated, when the gas turbine engine is not in a flame on operating condition, the gas turbine engine may not be capable of effectively processing hydrogen gas within output products from the fuel cell of the fuel cell stack, so not operating the fuel cell assembly to extract power may prevent hydrogen gas from flowing into, e.g., a combustion section of the gas turbine engine.

As used herein, the term "warm standby state" may refer to a condition where the fuel cell assembly, or rather the fuel cell stack is at a temperature equal to at least about 40% of a maximum operating temperature (i.e., a maximum design temperature for anticipated operations), such as at least about 60% of the maximum operating temperature, such as at least about 70% of the maximum operating temperature, and up to about 90% of the maximum operating temperature. In such a manner, when maintained in the warm standby state, the fuel cell assembly be capable of transitioning to a power generation mode within about five minutes or less. If power is not being extracted, the fuel cell stack may remain in the warm standby mode using, e.g., a heated air source external to the gas turbine engine, electric resistance heaters, a gas turbine engine thermal bus, etc.

Although optional, for the exemplary aspect of the method 900 depicted, the method further includes at (914) switching the fuel cell assembly to a ground idle power output mode (also referred to as a "ground idle power generation mode") to provide electric power for, e.g., the aircraft. Operating in the ground power output mode at (914) includes at (915) operating the fuel cell assembly to achieve a highest level of fuel utilization and fuel efficiency. For example, the fuel cell assembly may be operated within 10% of a maximum fuel utilization for the given level of power output. Such may minimize an amount of hydrogen gas provided into the combustion chamber of the gas turbine engine, and further may reduce a fuel usage and load on, e.g., an air processing unit, a fuel processing unit, or both.

Additionally, for the aspect of the method 900 depicted, operating in the ground power output mode at (914) includes at (916) operating the fuel cell assembly to recirculate output products of a fuel cell of the fuel cell stack to minimize an amount of hydrogen gas provided into the combustion chamber the gas turbine engine. In such a manner, unspent fuel within the output products of the fuel cell of the fuel cell stack created at (914) (and, e.g., (912)) may be recycled to, e.g., the fuel processing unit, so as to eliminate a need for an additional postburner to combust unspent fuel from an anode of the fuel cell. Output products originating from the cathode of the fuel cell may similarly be recycled to the air processing unit, potentially reducing an amount of airflow required for the fuel cell assembly. Such may reduce an auxiliary power usage for a standalone air supply unit, potentially reducing the size and weight of such an air supply unit.

The method 900 further includes at (918) receiving an engine start command to start the gas turbine engine. Receiving the engine start command at (918) may trigger execution of an engine startup process, such as method 400 described above with reference to FIG. 6, or any other suitable engine start procedure. Notably, by operating the fuel cell assembly in the warm standby mode at (912) and utilizing the method 900 described herein, a startup of the gas turbine engine may be assisted by maintaining a temperature of, e.g., one or more liners of the combustor of the gas turbine engine at an elevated temperature, which may lead to more quickly achieving sustainable combustion therein.

For the exemplary aspect depicted, once the engine start sequence (e.g., method 400) is complete, the method 900 includes at (920) switching to a normal power generation mode for the fuel cell assembly. Switching to the normal power generation mode for the fuel cell assembly may be in response to the completion of the engine startup sequence, or alternatively, or may be in response to a determination

Figure 15:
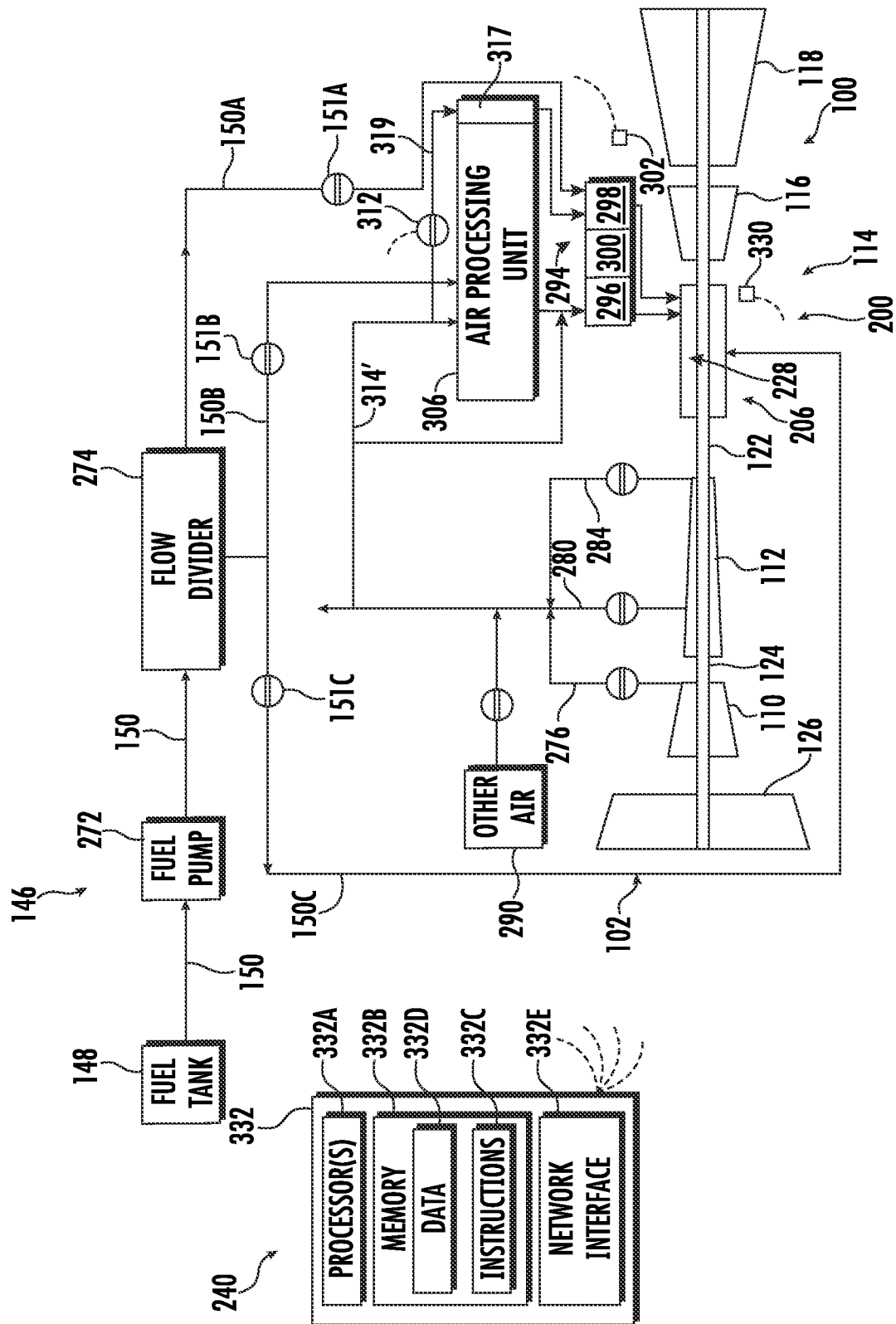
FIG. 15 is a schematic diagram of a gas turbine engine including an integrated fuel cell and combustor assembly in accordance with another exemplary aspect of the present disclosure.
Figure 16:
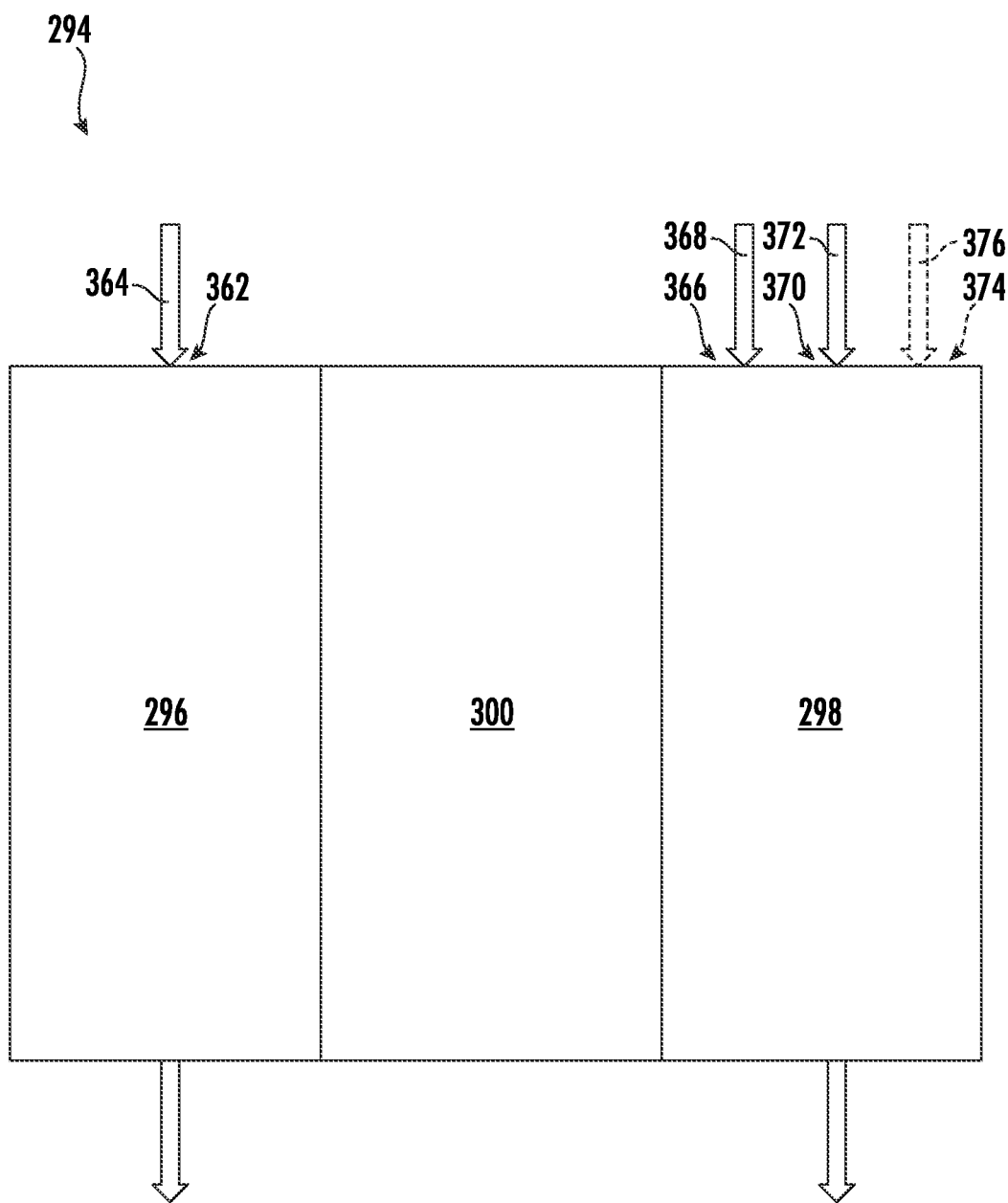
FIG. 16 is a close-up schematic view of a fuel cell of a fuel cell assembly of the exemplary integrated fuel cell and combustor assembly of FIG. 15.

(v) Embodiment of FIGS. 15 to 16; Redox Stable Anode System

As discussed above, a solid oxide fuel cell assembly may generally include a fuel cell stack 294 having a solid oxide fuel cell (or rather, a plurality of solid oxide fuel cells 294 arranged, e.g., in series). The solid oxide fuel cell generally includes a cathode 296, and electrolyte layer 300, and an anode 298 positioned opposite the electrolyte layer 300 from the cathode 296. With certain configurations, the anode 298 includes a cermet having a relatively high nickel concentration. For example, the cement may be a nickel/yttria-stabilized zirconia (Ni/YSZ) cermet. While such a configuration provides certain benefits to the solid oxide fuel cell in the form of, e.g., electrical conductance, there are certain operational limitations when the solid oxide fuel cell is utilized in, e.g., aeronautical obligations. In order to address one or more of these operational limitations, the inventors of the present disclosure have come up with an aeronautical assembly having a more stable solid oxide fuel cell that may address one or more operational limitations.

For example, referring now to FIG. 15, a gas turbine engine and fuel cell assembly in accordance with another exemplary embodiment of the present disclosure is depicted. The exemplary gas turbine engine and fuel cell assembly depicted in FIG. 15 may be configured in substantially the same manner as the exemplary gas turbine engine and fuel cell assembly described above with reference to FIG. 5. The same numbers may refer to the same parts.

For example, the fuel cell assembly generally includes an air delivery assembly, and air processing unit 306, and a fuel cell stack 294 having a fuel cell. The fuel cell is, for the embodiment shown, a solid oxide fuel cell. The air delivery assembly is configured to receive an airflow from a compressor section of the gas turbine engine and/or an additional airflow supply 290. The air delivery assembly is further configured to provide such airflow directly to the cathode 296, or optionally to the air processing unit 306, which may then provide, e.g., heated air to the cathode 296.

However, the anode 298 of the fuel cell is configured as an operationally stable anode 298, as will be described in more detail below with reference to, e.g., FIG. 16. In particular, the anode 298 may be capable of performing internal fuel reforming operations, and may be further configured to accommodate oxygen-containing gas across a wider temperature range. As such, it will be appreciated that for the embodiment shown, the fuel cell assembly does not include a separate fuel processing unit configured to convert a hydrocarbon based fuel to a hydrogen fuel. In particular, a fuel supply of an aircraft including the depicted system may be a hydrocarbon fuel supply, and the fuel cell assembly may be configured to provide a hydrocarbon fuel from the hydrocarbon fuel supply to the anode 298. The hydrocarbon fuel supply may be a fuel supply without a fuel reformer (providing hydrocarbon fuel that has not been passed through, e.g., an on-board fuel reformer). More specifically, for the embodiment shown, the fuel cell assembly includes a fuel line in fluid communication with the first fuel delivery line 150A of the fuel supply for receiving the hydrocarbon fuel and providing the hydrocarbon fuel to the anode 298 of the fuel cell.

In addition, it will be appreciated that the air delivery assembly is further configured to provide a flow of oxygen-containing gas to the anode 298. In particular, the cathode airflow duct of the fuel cell assembly is, for the embodiment of FIG. 15, instead configured as a cathode and anode airflow duct 314' configured to further provide a flow of oxygen-containing gas to the anode 298 through an anode supply duct 319. In the embodiment shown, a heat exchanger 317 is thermally coupled to the air processing unit 306 for increasing a temperature of an airflow through the anode supply duct 319. In such a manner, it will be appreciated that the fuel cell assembly is configured to provide both a flow of hydrocarbon fuel and an oxygen-containing gas to the anode 298 to facilitate, e.g., internal fuel reforming operations within the anode 298 during operation of the fuel cell assembly.

As will further be appreciated from the description herein the internal fuel reforming operations may create a relatively high amount of heat within the fuel cell. In such a manner, the fuel cell assembly may be configured to control the flow of oxygen-containing gas to the anode 298, the flow of hydrocarbon fuel to the anode 298, or both. Such control may be in response to one or more thermal demands on or for the fuel cell assembly (e.g., a temperature of the fuel cell stack 294), one or more thermal demands on or for the gas turbine engine (e.g., heat energy demands within a combustor of the combustion section of the gas turbine engine, combustion dynamics within the combustor of the combustion section of the gas turbine engine), etc.

Accordingly, the exemplary gas turbine engine and fuel cell assembly depicted in FIG. 15 includes one or more features for controlling the oxygen-containing gas to the anode 298 of the fuel cell and the hydrocarbon fuel to the anode 298 of the fuel cell, as well as when more features for sensing data to facilitate the controller 240 making certain control decisions, as described in more detail below.

In particular, for the embodiment shown, the fuel cell assembly includes an anode airflow valve 312 in airflow communication with the anode airflow duct 318 for controlling an airflow through the anode airflow duct 318. The anode airflow valve 312 is depicted in wireless operable communication with the controller 240. Similarly, the fuel cell assembly includes a hydrocarbon fuel flow valve 151A in fluid communication with the fuel line 150A of the fuel cell assembly for controlling a fuel flow through the fuel line 150A to the anode 298. The hydrocarbon fuel flow valve 151A is depicted in wireless operable communication with the controller 240.

Moreover, the fuel cell assembly, the gas turbine engine, or both include one or more sensors configured to sense data indicative of one or more operating conditions the gas turbine engine, or both. For example, the fuel cell assembly includes the fuel cell sensor 302 configured to sense data indicative of a fuel cell assembly operating parameter, such as a temperature of the fuel cell stack 294 (e.g., of the cathode side 296 or anode side 298 of the fuel cell), a pressure within the fuel cell stack 294 (e.g., of within the cathode side 296 or anode side 298 of the fuel cell), and/or a composition (e.g., a chemical composition) of the output products from the fuel cell assembly 204. Also by way of example, the exemplary gas turbine engine depicted includes a sensor 330. The sensor 330 may be, for example, a temperature sensor configured to sense data indicative of an exit temperature of the combustion section 114, an inlet temperature of the turbine section, an exhaust gas temperature, or a combination thereof. Additionally, or alternatively, the sensor 330 may be any other suitable sensor, or any suitable combination of sensors, configured to sense one or more gas turbine engine operating conditions or parameters.

The sensors 302, 330 are depicted in wireless operable communication with the controller.

It will be appreciated that although the exemplary fuel cell assembly of FIG. 15 does not include a separate fuel processing unit (see, e.g., fuel processing unit 304 of FIG. 5), in other exemplary embodiments, an exemplary fuel cell assembly may be provided having both the operationally stable anode 298 and a fuel processing unit.

Referring now to FIG. 16, a close-up, schematic view is depicted of a fuel cell stack 294 having an operationally stable solid oxide fuel cell (the fuel cell stack 294 depicted schematically in FIG. 16 as having a single solid oxide fuel cell), as may be incorporated into one or more fuel cell assemblies of the present disclosure, such as the exemplary fuel cell assembly of FIG. 15. The operationally stable fuel cell assembly of FIG. 16 generally includes a cathode 296, and electrolyte layer 300, and an anode 298 position opposite the electronic layer from the cathode 296.

The cathode 296 defines an inlet 362 configured to receive a first airflow 364 from an air delivery assembly of the fuel cell assembly. The anode 298 defines a second inlet 366 for receiving a second airflow 368 from the air delivery assembly and a third inlet 370 for receiving a hydrocarbon fuel 372. In such a manner, the fuel cell may be incorporated into a fuel cell assembly without a fuel processing unit.

As depicted in phantom, however, the anode 298 of the fuel cell may further define a fourth inlet 374 configured to receive a reformed fuel 376 from a fuel processing unit 304. In such a manner, the fuel cell may further be incorporated into a fuel cell assembly having a fuel processing unit.

As will be appreciated, the anode 298 generally includes a composite material including a ceramic phase and a metallic phase (i.e., a cermet) that is operationally stable. The metallic phase may be finely dispersed within the ceramic matrix of the ceramic phase. As used herein, the term "operationally stable" means that the presence of oxidizing gas (e.g., oxygen) at the anode 298 at the normal operating temperature of the fuel cell assembly of, e.g., 600° C. to 1000° C., does not result in significant oxidation of the metal phase of the cermet in the anode 298. For example, the oxygen content of the oxidizing gas over the anode 298 may be greater than about 0.1% by mass, such as greater than about 2% by mass, such as greater than about 5% by mass (and, e.g., up to 100% oxygen). In an embodiment, the anode 298 of the operationally stable fuel cell may have substantially no nickel content. In another embodiment, the anode 298 of the operationally stable fuel cell may have a nickel content less than or equal to about 25% volume percent (volume of nickel over total volume, or vol/vol), such as less than or equal to about 10% vol/vol, such as less than or equal to about 5% vol/vol, such as less than or equal to about 1% vol/vol, or such as less than or equal to about 0.5% vol/vol.

The ceramic phase of the anode 298 may comprise any suitable ionically conductive ceramic material, such as a doped ceria and/or a doped zirconia. For example, the ceramic phase may include, but is not limited to yttria stabilized zirconia (YSZ), gadolinia-doped ceria (GDC), samaria-doped ceria (SDC), ytterbia-doped ceria (YDC), scandia-stabilized zirconia (SSZ), ytterbia-ceria-scandia-stabilized zirconia (YCSSZ), or the like.

The metallic phase of the anode 298 may comprise perovskite-based catalysts and p or n type semiconductors. Perovskite-based catalysts have a crustal structure resembling that of the mineral perovskite, which consists of calcium titanium oxide ($CaTiO_3$). The general chemical formula for a perovskite-based catalyst is $ABX_3$. A and B are two different cations. X is an anion, frequently an oxide. The anion bonds the two cations. The perovskite-based catalysts may also have a double-perovskite structure (i.e., $A_2B_2O_6$).

Examples of suitable perovskite-based catalysts include titanate-based materials, such as lanthanum strontium titanate ($LaSrTiO_3$), strontium titanate ($SrTiO_3$), Nb Titanates (niobium-doped $SrTiO_3$), calcium titanate ($CaTiO_3$), lead titanate ($PbTiO_3$), and the like. Additional examples of suitable perovskite-based catalysts include lanthanum strontium iron molybdenum oxide ($LaSrFeMoO_6$), bismuth ferrite ($BiFeO_3$), lanthanum ytterbium oxide ($LaYbO_3$), silicate perovskite ($MsSiO_3$), lanthanum manganite ($LaMnO_3$), yttrium aluminum perovskite ($YAlO_3$), and the like. Examples of suitable p or n type semiconductors include boron doped silicon, aluminum doped silicon, boron doped germanium, arsenic doped silicon, phosphorus doped silicon, arsenic doped germanium, phosphorus doped germanium and the like. In the alternative or in addition, the metallic phase of the anode 298 may comprise any suitable metal catalyst, such as nickel (Ni), cobalt (Co), copper (Cu), alloys thereof, or the like, which operates as an electron conductor.

In an embodiment, the operationally stable fuel cell may also possess internal fuel reforming capabilities, i.e., the fuel cell may be capable of catalytic partial oxidation (CPOx) fuel reforming. Thus, in an embodiment a separate fuel processing unit (see, e.g., fuel processing unit 304 of FIG. 5) may be optional. However, even in an embodiment with internal fuel reforming capabilities, the operationally stable fuel cell assembly may also operate effectively with reformate (e.g., using a separate fuel processing unit).

In embodiments, the internal fuel reforming capabilities are provided by the cermet material of the anode 298. In embodiments, the internal fuel reforming capabilities may be enhanced and/or provided by the introduction of a precious metal (e.g., platinum, ruthenium, palladium, and the like) or other ceramic materials, such as doped cerium oxides, including gadolinia-doped ceria (GDC), samaria-doped ceria (SDC), and the like, on the surface of the anode or on any surface within the fuel cell assembly that contacts the fuel upstream from the anode 298.

The operational stability of the solid oxide fuel cell 294 produces advantages over prior solid oxide fuel cells 294. The anode 298 is less susceptible to oxidation due to conditions in which an oxidizing gas is present over the anode 298 at operating or otherwise elevated temperatures (e.g., above 230° F.). Examples of such conditions include abnormal shutdown or oxidating gas flowing from the combustion chamber prior to fuel cell cooling. Accordingly, the anode 298 has increased volumetric stability during redox and/or thermal cycling, and thus is less prone to the structural damage associated with volumetric changes in the anode 298. Further, in embodiments of the operationally stable fuel cell 294 with an anode 298 having substantially no nickel content or an anode 298 having a nickel content less than or equal to about 25% vol/vol, such as less than or equal to about 10% vol/vol, such as less than or equal to about 5% vol/vol, such as less than or equal to about 1% vol/vol, or such as less than or equal to about 0.5% vol/vol, such may eliminate or reduce the threat of production of the toxic gas nickel carbonyl due to oxidation of the nickel in the anode 298.

The advantages of the operationally stable fuel cell assembly discussed herein may produce savings in the manufacture and operation of the aircraft. The operational stability of the fuel cell assembly allows for reduced shutdown and startup times, more flexibility in shutdown and startup procedures, and lessened need for external controls to guarantee safety and reliability. In addition, the internal fuel reforming capabilities provide flexibility and redundancy in the operation of the fuel cell assembly, and when the separate fuel processing unit (see, e.g., fuel processing unit 304 of FIG. 5) is not included, may reduce weight and system complexity. Furthermore, internal fuel reforming actions may create a relatively high amount of heat which may assist with heating the fuel cell stack during a startup sequence of the fuel cell assembly.

Further explanation and benefits will be appreciated from the following EXAMPLES:

Example 1, Redox Stress Tests: Comparative Nickel/Yttria Stabilized Zirconia (Ni/YSZ) Cermet Anode Fuel Cell Stack A 2-cell 100 $cm^2$ fuel cell stack with nickel/yttria stabilized zirconia anodes was subjected to a redox stress testing as described below. The fuel cell stack was brought to operating temperature (about 800° C.) and fuel and air flow commenced. An open circuit operating voltage was measured to obtain a baseline (cycle 0). The fuel cell stack was shut down using normal conditions and cooled (i.e., cooling was conducted with protective hydrogen flow).

The fuel cell stack was brought to operating temperature and fuel and air flow commenced for a second time. An open circuit operating voltage was measured and compared to baseline to determine if damage had occurred in the previous shutdown (cycle 1). The fuel cell stack was shut down using normal conditions and cooled (i.e., cooling was conducted with protective hydrogen flow) for a second time.

The fuel cell stack was brought to operating temperature and fuel and air flow commenced for a third time. An open circuit operating voltage was measured and compared to baseline to determine if damage had occurred in the previous shutdown (cycle 2). The fuel cell stack was shut down using under redox stress conditions, e.g., conditions allowing for oxidation of the anode. Specifically, fuel and air flow were stopped at the operating temperature. The anode gas lines were purged with nitrogen gas for five minutes for safety. The fuel cell stack was allowed to cool while allowing air to diffuse into the fuel lines. Cooling proceeded at about 1.5° C./min for 12 hours total time (some stacks only cooled to 90-100° C.).

The fuel cell stack was brought to operating temperature and fuel and air flow commenced for final time. An open circuit operating voltage was measured and compared to baseline to determine if damage had occurred in the previous shutdown (cycle 3).

Figure 17:
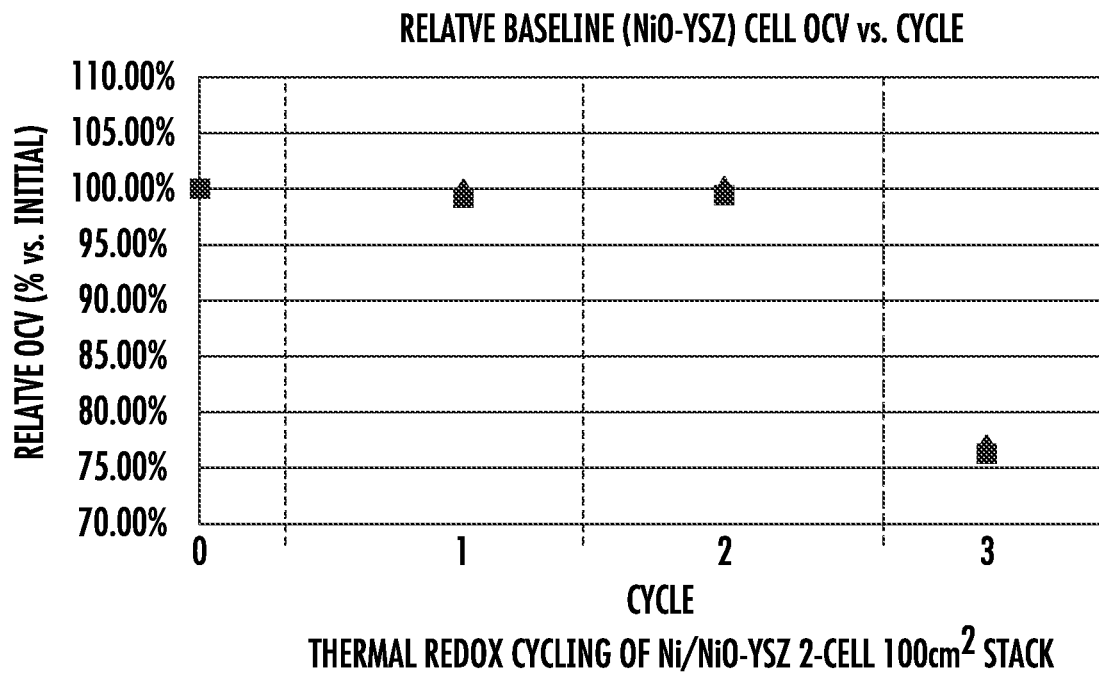
FIG. 17 is a graph showing an open circuit operating voltage (OCV) percentage of a fuel cell stack with nickel/yttria stabilized zirconia anodes during redox cycling.

The results are shown in FIG. 17, wherein the x-axis represents a cycle number and the y-axis represents an open circuit voltage ("OCV") of the cycle relative to a baseline OCV. The dot on the y-axis represents the baseline OCV (cycle 0). The first two vertical lines (i.e., the vertical lines immediately to the right of the y-axis) represent thermal cooling with protective hydrogen flow. The third vertical line represents the thermal cooling under redox stress conditions. When cooling was conducted with protective hydrogen flow the subsequent OCV was 100% of baseline (cycles 1 and 2). Cooling under redox stress conditions, however, resulted in an irreversible damage to the fuel cell stacks as shown by the OCV of cycle 3, which is about 75% of the baseline OCV. Moreover, at the stack outlet, no hydrogen gas was detectible at OCV after the redox stress cooling cycle, which indicates that the volumetric changes associated with the oxidation of the nickel produced irreversible structural damage to the electrolyte layer and resulted in the burning of nearly all of the hydrogen in the stack.

Example 2: Operationally Stable Lanthanum Strontium Titanate/Gadolinia-Doped Ceria (LST/GDC) Cermet Anode Fuel Cell Stack Two 2-cell fuel cell stacks with lanthanum strontium titanate/gadolinia-doped ceria anodes with hydrogen plasma condition with a standard or modified surface preparation were subjected to a redox stress test as described below. The fuel cell stack was brought to operating temperature (about 800° C.) and fuel and air flow commenced. An open circuit operating voltage was measured to obtain a baseline (cycle 1). The fuel cell stack was shut down using normal conditions and cooled (i.e., cooling was conducted with protective hydrogen flow).

The fuel cell stack was brought to operating temperature and fuel and air flow commenced for a second time. An open circuit operating voltage and a stack outlet hydrogen gas percentage were measured and compared to baseline to determine if damage had occurred in the previous shutdown (cycle 2).

The fuel cell stack was repeatedly shut down using under redox stress conditions, e.g., conditions allowing for oxidation of the anode. Specifically, fuel and air flow were stopped at the operating temperature. The anode gas lines were purged with nitrogen gas for five minutes for safety. The fuel cell stack was allowed to cool while allowing air to diffuse into the fuel lines. Cooling proceeded at about 1.5° C./min for 12 hours total time (some stacks only cooled to 90-100° C.). After each shutdown an open circuit operating voltage was measured and compared to baseline to determine if damage had occurred in the previous shutdown (cycles 3-5). In cycles 3 and 4 a stack outlet hydrogen gas percentage were measured and compared to baseline to determine if damage had occurred in the previous shutdown.

Figure 18:
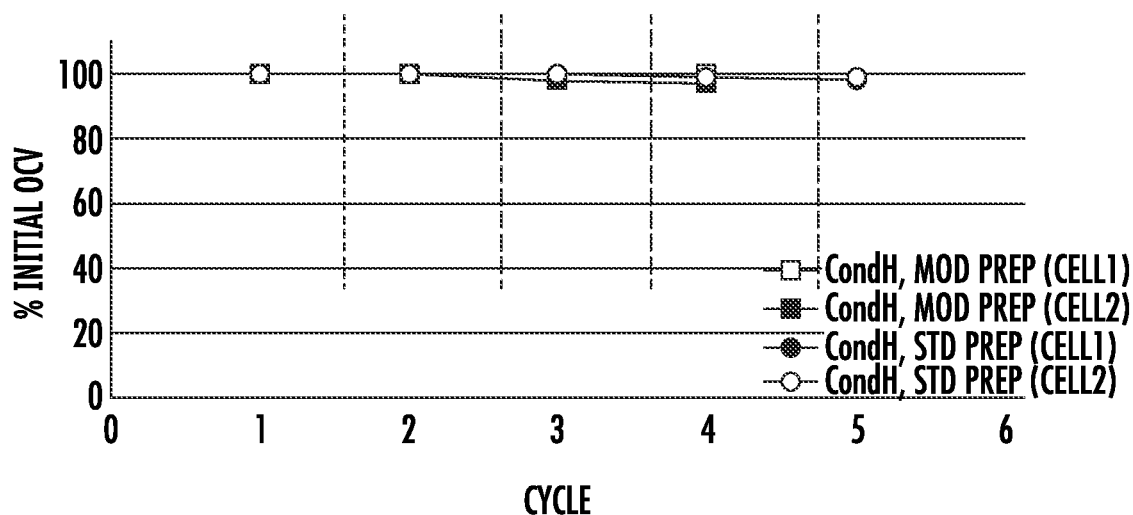
FIG. 18 is a graph showing an OCV percentage of a fuel cell stack with nickel/yttria stabilized zirconia anodes during redox cycling.
Figure 19:
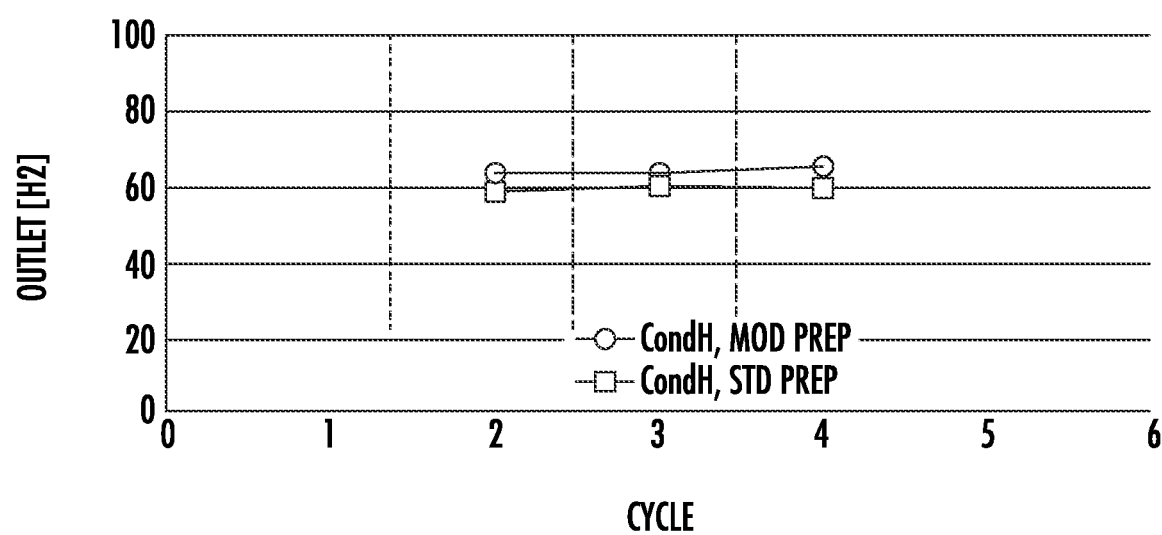
FIG. 19 is a graph showing a hydrogen stack output percentage of a fuel cell stacks with lanthanum strontium titanate/gadolinia-doped ceria anodes during redox cycling.

The results are shown in FIGS. 18 and 19, wherein the x-axis represents a cycle number and the y-axis represents an open circuit voltage of the cycle relative to a baseline OCV (FIG. 18) or an amount of Hydrogen at an outlet (FIG. 19). The first vertical line to the right of the y-axis represents thermal cooling with protective hydrogen flow. The subsequent vertical lines represent the thermal cooling under redox stress conditions. Referring particularly to FIG. 18, when cooling was conducted with protective hydrogen flow, the subsequent OCV was 100% of baseline (cycle 1). Cooling under redox stress the subsequent OCV was about 100% of baseline. Moreover, referring particularly to FIG. 19, a stack outlet showed no reduction in hydrogen gas percentage at OCV after the redox stress cooling cycle as compared the hydrogen gas percentage at OCV after thermal cooling with protective hydrogen flow.

In such a manner, it will be appreciated that these EXAMPLES show the benefits of an operationally stable fuel cell (e.g., of an operationally stable fuel cell stack), in that the fuel cell may withstand redox stress conditions without experiencing a failure, or appreciable depreciation in OCV of hydrogen content at an outlet of the fuel cell. Further benefits are achievable based on this operational stability when the fuel cell (and fuel cell stack and fuel cell assembly) is incorporated into an aviation engine, as described herein.

Figure 20:
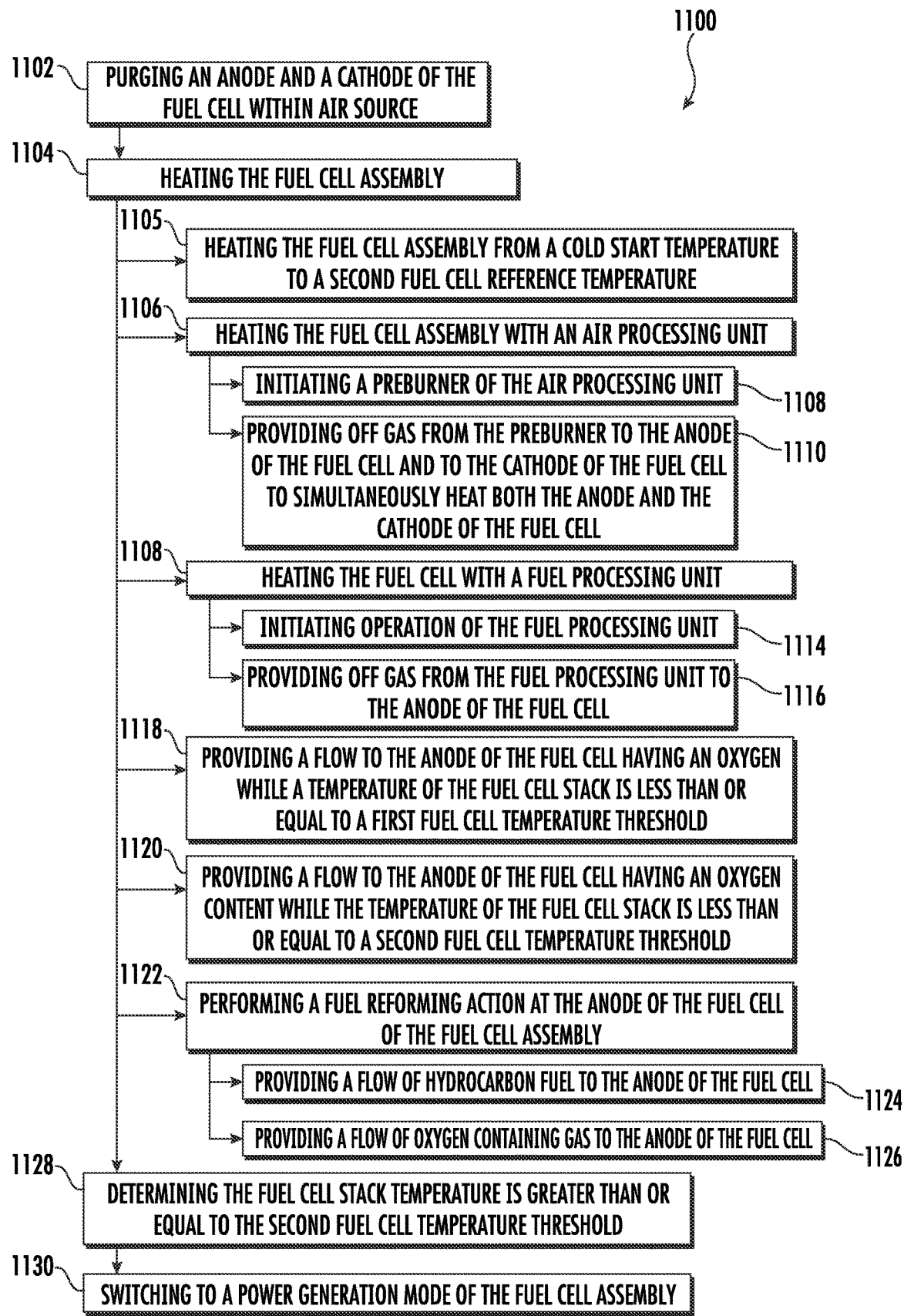
FIG. 20 is a flow diagram of a method for starting a fuel cell assembly in accordance with another exemplary aspect of the present disclosure.

(vi) Embodiment of FIG. 20; Startup of a Redox Stable Anode System

As will be appreciated from the description herein, inclusion of a fuel cell having an operationally stable anode may further facilitate alterations to certain operations of a fuel cell assembly having such a fuel cell.

For example, referring now to FIG. 20, a flow diagram of a method 1100 for starting a gas turbine engine and a fuel cell assembly in accordance with another exemplary embodiment of the present disclosure is provided. The exemplary method 1100 may be utilized with one or more of the exemplary gas turbine engines of the present disclosure (e.g., gas turbine engine 100 of FIGS. 1, 2, 5, etc.), as well as with one or more of the exemplary fuel cell assemblies of the present disclosure having a fuel cell with an operationally stable anode (e.g., fuel cell assemblies 204 of FIGS. 15 through 18). Alternatively, the method 1100 may be utilized with any other suitable gas turbine engines and fuel cell assemblies.

The exemplary method 1100 includes executing a startup sequence for the fuel cell assembly. In particular, executing the startup sequence for the fuel cell assembly includes at (1102) purging an anode and a cathode of the fuel cell within air source.

Further, the method 1100 includes at (1104) heating the fuel cell assembly, and in particular, heating a fuel cell stack of the fuel cell assembly including the fuel cell. Heating the fuel cell assembly at (1104) may generally include at (1105) heating the fuel cell assembly from a cold start temperature to a second fuel cell reference temperature. The cold start temperature may be less than 100° C., such as less than about 80° C., and at least about equal to an ambient temperature.

Further, for the exemplary aspect of the method 1100 depicted in FIG. 20, heating the fuel cell assembly at (1104) further includes at (1106) heating the fuel cell assembly with an air processing unit. Heating the fuel cell assembly with the air processing unit at (1106) includes at (1108) initiating a preburner of the air processing unit and at (1110) providing off-gas from the preburner to the anode of the fuel cell and to the cathode of the fuel cell to simultaneously heat both the anode and the cathode of the fuel cell. In such a manner, heating the fuel cell assembly with the air processing unit at (1106) may generally include heating the fuel cell assembly with the air processing unit at a temperature ramping rate schedule to a desired temperature, such as to the second fuel cell reference temperature.

However, for the exemplary aspect depicted, heating the fuel cell assembly at (1104) further includes at (1112) heating the fuel cell with a fuel processing unit. In particular, for the exemplary aspect of the method 1100 depicted in FIG. 20, heating the fuel cell with the fuel processing unit at (1112) further includes at (1114) initiating operation of the fuel processing unit, and at (1116) providing off-gas from the fuel processing unit to the anode of the fuel cell.

In general, it will be appreciated that inclusion of the operationally stable anode in the fuel cell may generally provide greater flexibility in the manner in which a fuel cell stack is heated in a ground start operation.

In particular, referring still to FIG. 20, it will be appreciated the startup sequence for the fuel cell assembly, and more specifically, heating the fuel cell assembly at (1104) generally includes at (1118) providing a flow to the anode of the fuel cell having an oxygen content while a temperature of the fuel cell stack is less than or equal to a first fuel cell temperature threshold. The oxygen content may be greater than about 0.1% by mass, such as greater than about 2% by mass, such as greater than about 5% by mass. The first fuel cell temperature threshold may be between about 230° C. and about 400° C. The oxygen-containing gas (i.e., the flow having the oxygen content) provided to the anode of the fuel cell at (1114) may be a heated airflow from the air processing unit, or any other suitable heated airflow source. With such a configuration, the operationally stable fuel cell may include an anode having substantially no nickel content.

Further, for the exemplary aspect of the method 1100 depicted in FIG. 20, executing the startup sequence for the fuel cell assembly, and more specifically, heating the fuel cell assembly at (1104) further includes at (1120) providing a flow to the anode of the fuel cell having an oxygen content while the temperature of the fuel cell stack is less than or equal to a second fuel cell temperature threshold (e.g., prior to the temperature of the fuel cell stack being greater than or equal to the second fuel cell temperature threshold during the startup sequence). For example, providing the flow to the anode of the fuel cell at (1120) may include providing the flow to the anode of the fuel cell having the oxygen content when the temperature of the fuel cell stack is between the first fuel cell temperature threshold and the second fuel cell temperature threshold. The oxygen content may be greater than about 0.1% by mass, such as greater than about 2% by mass, such as greater than about 5% by mass. The second fuel cell temperature threshold may be greater than the first fuel cell temperature threshold, such as between about 400° C. and about 750° C. With such a configuration, the operationally stable fuel cell may include an anode having a nickel content less than or equal to about 25%, such as less than or equal to about 10%.

Furthermore, inclusion of a fuel cell having an operationally stable anode and, e.g., a precious metal or a ceramic material that catalyzes catalytic partial oxidation of aviation fuel, may allow for internal fuel reforming actions at the anode of the fuel cell assembly. The internal fuel reforming actions may create a relatively high amount of heat which may assist with heating the fuel cell stack during a startup sequence of the fuel cell assembly.

In particular, for the exemplary aspect of the method 1100 depicted in FIG. 20, executing the startup sequence for the fuel cell assembly, and more specifically, heating the fuel cell assembly (1104) further includes at (1122) performing a fuel reforming action at the anode of the fuel cell of the fuel cell assembly. Performing the fuel reforming action at the anode of the fuel cell at (1122) includes, for the exemplary aspect depicted, at (1124) providing a flow of hydrocarbon fuel to the anode of the fuel cell, and at (1126) providing a flow of oxygen-containing gas to the anode of the fuel cell. In such a manner, the method 1100 may more quickly heat up the fuel cell stack, resulting in a quicker startup time for the fuel cell assembly. Notably, it will be appreciated that the fuel reforming action at the anode of the fuel cell at (1122) may include providing a limited or controlled amount of oxygen so as to prevent complete combustion with the hydrocarbon fuel provided. As will be appreciated, since the anode is an operationally stable anode, the oxygen content of the fuel does not result in an oxidation of the anode.

Referring still to the exemplary method 1100 depicted in FIG. 20, the method 1100 further includes at (1128) determining the fuel cell stack temperature is greater than or equal to the second fuel cell temperature threshold, and at (1130) switching to a power generation mode of the fuel cell assembly.

Moreover, as will be appreciated, the exemplary startup sequence depicted in FIG. 20 may be performed in conjunction with a gas turbine engine startup sequence, such as the exemplary gas turbine engine startup sequence according to method 400 described above with reference to FIG. 6. The exemplary gas turbine engine startup sequence according to method 400 may start prior to initiating the execution of the startup sequence for the fuel cell assembly (e.g., prior to (1102)), or alternatively may start at any other suitable time during the heating up of the fuel cell stack at (1104). Alternatively, still, the gas turbine engine startup sequence may not be initiated until it is determined that the fuel cell stack temperature is greater than or equal to the second fuel cell temperature threshold at (1128) and the fuel cell assembly is switched to the power generation mode (1130).

Figure 21:
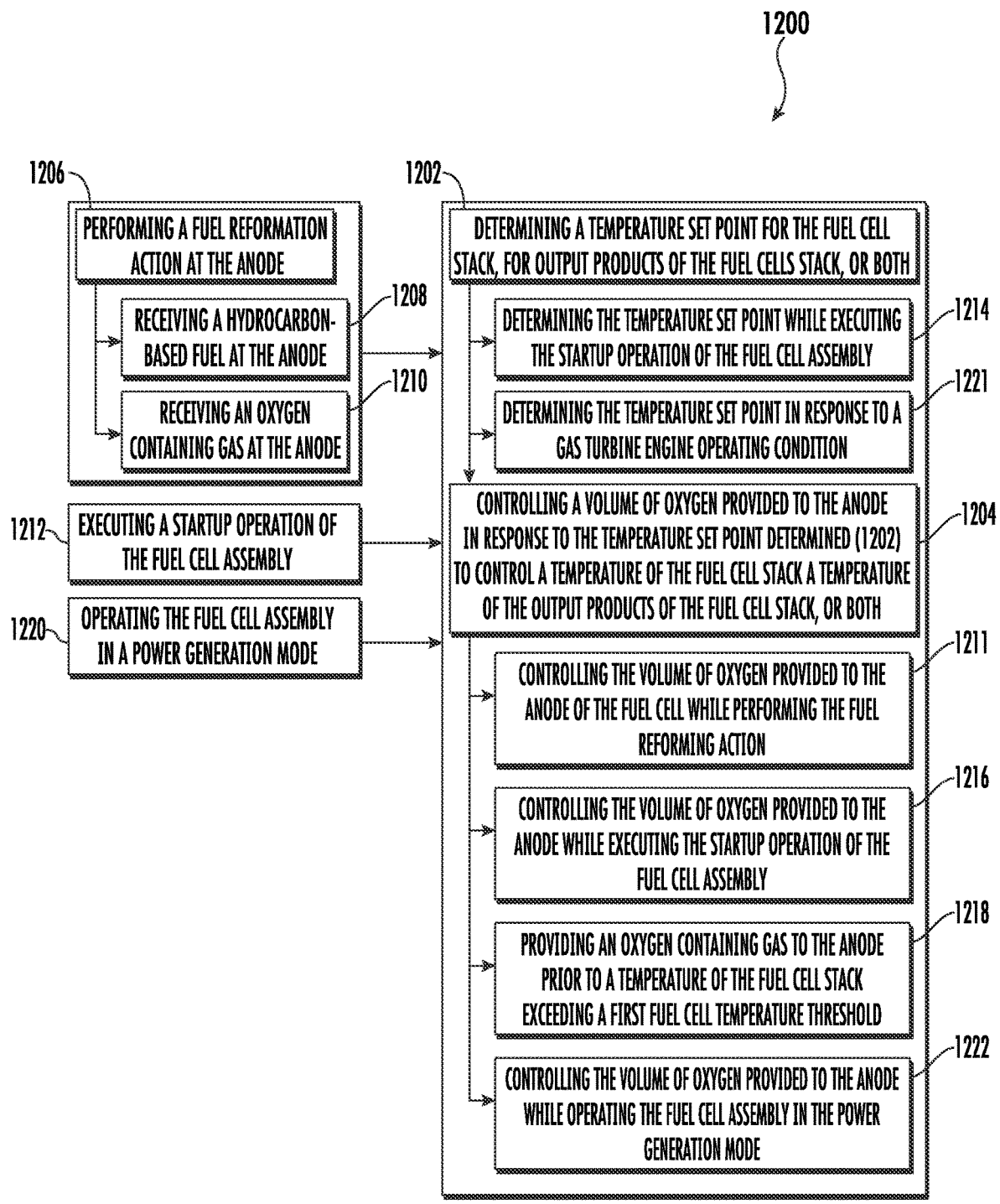
FIG. 21 is a flow diagram of a method for operating a gas turbine engine and a fuel cell assembly in accordance with another exemplary aspect of the present disclosure.

(vii) Embodiment of FIG. 21; Thermal Management of Fuel Cell Assembly with Redox Stable Anode Referring now to FIG. 21, it will further be appreciated that in certain exemplary aspects of the present disclosure, inclusion of a fuel cell having an operationally stable anode in a fuel cell stack of a fuel cell assembly may allow for thermal management of the fuel cell, of a gas turbine engine including the fuel cell assembly, or both.

In particular, FIG. 21 provides a flow diagram of a method 1200 for operating a fuel cell assembly in accordance with an exemplary aspect of the present disclosure. The exemplary method 1200 may be utilized with one or more of the exemplary fuel cell assemblies described herein (e.g., one or more fuel cell assemblies 204 described above with reference to FIGS. 15 through 19), with one or more of the exemplary gas turbine engines described herein (e.g., gas turbine engines 100 described above with reference to FIGS. 1 and 5), or both. In such a manner, it will be appreciated that the method 1200 may be utilized with a fuel cell assembly having a fuel cell stack with a solid oxide fuel cell. The solid oxide fuel cell may include an anode, a cathode, and an electrolyte layer positioned therebetween. The anode and the cathode may be configured to provide output products through an outlet of the fuel cell during operation of the fuel cell assembly.

The method 1200 includes at (1202) determining a temperature setpoint for the fuel cell stack, for output products of the fuel cell stack, or both, and at (1204) controlling a volume of oxidant provided to the anode in response to the temperature setpoint determined (1202) to control a temperature of the fuel cell stack a temperature of the output products of the fuel cell stack, or both.

In particular, for the exemplary aspect of the method 1200 depicted in FIG. 21, the method 1200 includes at (1206) performing a fuel reforming action at the anode. Performing the fuel reforming action of the anode includes at (1208) receiving a hydrocarbon-based fuel at the anode, and at (1210) receiving an oxygen-containing gas at the anode. With such a configuration, controlling the volume of oxidant provided to the anode of the fuel cell at (1204) may include (1211) controlling the volume of oxidant provided to the anode of the fuel cell while performing the fuel reforming action at (1206).

As described in detail above, performing a fuel reforming action at the anode may generate a relatively large amount of heat which may allow for the fuel cell stack to achieve (or achieve more quickly) a temperature setpoint, may allow for the output products of the fuel cell to achieve the setpoint, or both.

Moreover, as noted above, the oxygen-containing gas may be an ambient airflow, or alternatively, the oxygen-containing gas may be an airflow from a compressor section of the gas turbine engine.

Referring still to the exemplary aspect of the method 1200 depicted in FIG. 21, the method 1200 further includes at (1212) executing a startup operation of the fuel cell assembly. The startup operation of the fuel cell assembly may be one or the exemplary startup operations described above. With such an exemplary aspect, determining the temperature setpoint at (1202) more specifically includes at (1214) determining the temperature setpoint while executing the startup operation of the fuel cell assembly, and further controlling the volume of oxidant provided to the anode at (1204) includes at (1216) controlling the volume of oxidant provided to the anode while executing the startup operation of the fuel cell assembly at (1212). More specifically, controlling the volume of oxidant provided to the anode at (1216) may include controlling the volume of oxidant provided to the anode in response to the temperature setpoint determined (1214). The startup operation may be one or more of the exemplary startup operations described herein.

Further, with such an exemplary aspect, controlling the volume of oxidant provided to the anode at (1204) further includes at (1218) providing an oxygen-containing gas to the anode prior to a temperature of the fuel cell stack exceeding a first fuel cell temperature threshold. Such may be possible at least in part due to the inclusion of the operationally stable anode.

In such a manner, the method 1200 may be utilized to achieve a desired operating temperature of the fuel cell assembly, or to achieve the desired operating temperature the fuel cell assembly more quickly.

Further, still, for the exemplary aspect of the method 1200 depicted in FIG. 21, the method 1200 includes at (1220) operating the fuel cell assembly in a power generation mode. Operating the fuel cell assembly in the power generation mode may generally include providing electrical power from the fuel cell stack to an electric power bus, to one or more accessory systems, or both. With such a configuration, determining the temperature setpoint at (1202) may include at (1221) determining the temperature setpoint in response to a gas turbine engine operating condition. The gas turbine engine operating condition may generally be a gas turbine engine operating condition indicative of an emissions parameter, a combustion dynamics parameter, a power output parameter, or combination thereof. As will be appreciated from the description herein, adding heat to a combustion chamber of a combustor of a gas turbine engine may generally affect the gas turbine engine emissions (e.g., NOx and CO emissions), combustion dynamics within the combustor of the gas turbine engine, an amount of power that may be extracted through a turbine section of the gas turbine engine, etc. In such manner, it will be appreciated that the temperature setpoint determined (1202), (1221) may be determined to, e.g., decrease the gas turbine engine emissions, decrease combustion dynamics within the combustor of the gas turbine engine, increase an amount of power that may be extracted to the turbine section of the gas turbine engine, etc.

Referring still FIG. 21, it will further be appreciated that controlling the volume of oxidant provided to the anode at (1204) may more specifically include at (1222) controlling the volume of oxidant provided to the anode while operating the fuel cell assembly in the power generation mode at (1220), and more specifically, in response to the determined temperature setpoint at (1220), (1221).

Figure 22:
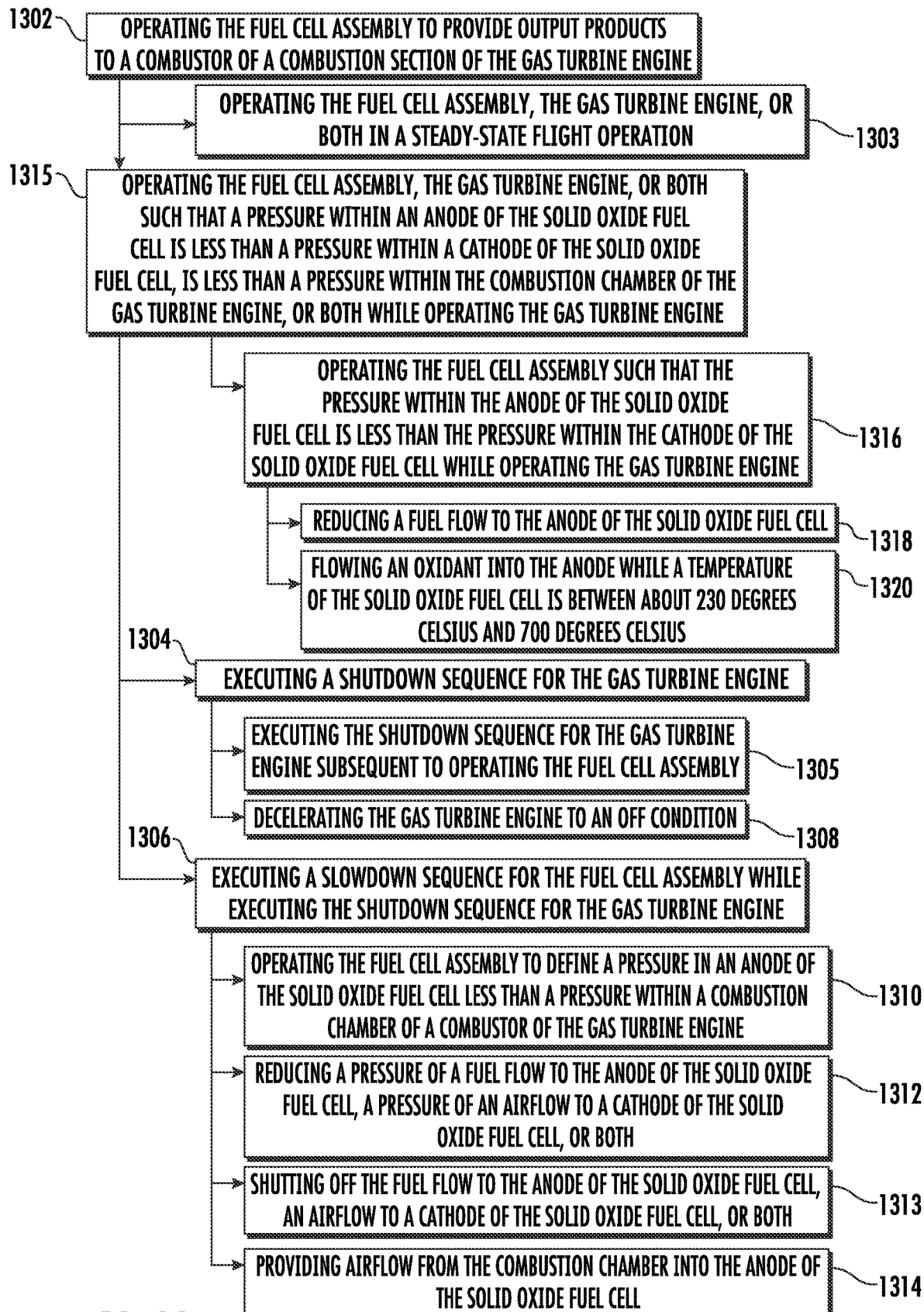
FIG. 22 is a flow diagram of a method for shutting down a gas turbine engine and cooling down a fuel cell assembly in accordance with an exemplary aspect of the present disclosure.

(viii) Embodiment of FIG. 22; Cooling Procedures of a Redox Stable Anode System Referring now to FIG. 22, it will further be appreciated that in certain exemplary aspects of the present disclosure, inclusion of a fuel cell having an operationally stable anode in a fuel cell stack of a fuel cell assembly may allow for improvements to cooling and shutdown procedures of the fuel cell assembly.

In particular, FIG. 22 provides a method 1300 for operating a propulsion system of an aircraft, and in particular, for cooling or shutting down a fuel cell assembly in coordination with shutting down a gas turbine engine with which the fuel cell assembly is incorporated. The fuel cell assembly and gas turbine engine may be configured in a similar manner as one or the exemplary fuel cell assemblies and gas turbine engines described herein. For example, the fuel cell assembly may generally include a fuel cell stack having a solid oxide fuel cell defining an outlet positioned to remove output products from the solid oxide fuel cell during operation.

The method 1300 includes at (1302) operating the fuel cell assembly to provide output products to a combustor of a combustion section of the gas turbine engine (e.g., to a combustion chamber of the combustor). Operating the fuel cell assembly to provide output products at (1302) may include at (1303) operating the fuel cell assembly, the gas turbine engine, or both in a steady-state flight operation (e.g., a cruise operating condition and/or a power generation mode).

The method 1300 further includes at (1315) operating the fuel cell assembly, the gas turbine engine, or both such that a pressure within an anode of the solid oxide fuel cell is less than a pressure within a cathode of the solid oxide fuel cell, is less than a pressure within the combustion chamber of the gas turbine engine, or both while operating the gas turbine engine.

For example, as will be appreciated from the description herein, operating the fuel cell assembly, the gas turbine engine, or both at (1315) may include generally at (1316) operating the fuel cell assembly such that the pressure within the anode of the solid oxide fuel cell is less than the pressure within the cathode of the solid oxide fuel cell while operating the gas turbine engine. For example, such may occur while shutting down the fuel cell assembly. With such an exemplary aspect, operating the fuel cell assembly such that the pressure within the anode of the solid oxide fuel cell is less than the pressure within the cathode of the solid oxide fuel cell while operating the gas turbine engine at (1316) includes at (1318) reducing a fuel flow to the anode of the solid oxide fuel cell.

Further, in certain exemplary aspects, such as the exemplary aspect depicted in FIG. 22, operating the fuel cell assembly such that the pressure within the anode of the solid oxide fuel cell is less than the pressure within the cathode of the solid oxide fuel cell while operating the gas turbine engine at (1316) further includes at (1320) flowing an oxidant into the anode while a temperature of the solid oxide fuel cell is between about 230 degrees Celsius and 700 degrees Celsius. As noted, such may be accommodated by inclusion of an operationally stable fuel cell.

Referring still to FIG. 22, operating the fuel cell assembly, the gas turbine engine, or both at (1315) may additionally or alternatively include operating the fuel cell assembly, the gas turbine engine, or both such that a pressure within the anode of the solid oxide fuel cell is less than a pressure within the combustion chamber of the gas turbine engine, or both while operating the gas turbine engine. More specifically, for the exemplary aspect of FIG. 20, operating the fuel cell assembly, the gas turbine engine, or both at (1315) includes at (1304) executing a shutdown sequence for the gas turbine engine, and at (1306) executing a cooling sequence for the fuel cell assembly while executing the shutdown sequence for the gas turbine engine at (1304).

"Cooling" as used in this context refers to any reduction in the temperature of, e.g., the fuel cell stack, and does not necessarily require shutdown of the fuel cell assembly. In certain exemplary aspects, the cooling sequence may refer to allowing the fuel cell assembly to cool down without any active cooling of the fuel cell assembly. For example, executing the cooling sequence may include allowing the fuel cell assembly, or rather the fuel cell stack to cool at a rate of less than 0.75° C. per minute, such as less than about 0.70° C. per minute, such as less than about 0.65° C. per minute, such as less than about 0.60° C. per minute, such as less than about 0.50° C. per minute.

More specifically, for the exemplary aspect depicted, executing the shutdown sequence for the gas turbine engine at (1304) may include at (1305) executing the shutdown sequence for the gas turbine engine subsequent to operating the fuel cell assembly at (1302). Further, for the embodiment shown, executing the shutdown sequence for the gas turbine engine at (1304) includes at (1308) decelerating the gas turbine engine to an off condition, and more specifically still, includes decelerating the gas turbine engine from at least a ground idle operating condition to the off condition.

Further, referring still to FIG. 22, in the exemplary aspect depicted, executing the cooling sequence for the fuel cell assembly while executing the shutdown sequence for the gas turbine engine at (1306) more specifically include that (1310) operating the fuel cell assembly to define a pressure in an anode of the solid oxide fuel cell less than a pressure within a combustion chamber of a combustor of the gas turbine engine. As used herein with reference to the exemplary aspect of method 1300 depicted in FIG. 22, the term "pressure" may refer to a static pressure.

Notably, in executing the cooling sequence for the gas turbine engine at (1306), the method 1300 includes at (1312) reducing a pressure of a fuel flow to the anode of the solid oxide fuel cell, a pressure of an airflow to a cathode of the solid oxide fuel cell, or both. In particular for the embodiment shown, executing the cooling sequence for the fuel cell assembly at (1306) more specifically includes reducing the pressure of the fuel flow to the anode of the solid oxide fuel cell as part of (1312).

More specifically, still, for the exemplary aspect of the method 1300 depicted, executing the cooling sequence for the fuel cell assembly at (1306) includes at (1313) shutting off the fuel flow to the anode of the solid oxide fuel cell, an airflow to a cathode of the solid oxide fuel cell, or both. In particular for the embodiment shown, executing the cooling sequence for the fuel cell assembly at (1306) more specifically includes shutting off the fuel flow to the anode of the solid oxide fuel cell. In certain exemplary aspects, shutting off the fuel flow to the anode of the solid oxide fuel cell may occur when a temperature fuel cell stack is between about 230° C. in about 700° C., and when the gas turbine engine is operating at a rotational speed of at least 100 revolutions per minute.

In such a manner, it will be appreciated that while executing the shutdown sequence for the gas turbine engine at (1306), a gas within the combustion chamber of the gas turbine engine may travel into the anode of the solid oxide fuel cell (e.g., through the outlet of the solid oxide fuel cell). More specifically, it will be appreciated that for the exemplary aspect depicted, executing the cooling sequence for the fuel cell assembly at (1306) includes at (1314) providing airflow from the combustion chamber into the anode of the solid oxide fuel cell. The airflow may include an oxygen-containing gas, and may be at a temperature between about 230° C. and about 700° C.

It will be appreciated that in certain exemplary aspects, executing the cooling sequence for the fuel cell assembly at (1306) may further include transitioning to a warm standby state, such as the warm standby state described above with reference to FIG. 14 and method 900 (e.g., may include maintaining the fuel cell stack of the fuel cell assembly in the warm standby state at (912)).

In such a manner, it will be appreciated that operating a fuel cell assembly in accordance with one or more exemplary aspects of the present disclosure may allow for a more efficient operation of the fuel cell assembly and of a gas turbine engine incorporating the fuel cell assembly. For example, during a shutdown operation of the gas turbine engine, operating the fuel cell assembly having an operationally stable fuel cell, the gas turbine engine, or both in accordance with the present disclosure may allow for a fuel flow to the fuel cell assembly to be terminated prior to a flame in a combustion chamber of the gas turbine engine extinguishing, allowing for all of the hydrogen in the output products to be combusted. Further, such an exemplary aspect may allow for more efficient operation by allowing a pressure within a cathode of the fuel cell to exceed a pressure within an anode of the fuel cell without concern for anode oxidation, saving fuel and air flows.

Further, operating the fuel cell assembly having an operationally stable fuel cell, the gas turbine engine, or both in accordance with the present disclosure may allow for the fuel cell to be maintained at a lower baseline pressure as it may be tolerant to surge conditions within the combustor whereby gasses within the combustion chamber may flow into the anode of the fuel cell.

(ix) Embodiment of FIG. 23; Control System Diagram

Referring now to FIG. 23, FIG. 23 shows a schematic illustration of a diagram of a control system 1400 as may be used with one or more of the exemplary systems and methods described herein, such as one or more of the exemplary fuel cell assemblies 204 described herein above; the ground start methods 500, 600, 700, 800, 1100, 1200; the exemplary warm standby method 900; and the exemplary cooling method 1300.

Referring to FIG. 23, the control system 1400 includes a hybrid controller 1410 (which may be configured in a similar manner as the exemplary fuel cell controller 240 described herein above, with reference to FIG. 5), a Human Machine Interface (HMI) 1412, a memory device 1414, and a processor 1416. The Human Machine Interface (HMI) 1412 may be used to enter data and to interact with the hybrid controller 1410. The processor 1416 may be configured in a similar manner as processor 332A described above with reference to FIG. 5, and the memory device 1414 may be configured in a similar manner as memory device 332B described above with reference to FIG. 5.

The control system 1400 includes a fuel cell subsystem 1420 that controls parameters and conditions related to a fuel cell stack of the fuel cell assembly during, e.g., the ground startup, warm standby, or cooling process. The control system 1400 further includes an engine subsystem 1430 that controls the parameters and conditions related to a gas turbine engine system, such as the gas turbine engine system incorporating the fuel cell assembly, during, e.g., the ground startup, warm standby, or cooling process.

The fuel cell subsystem 1420 includes a fuel cell temperature sensor 1422 that senses data indicative of a temperature of the high temperature fuel cell stack and a fuel cell pressure sensor 1424 that senses data indicative of a pressure of the high temperature fuel cell stack. The fuel cell subsystem 1420 also includes a fuel cell fuel flow sensor 1426 that senses data indicative of a fuel flow associated with the high temperature fuel cell stack, and a fuel cell air flow sensor 1428 that senses data indicative of an air fuel flow associated with the high temperature fuel cell stack. The fuel cell subsystem 1420 further includes a fuel cell fuel flow valve 1442 that controls a fuel flow stream to the high temperature fuel cell stack and a fuel cell air flow valve 1444 that controls an airstream to the high temperature fuel cell stack. The fuel cell subsystem 1420 also includes a fuel cell stack exhaust ignitor 1446 that ignites the fuel cell effluents inside the combustor. In such a manner, it will be appreciated that the fuel cell subsystem 1420 includes both data inputs of the fuel cell assembly (e.g., sensors) and control outputs (e.g., control of valves, ignitors, etc. for controlling operation of the fuel cell assembly).

The engine subsystem 1430 includes an engine speed sensor 1432 that senses data indicative of an operational speed of the gas turbine engine, an engine fuel flow sensor 1434 that senses data indicative of a fuel flow of the gas turbine engine, and an engine temperature sensor 1436 that senses data indicative of a temperature of the gas turbine engine. The engine subsystem 1430 also includes an engine starter 1452 that starts the gas turbine engine and a combustor ignitor 1454 that ignites a combustion mix of fuel and air inside the combustor. The engine subsystem 1430 also includes an engine fuel flow valve 1456 that controls a fuel flow stream to the combustor. In such a manner, it will be appreciated that the engine subsystem 1430 includes both data inputs of the fuel cell assembly (e.g., sensors) and control outputs (e.g., control of valves, ignitors, etc. for controlling operation of the gas turbine engine).

A gas turbine engine having a fuel cell assembly (such as a SOFC fuel cell assembly), as described above, may be used in hybrid aircraft systems. Certain operations of the hybrid aircraft may need coordination of the gas turbine engine, the fuel cell, the fuel processing unit, and other components. For example, with ground startup of the hybrid aircraft, coordination of startup timing of these components is needed. With certain exemplary embodiments, a heat up process of the fuel cell may take the longest, e.g., about twenty to thirty minutes. A startup process of the fuel processing unit, e.g., a CPOx, may need about one to two minutes. An engine needs about one to two minutes to reach from a starting speed to a predetermined idling speed.

Further, environmental and safety standards during ground startup necessitate observing emission restrictions related to $H_2$/CO emission for human/airport personnel, keeping fuel cell material within chemical, thermal, and mechanical limits of integrity. Inclusion of a control system 1400 of the present disclosure may more efficiently allow for coordination of the fuel cell assembly and gas turbine engine by, e.g., directly receiving data indicative of the fuel cell assembly through the fuel cell subsystem 1420, directly receiving data indicative of the gas turbine engine through the engine subsystem 1430, and directly implementing control decisions to the gas turbine engine and fuel cell assembly through the engine subsystem 1430 and fuel cell subsystem 1420, respectively. In such a manner, control of a gas turbine engine and fuel cell assembly may be implemented more efficiently, including execution of one or more of the exemplary methods disclosed herein.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A method for operating a propulsion system for an aircraft, the propulsion system comprising a gas turbine engine and a fuel cell assembly, the fuel cell assembly comprising a fuel cell stack having a fuel cell defining an outlet positioned to remove output products from the fuel cell during operation, the method comprising: executing a startup sequence for the gas turbine engine, wherein executing the startup sequence comprises initiating the startup sequence for the gas turbine engine; executing a startup sequence for the fuel cell assembly concurrently with, or subsequent to, initiating the startup sequence for the gas turbine engine; and operating the fuel cell assembly to provide output products to a combustion section of the gas turbine engine.

The method of one or more of these clauses, wherein executing the startup sequence for the gas turbine engine comprises achieving a flame on condition for the gas turbine engine, and wherein executing the startup sequence for the fuel cell assembly comprises executing a startup sequence for the fuel cell assembly concurrently with, or subsequent to, achieving the flame on condition for the gas turbine engine.

The method of one or more of these clauses, wherein executing the startup sequence for the fuel cell assembly comprises operating in a purge state after initiating the startup sequence for the fuel cell assembly; operating in a first heat-up state prior to a temperature of the fuel cell stack reaching a first fuel cell temperature threshold; operating in a second heat-up state subsequent to the temperature of the fuel cell stack reaching the first fuel cell temperature threshold and prior to the temperature of the fuel cell stack reaching a second fuel cell temperature threshold; and operating in a power generation state subsequent to the temperature of the fuel cell stack reaching the second fuel cell temperature threshold.

The method of one or more of these clauses, wherein executing the startup sequence for the fuel cell assembly comprises operating in a purge state to provide an airflow from a compressor section of the gas turbine engine to purge an anode and a cathode of the fuel cell.

The method of one or more of these clauses, wherein the airflow from the compressor section is at a temperature of at least about 200 degrees C.

The method of one or more of these clauses, wherein executing the startup sequence for the fuel cell assembly further comprises: providing the output products from the fuel cell to a combustor of the combustion section while the gas turbine engine is operating in a flame on condition or faster, wherein the output products comprise hydrogen gas.

The method of one or more of these clauses, wherein executing the startup sequence for the fuel cell assembly comprises initiating operation of a fuel processing unit and providing an off-gas of the fuel processing unit around an anode of the fuel cell to a combustor of the combustion section of the gas turbine engine.

The method of one or more of these clauses, wherein executing the startup sequence for the fuel cell assembly further comprises providing a heated airflow from the fuel processing unit to a cathode of the fuel cell.

The method of one or more of these clauses, wherein executing the startup sequence for the fuel cell assembly further comprises receiving data indicative of a temperature of the fuel cell stack being greater than or equal to a first fuel cell temperature threshold; and providing an off-gas of the fuel processing unit to an anode of the fuel cell in response to receiving data indicative of the temperature of the fuel cell stack being greater than or equal to a first fuel cell temperature threshold.

The method of one or more of these clauses, wherein executing the startup sequence for the fuel cell assembly further comprises providing an off-gas of the fuel processing unit to a cathode of the fuel cell in response to receiving data indicative of a temperature of the fuel cell stack being greater than or equal to a first fuel cell temperature threshold.

The method of one or more of these clauses0, wherein providing the off-gas of the fuel processing unit to the cathode of the fuel cell comprises providing the off-gas of the fuel processing unit to the cathode of the fuel cell at a pressure less than a pressure of the off-gas of the fuel processing unit provided to the anode of the fuel cell.

The method of one or more of these clauses, wherein executing the startup sequence for the fuel cell assembly further comprises: receiving data indicative of a temperature of the fuel cell stack being greater than or equal to a second fuel cell temperature threshold; and initiating operation of the fuel cell assembly in a power generation mode.

The method of one or more of these clauses, wherein the second fuel cell temperature threshold is at least about 400 degrees C.

The method of one or more of these clauses, wherein executing the startup sequence for the fuel cell assembly comprises: operating an air processing unit; and providing an off-gas of the air processing unit to a cathode of the fuel cell, to an anode of the fuel cell, or both.

The method of one or more of these clauses, wherein executing the startup sequence for the fuel cell assembly further comprises receiving data indicative of a temperature of the fuel cell stack being greater than or equal to a first fuel cell temperature threshold; operating a fuel processing unit; providing an off-gas of the fuel processing unit to the anode of the fuel cell in response to receiving data indicative of the temperature of the fuel cell stack being greater than or equal to a first fuel cell temperature threshold; and providing an off-gas of the air processing unit to a cathode of the fuel cell in response to receiving data indicative of the temperature of the fuel cell stack being greater than or equal to a first fuel cell temperature threshold.

The method of one or more of these clauses, wherein executing the startup sequence for the fuel cell assembly comprises providing a flow to an anode of the fuel cell having an oxygen content prior to a temperature of the fuel cell stack being greater than or equal to a first fuel cell temperature threshold.

The method of one or more of these clauses, wherein executing the startup sequence for the fuel cell assembly comprises providing a flow to an anode of the fuel cell having an oxygen content prior to a temperature of the fuel cell stack being greater than or equal to a second fuel cell temperature threshold.

The method of one or more of these clauses, wherein executing the startup sequence for the fuel cell assembly comprises performing a fuel reforming action at an anode of the fuel cell.

The method of one or more of these clauses, wherein performing a fuel reforming action at an anode of the fuel cell assembly comprises providing a flow of hydrocarbon fuel to the anode and a flow of an oxygen-containing gas to the anode.

A propulsion system for an aircraft having a gas turbine engine, the aircraft comprising an aircraft fuel supply, the propulsion system comprising: a fuel cell assembly comprising a fuel cell stack having a fuel cell, the fuel cell defining an outlet positioned to remove output products from the fuel cell; a turbomachine comprising a compressor section, a combustion section, and a turbine section arranged in serial flow order, the combustion section configured to receive a flow of aviation fuel from the aircraft fuel supply and further configured to receive the output products from the fuel cell; and a controller comprising memory and one or more processors, the memory storing instructions that when executed by the one or more processors cause the propulsion system to perform operations including executing a startup sequence for the gas turbine engine, wherein executing the startup sequence comprises initiating the startup sequence for the gas turbine engine; executing a startup sequence for the fuel cell assembly concurrently with, or subsequent to, initiating the startup sequence for the gas turbine engine; and operating the fuel cell assembly to provide output products to a combustion section of the gas turbine engine.

A method for operating a propulsion system for an aircraft, the propulsion system comprising a gas turbine engine and a fuel cell assembly, the fuel cell assembly comprising a fuel cell stack having a fuel cell defining an outlet positioned to remove output products from the fuel cell during operation, the method comprising: executing a startup sequence for the fuel cell assembly, wherein executing the startup sequence for the fuel cell assembly comprises initiating the startup sequence for the fuel cell assembly; executing a startup sequence for the gas turbine engine, wherein executing the startup sequence for the gas turbine engine comprises initiating the startup sequence for the gas turbine engine subsequent to initiating the startup sequence for the fuel cell assembly; and operating the fuel cell assembly to provide output products to a combustion section of the gas turbine engine.

The method of one or more of these clauses, wherein executing the startup sequence for the fuel cell assembly comprises: operating in a purge state after initiating the startup sequence for the fuel cell assembly; operating in a first heat-up state prior to a temperature of the fuel cell stack reaching a first fuel cell temperature threshold; operating in a second heat-up state subsequent to the temperature of the fuel cell stack reaching the first fuel cell temperature threshold and prior to the temperature of the fuel cell stack reaching a second fuel cell temperature threshold; and operating in a power generation state subsequent to the temperature of the fuel cell stack reaching the second fuel cell temperature threshold.

The method of one or more of these clauses, wherein initiating the startup sequence for the gas turbine engine subsequent to initiating the startup sequence for the fuel cell assembly comprises initiating the startup sequence for the gas turbine engine prior to a temperature of the fuel cell stack reaching a first fuel cell temperature threshold.

The method of one or more of these clauses, wherein the first fuel cell temperature threshold is at least about 230 degrees C.

The method of one or more of these clauses, wherein initiating the startup sequence for the gas turbine engine subsequent to initiating the startup sequence for the fuel cell assembly comprises initiating the startup sequence for the gas turbine engine after a temperature of the fuel cell stack has reached a first fuel cell temperature threshold and prior to the temperature of the fuel cell stack reaching a second fuel cell temperature threshold.

The method of one or more of these clauses, wherein the first fuel cell temperature threshold is between about 230 degrees C. and about 400 degrees C., wherein the second fuel cell temperature threshold is between about 400 degrees C. and about 750 degrees C., and wherein the second fuel cell temperature threshold is greater than the first fuel cell temperature threshold.

The method of one or more of these clauses, wherein initiating the startup sequence for the gas turbine engine subsequent to initiating the startup sequence for the fuel cell assembly comprises initiating the startup sequence for the gas turbine engine after a temperature of the fuel cell stack has reached a second fuel cell temperature threshold.

The method of one or more of these clauses, wherein the second fuel cell temperature threshold is between about 400 degrees C. and about 750 degrees C.

The method of one or more of these clauses, wherein the fuel cell assembly comprises an air processing unit, and wherein executing the startup sequence for the fuel cell assembly further comprises: completing the startup sequence for the fuel cell assembly, and routing one or more streams of the output products from the fuel cell to the air processing unit prior to completing the startup sequence for the fuel cell assembly.

The method of one or more of these clauses, wherein the one or more streams of the output products from the fuel cell comprise an anode stream, a cathode stream, or both.

The method of one or more of these clauses, wherein the fuel cell assembly comprises a fuel processing unit, and wherein executing the startup sequence for the fuel cell assembly further comprises: completing the startup sequence for the fuel cell assembly, and routing one or more streams of the output products from the fuel cell to the fuel processing unit prior to completing the startup sequence for the fuel cell assembly.

The method of one or more of these clauses, wherein the one or more streams of the output products from the fuel cell comprise an anode stream, a cathode stream, or both.

The method of one or more of these clauses, wherein executing the startup sequence for the fuel cell assembly comprises: operating the fuel cell assembly in a warm standby state; operating the fuel cell assembly in a ground idle power generation mode; and operating the fuel cell assembly in a normal power generation mode.

The method of one or more of these clauses, wherein operating the fuel cell assembly in the ground idle power generation mode comprises operating the fuel cell assembly at fuel utilization within about 10% of a maximum fuel utilization.

The method of one or more of these clauses, wherein executing the startup sequence for the fuel cell assembly comprises initiating operation of a fuel processing unit and providing an off-gas of the fuel processing unit around an anode of the fuel cell to a combustor of the combustion section of the gas turbine engine, to an air processing unit of the fuel cell assembly, or both.

The method of one or more of these clauses, wherein the fuel cell assembly comprises an air processing unit and a fuel processing unit, wherein executing the startup sequence for the fuel cell assembly comprises providing an off-gas from the air processing unit to a cathode of the fuel cell and providing an off-gas from the fuel processing unit to an anode of the fuel cell.

The method of one or more of these clauses, wherein executing the startup sequence for the fuel cell assembly comprises providing a flow to an anode of the fuel cell having an oxygen content prior to a temperature of the fuel cell stack being greater than or equal to a first fuel cell temperature threshold.

The method of one or more of these clauses, wherein executing the startup sequence for the fuel cell assembly comprises providing a flow to an anode of the fuel cell having an oxygen content prior to a temperature of the fuel cell stack being greater than or equal to a second fuel cell temperature threshold.

The method of one or more of these clauses, wherein executing the startup sequence for the fuel cell assembly comprises performing a fuel reforming action at an anode of the fuel cell assembly.

The method of one or more of these clauses, wherein performing a fuel reforming action at an anode of the fuel cell assembly comprises providing a flow of hydrocarbon fuel to the anode and a flow of an oxygen-containing gas to the anode.

A propulsion system for an aircraft having a gas turbine engine, the aircraft comprising an aircraft fuel supply, the propulsion system comprising: a fuel cell assembly comprising a fuel cell stack having a fuel cell, the fuel cell defining an outlet positioned to remove output products from the fuel cell; a turbomachine comprising a compressor section, a combustion section, and a turbine section arranged in serial flow order, the combustion section configured to receive a flow of aviation fuel from the aircraft fuel supply and further configured to receive the output products from the fuel cell; and a controller comprising memory and one or more processors, the memory storing instructions that when executed by the one or more processors cause the propulsion system to perform operations including: executing a startup sequence for the fuel cell assembly, wherein executing the startup sequence for the fuel cell assembly comprises initiating the startup sequence for the fuel cell assembly; executing a startup sequence for the gas turbine engine, wherein executing the startup sequence for the gas turbine engine comprises initiating the startup sequence for the gas turbine engine subsequent to initiating the startup sequence for the fuel cell assembly; and operating the fuel cell assembly to provide output products to a combustion section of the gas turbine engine.

A propulsion system for an aircraft, the aircraft comprising an aircraft fuel supply, the propulsion system comprising: a turbomachine comprising a compressor section, a combustion section, and a turbine section arranged in serial flow order, the combustion section configured to receive a flow of aviation fuel from the aircraft fuel supply; and a fuel cell assembly comprising a fuel cell stack having a solid oxide fuel cell, the solid oxide fuel cell defining an outlet positioned to remove output products from the solid oxide fuel cell and provide the output products to the combustion section, the solid oxide fuel cell comprising a cathode; an electrolyte layer; and an anode positioned opposite the electrolyte layer from the cathode, the anode comprising a cermet, the cermet comprising less than 25% by volume nickel.

The propulsion system of one or more of these clauses, wherein the cermet comprises less than 10% by volume nickel.

The propulsion system of one or more of these clauses, wherein the cermet comprises less than 0.01% by volume nickel.

The propulsion system of one or more of these clauses, wherein the aircraft fuel supply is a hydrocarbon fuel supply, and wherein the fuel cell assembly is configured to provide a hydrocarbon fuel from the hydrocarbon fuel supply to the anode.

The propulsion system of one or more of these clauses, wherein the fuel cell assembly comprises an airflow delivery system in airflow communication with the anode for providing an oxygen-containing gas to the anode.

The propulsion system of one or more of these clauses, wherein the airflow delivery system is configured to receive the oxygen-containing gas from the compressor section of the turbomachine, from an ambient location, or both.

The propulsion system of one or more of these clauses, wherein the cermet catalyzes catalytic partial oxidation of aviation fuel.

The propulsion system of one or more of these clauses, wherein the anode comprises a precious metal or a ceramic material that catalyzes catalytic partial oxidation of aviation fuel.

The propulsion system of one or more of these clauses, wherein the cermet catalyzes catalytic partial oxidation of aviation fuel, and wherein the anode further comprises a precious metal or a ceramic material that catalyzes catalytic partial oxidation of aviation fuel.

The propulsion system of one or more of these clauses, wherein a precious metal or a ceramic material that catalyzes catalytic partial oxidation of aviation fuel is adhered to at least a portion of a surface of the fuel cell assembly upstream from the anode.

The propulsion system of one or more of these clauses, wherein the fuel cell assembly comprises an air processing unit configured to provide an airflow to the cathode.

The propulsion system of one or more of these clauses, wherein the fuel cell stack defines a fuel cell stack temperature, and the fuel cell assembly is configured to provide an oxygen-containing gas to the anode when the fuel cell stack temperature is less than 450 degrees C.

The propulsion system of one or more of these clauses, wherein the fuel cell stack defines a fuel cell stack temperature, and the fuel cell assembly is configured to provide an oxygen-containing gas to the anode when the fuel cell stack temperature is greater than 80 degrees C. and less than 250 degrees C.

The propulsion system of one or more of these clauses, wherein the fuel cell stack defines a fuel cell stack temperature, and the fuel cell assembly is configured to provide an oxygen-containing gas to the anode when the fuel cell stack temperature is greater than 450 degrees C. and less than 750 degrees C.

The propulsion system of one or more of these clauses, wherein the aircraft fuel supply is a hydrocarbon fuel supply, wherein the fuel cell assembly comprises a fuel processing unit, and wherein the fuel cell assembly is configured to selectively provide a hydrocarbon fuel from the hydrocarbon fuel supply to the anode and a hydrogen fuel from the fuel processing unit to the anode.

A fuel cell assembly for a propulsion system of an aircraft, the propulsion system comprising a gas turbine engine having a combustion section, the fuel cell assembly comprising: a fuel cell stack having a solid oxide fuel cell, the solid oxide fuel cell defining an outlet positioned to remove output products from the solid oxide fuel cell and provide the output products to the combustion section when the fuel cell assembly is installed with the gas turbine engine, the solid oxide fuel cell comprising a cathode; an electrolyte layer; and an anode positioned opposite the electrolyte layer from the cathode, the anode comprising a cermet, the cermet comprising less than 25% by volume nickel.

The fuel cell assembly of one or more of these clauses, wherein the cermet comprises less than 10% by volume nickel.

The fuel cell assembly of one or more of these clauses, wherein the cermet comprises less than 0.01% by volume nickel.

The fuel cell assembly of one or more of these clauses, wherein the anode comprises a cermet that catalyzes catalytic partial oxidation of aviation fuel.

The fuel cell assembly of one or more of these clauses, wherein the anode comprises a precious metal or a ceramic material that catalyzes catalytic partial oxidation of aviation fuel.

A method for operating a fuel cell assembly, the fuel cell assembly comprising a fuel cell stack having a solid oxide fuel cell, the solid oxide fuel cell having an anode, a cathode, and an electrolyte, the method comprising: determining a temperature setpoint for the fuel cell stack, for output products of the fuel cell stack, or both; and controlling a volume of oxidant provided to the anode in response to the determined temperature setpoint to control a temperature of the fuel cell stack, a temperature of the output products of the fuel cell stack, or both.

The method of one or more of these clauses, further comprising: performing a fuel reforming action at the anode.

The method of one or more of these clauses, wherein performing the fuel reforming action at the anode comprises: receiving a hydrocarbon-based fuel at the anode; and receiving an oxygen-containing gas at the anode.

The method of one or more of these clauses, wherein the oxygen-containing gas is an ambient air.

The method of one or more of these clauses, wherein the fuel cell assembly is integrated into a gas turbine engine, and wherein the oxygen-containing gas is a compressed air from a compressor section of the gas turbine engine.

The method of one or more of these clauses, wherein the anode comprises less than 25% by volume of Nickel.

The method of one or more of these clauses, wherein the anode is substantially free of Nickel.

The method of one or more of these clauses, wherein the fuel cell assembly is integrated into a gas turbine engine, wherein the gas turbine engine comprises a combustion section having a combustor, wherein the solid oxide fuel cell defines an outlet positioned to remove output products from the solid oxide fuel cell, and wherein the method further comprises: providing the output products from the solid oxide fuel cell to the combustor.

The method of one or more of these clauses, further comprising: executing a startup operation for the fuel cell assembly, and wherein controlling the volume of oxidant provided to the anode comprises controlling the volume of oxidant provided to the anode while executing of the startup operation for the fuel cell assembly.

The method of one or more of these clauses, further comprising: executing a startup operation for the fuel cell assembly, and wherein and wherein determining the temperature setpoint comprises determining the temperature setpoint while executing of the startup operation for the fuel cell assembly.

The method of one or more of these clauses, wherein controlling the volume of oxidant provided to the anode comprises providing an oxygen-containing gas flow at the anode prior to a temperature of the fuel cell stack exceeding a first fuel cell temperature threshold.

The method of one or more of these clauses, further comprising: operating the fuel cell assembly in a power generation mode, and wherein controlling the volume of oxidant provided to the anode comprises controlling the volume of oxidant provided to the anode while operating the fuel cell assembly in the power generation mode.

The method of one or more of these clauses, wherein the fuel cell assembly is integrated into a gas turbine engine defining a gas turbine engine operating condition, and wherein determining the temperature setpoint comprises determining the temperature setpoint in response to the gas turbine engine operating condition.

The method of one or more of these clauses, wherein the gas turbine engine operating condition is indicative of an emissions parameter, a combustion dynamics parameter, a power output parameter, or a combination thereof.

A propulsion system for an aircraft, the aircraft comprising an aircraft fuel supply, the propulsion system comprising: a fuel cell assembly comprising a fuel cell stack having a fuel cell, the fuel cell defining an outlet positioned to remove output products from the fuel cell; a turbomachine comprising a compressor section, a combustion section, and a turbine section arranged in serial flow order, the combustion section configured to receive a flow of aviation fuel from the aircraft fuel supply and further configured to receive the output products from the fuel cell; and a controller comprising memory and one or more processors, the memory storing instructions that when executed by the one or more processors cause the propulsion system to perform operations including determining a temperature setpoint for the fuel cell stack, for the output products of the fuel cell stack, or both; and controlling a volume of oxidant provided to an anode in response to the determined temperature setpoint to control a temperature of the fuel cell stack, a temperature of the output products of the fuel cell stack, or both.

The propulsion system of one or more of these clauses, wherein the aircraft fuel supply is a hydrocarbon fuel supply, wherein the fuel cell assembly comprises a fuel processing unit, and wherein the fuel cell assembly is configured to selectively provide a hydrocarbon fuel from the hydrocarbon fuel supply to the anode and a hydrogen fuel from the fuel processing unit to the anode.

The propulsion system of one or more of these clauses, wherein the instructions further include: performing a fuel reforming action at the anode.

The propulsion system of one or more of these clauses, wherein performing the fuel reforming action at the anode comprises: receiving a hydrocarbon-based fuel at the anode; and receiving an oxygen-containing gas at the anode.

The propulsion system of one or more of these clauses, wherein the fuel cell assembly is integrated into a gas turbine engine, and wherein the oxygen-containing gas is a compressed air from a compressor section of the gas turbine engine.

The propulsion system of one or more of these clauses, wherein the anode comprises less than 25% by volume of Nickel.

A method for operating a propulsion system for an aircraft, the propulsion system comprising a gas turbine engine and a fuel cell assembly, the fuel cell assembly comprising a fuel cell stack having a solid oxide fuel cell defining an outlet positioned to remove output products from the solid oxide fuel cell during operation, the method comprising:

operating the fuel cell assembly to provide output products to a combustor of a combustion section of the gas turbine engine; and operating the fuel cell assembly, the gas turbine engine, or both such that a pressure within an anode of the solid oxide fuel cell is less than a pressure within a cathode of the solid oxide fuel cell, is less than a pressure within a combustion chamber of the gas turbine engine, or both while operating the gas turbine engine.

The method of one or more of these clauses, wherein operating the fuel cell assembly, the gas turbine engine, or both comprises:

executing a shutdown sequence for the gas turbine engine, wherein executing the shutdown sequence comprises decelerating the gas turbine engine to an off condition; and executing a cooling sequence for the fuel cell assembly while executing the shutdown sequence for the gas turbine engine, wherein executing the cooling sequence for the fuel cell assembly comprises operating the fuel cell assembly to define a pressure in the anode of the solid oxide fuel cell less than a pressure within the combustion chamber of the combustor of the gas turbine engine.

The method of one or more of these clauses, wherein executing the shutdown sequence comprises decelerating the gas turbine engine from a ground-idle operating condition to the off condition.

The method of one or more of these clauses, wherein executing the cooling sequence for the fuel cell assembly while executing the shutdown sequence for the gas turbine engine comprises providing airflow from the combustion chamber into the anode of the solid oxide fuel cell.

The method of one or more of these clauses, wherein providing airflow from the combustion chamber into the anode of the solid oxide fuel cell comprises providing airflow from the combustion chamber into the anode of the solid oxide fuel cell while a temperature of the solid oxide fuel cell is between about 230 degrees Celsius and 700 degrees Celsius.

The method of one or more of these clauses, wherein the airflow provided from the combustion chamber into the anode of the solid oxide fuel cell is an oxygen-containing airflow.

The method of one or more of these clauses, wherein executing a cooling sequence for the fuel cell assembly comprises reducing a pressure of a fuel flow to the anode of the solid oxide fuel cell, of an airflow to a cathode of the solid oxide fuel cell, or both.

The method of one or more of these clauses, wherein executing a cooling sequence for the fuel cell assembly comprises shutting off a fuel flow to the anode of the solid oxide fuel cell, an airflow to a cathode of the solid oxide fuel cell, or both.

The method of one or more of these clauses, wherein executing the cooling sequence comprises maintaining the fuel cell assembly in a warm standby state.

The method of one or more of these clauses, wherein maintaining the fuel cell assembly in the warm standby state comprises drawing less than about 10% of a maximum power output of the fuel cell assembly from the fuel cell assembly.

The method of one or more of these clauses, wherein executing the cooling sequence comprises operating the fuel cell assembly in a ground idle power output mode.

The method of one or more of these clauses, wherein operating the fuel cell assembly in the ground idle power output mode comprises recirculating output products from the solid oxide fuel cell to a location upstream of the fuel cell.

The method of one or more of these clauses, wherein executing the cooling sequence comprises maintaining the fuel cell assembly in a warm standby state, operating in a ground idle power output mode, or both while the gas turbine engine is in the off condition.

The method of one or more of these clauses, wherein the anode comprises less than 25% by volume of nickel.

The method of one or more of these clauses, wherein the anode is substantially free of nickel.

The method of one or more of these clauses, wherein operating the fuel cell assembly, the gas turbine engine, or both comprises operating the fuel cell assembly such that the pressure within the anode of the solid oxide fuel cell is less than the pressure within the cathode of the solid oxide fuel cell while operating the gas turbine engine.

The method of one or more of these clauses, wherein operating the fuel cell assembly such that the pressure within the anode of the solid oxide fuel cell is less than the pressure within the cathode of the solid oxide fuel cell while operating the gas turbine engine comprises flowing an oxidant into the anode while a temperature of the solid oxide fuel cell is between about 230 degrees Celsius and 700 degrees Celsius.

The method of one or more of these clauses, wherein operating the fuel cell assembly such that the pressure within the anode of the solid oxide fuel cell is less than the pressure within the cathode of the solid oxide fuel cell while operating the gas turbine engine comprises reducing a fuel flow to the anode of the solid oxide fuel cell.

A propulsion system for an aircraft having a gas turbine engine, the aircraft comprising an aircraft fuel supply, the propulsion system comprising: a fuel cell assembly comprising a fuel cell stack having a solid oxide fuel cell, the solid oxide fuel cell defining an outlet positioned to remove output products from the solid oxide fuel cell; a turbomachine comprising a compressor section, a combustion section, and a turbine section arranged in serial flow order, the combustion section configured to receive a flow of aviation fuel from the aircraft fuel supply and further configured to receive the output products from the solid oxide fuel cell; and a controller comprising memory and one or more processors, the memory storing instructions that when executed by the one or more processors cause the propulsion system to perform operations including: operating the fuel cell assembly, the gas turbine engine, or both such that a pressure within an anode of the solid oxide fuel cell is less than a pressure within a cathode of the solid oxide fuel cell, is less than a pressure within a combustion chamber of the gas turbine engine, or both while operating the gas turbine engine.

The propulsion system of one or more of these clauses, wherein operating the fuel cell assembly, the gas turbine engine, or both comprises: executing a shutdown sequence for the gas turbine engine, wherein executing the shutdown sequence comprises decelerating the gas turbine engine to an off condition; and executing a cooling sequence for the fuel cell assembly while executing the shutdown sequence for the gas turbine engine, wherein executing the cooling sequence for the fuel cell assembly comprises operating the fuel cell assembly to define a pressure in an anode of the solid oxide fuel cell less than a pressure within a combustion chamber of the combustion section of the turbomachine.

We claim:

1. A method for operating a propulsion system for an aircraft, the propulsion system comprising a gas turbine engine and a fuel cell assembly, the fuel cell assembly comprising a fuel cell stack having a fuel cell defining an outlet positioned to remove output products from the fuel cell during operation, the method comprising:
executing a startup sequence for the fuel cell assembly, wherein executing the startup sequence for the fuel cell assembly comprises initiating the startup sequence for the fuel cell assembly;
executing a startup sequence for the gas turbine engine, wherein executing the startup sequence for the gas turbine engine comprises initiating the startup sequence for the gas turbine engine subsequent to initiating the startup sequence for the fuel cell assembly; and
operating the fuel cell assembly to provide output products to a combustion section of the gas turbine engine.

2. The method of claim 1, wherein executing the startup sequence for the fuel cell assembly comprises:
operating in a purge state after initiating the startup sequence for the fuel cell assembly;
operating in a first heat-up state prior to a temperature of the fuel cell stack reaching a first fuel cell temperature threshold;
operating in a second heat-up state subsequent to the temperature of the fuel cell stack reaching the first fuel cell temperature threshold and prior to the temperature of the fuel cell stack reaching a second fuel cell temperature threshold; and
operating in a power generation state subsequent to the temperature of the fuel cell stack reaching the second fuel cell temperature threshold.

3. The method of claim 1, wherein initiating the startup sequence for the gas turbine engine subsequent to initiating the startup sequence for the fuel cell assembly comprises initiating the startup sequence for the gas turbine engine prior to a temperature of the fuel cell stack reaching a first fuel cell temperature threshold.

4. The method of claim 3, wherein the first fuel cell temperature threshold is at least about 230 degrees C.

5. The method of claim 1, wherein initiating the startup sequence for the gas turbine engine subsequent to initiating the startup sequence for the fuel cell assembly comprises initiating the startup sequence for the gas turbine engine after a temperature of the fuel cell stack has reached a first fuel cell temperature threshold and prior to the temperature of the fuel cell stack reaching a second fuel cell temperature threshold.

6. The method of claim 5, wherein the first fuel cell temperature threshold is between about 230 degrees C. and about 400 degrees C., wherein the second fuel cell temperature threshold is between about 400 degrees C. and about 750 degrees C., and wherein the second fuel cell temperature threshold is greater than the first fuel cell temperature threshold.

7. The method of claim 1, wherein initiating the startup sequence for the gas turbine engine subsequent to initiating the startup sequence for the fuel cell assembly comprises initiating the startup sequence for the gas turbine engine after a temperature of the fuel cell stack has reached a second fuel cell temperature threshold.

8. The method of claim 7, wherein the second fuel cell temperature threshold is between about 400 degrees C. and about 750 degrees C.

9. The method of claim 1, wherein the fuel cell assembly comprises an air processing unit, and wherein executing the startup sequence for the fuel cell assembly further comprises:
completing the startup sequence for the fuel cell assembly, and
routing one or more streams of the output products from the fuel cell to the air processing unit prior to completing the startup sequence for the fuel cell assembly.

10. The method of claim 9, wherein the one or more streams of the output products from the fuel cell comprise an anode stream, a cathode stream, or both.

11. The method of claim 1, wherein the fuel cell assembly comprises a fuel processing unit, and wherein executing the startup sequence for the fuel cell assembly further comprises:
completing the startup sequence for the fuel cell assembly, and
routing one or more streams of the output products from the fuel cell to the fuel processing unit prior to completing the startup sequence for the fuel cell assembly.

12. The method of claim 11, wherein the one or more streams of the output products from the fuel cell comprise an anode stream, a cathode stream, or both.

13. The method of claim 1, wherein executing the startup sequence for the fuel cell assembly comprises:
operating the fuel cell assembly in a warm standby state;
operating the fuel cell assembly in a ground idle power generation mode; and operating the fuel cell assembly in a normal power generation mode.

14. The method of claim 13, wherein operating the fuel cell assembly in the ground idle power generation mode comprises operating the fuel cell assembly at fuel utilization within about 10% of a maximum fuel utilization.

15. The method of claim 1, wherein executing the startup sequence for the fuel cell assembly comprises initiating operation of a fuel processing unit and providing an offgas of the fuel processing unit around an anode of the fuel cell to a combustor of the combustion section of the gas turbine engine, to an air processing unit of the fuel cell assembly, or both.

16. The method of claim 1, wherein the fuel cell assembly comprises an air processing unit and a fuel processing unit, wherein executing the startup sequence for the fuel cell assembly comprises providing an offgas from the air processing unit to a cathode of the fuel cell and providing an offgas from the fuel processing unit to an anode of the fuel cell.

17. The method of claim 1, wherein executing the startup sequence for the fuel cell assembly comprises providing a flow to an anode of the fuel cell having an oxygen content prior to a temperature of the fuel cell stack being greater than or equal to a first fuel cell temperature threshold.

18. The method of claim 1, wherein executing the startup sequence for the fuel cell assembly comprises providing a flow to an anode of the fuel cell having an oxygen content prior to a temperature of the fuel cell stack being greater than or equal to a second fuel cell temperature threshold.

19. The method of claim 1, wherein executing the startup sequence for the fuel cell assembly comprises performing a fuel reforming action at an anode of the fuel cell assembly.

20. A propulsion system for an aircraft having a gas turbine engine, the aircraft comprising an aircraft fuel supply, the propulsion system comprising:

a fuel cell assembly comprising a fuel cell stack having a fuel cell, the fuel cell defining an outlet positioned to remove output products from the fuel cell;

a turbomachine comprising a compressor section, a combustion section, and a turbine section arranged in serial flow order, the combustion section configured to receive a flow of aviation fuel from the aircraft fuel supply and further configured to receive the output products from the fuel cell; and a controller comprising memory and one or more processors, the memory storing instructions that when executed by the one or more processors cause the propulsion system to perform operations including:

executing a startup sequence for the fuel cell assembly, wherein executing the startup sequence for the fuel cell assembly comprises initiating the startup sequence for the fuel cell assembly;

executing a startup sequence for the gas turbine engine, wherein executing the startup sequence for the gas turbine engine comprises initiating the startup sequence for the gas turbine engine subsequent to initiating the startup sequence for the fuel cell assembly; and operating the fuel cell assembly to provide output products to a combustion section of the gas turbine engine.

* * * * *